(12) United States Patent
Aronov et al.

(10) Patent No.: US 12,424,708 B2
(45) Date of Patent: Sep. 23, 2025

(54) LI-ION CELLS WITH EXTREME FAST CHARGING CAPABILITIES

(71) Applicant: StoreDot, Ltd., Herzeliya (IL)

(72) Inventors: Daniel Aronov, Netanya (IL); Nir Kedem, Haifa (IL); Yaron Ideses, Lahav (IL); Dan Corfas, Kfar Saba (IL); Assaf Zehavi, Haifa (IL); Zvi Ioffe, Kfar Saba (IL)

(73) Assignee: StoreDot, Ltd., Herzeliya (IL)

( * ) Notice: Subject to any disclaimer, the term of this patent is extended or adjusted under 35 U.S.C. 154(b) by 0 days.

(21) Appl. No.: 18/604,062

(22) Filed: Mar. 13, 2024

(65) Prior Publication Data

US 2024/0313196 A1    Sep. 19, 2024

Related U.S. Application Data

(63) Continuation of application No. PCT/IB2024/052398, filed on Mar. 12, 2024.

(51) Int. Cl.
| | |
|---|---|
| *H01M 50/417* | (2021.01) |
| *H01M 4/36* | (2006.01) |
| *H01M 4/38* | (2006.01) |
| *H01M 4/583* | (2010.01) |
| *H01M 10/0525* | (2010.01) |
| *H01M 10/0567* | (2010.01) |

(Continued)

(52) U.S. Cl.
CPC .......... *H01M 4/364* (2013.01); *H01M 4/386* (2013.01); *H01M 4/583* (2013.01); *H01M 10/0525* (2013.01); *H01M 10/0567* (2013.01); *H01M 50/417* (2021.01); *H01M 50/426* (2021.01); *H01M 50/491* (2021.01); *H01M 2004/027* (2013.01); *H01M 2004/028* (2013.01)

(58) Field of Classification Search
CPC .. H01M 4/364; H01M 50/417; H01M 50/426; H01M 50/491; H01M 50/386; H01M 50/583; H01M 10/0525; H01M 10/0567; H01M 2004/027; H01M 2004/028
See application file for complete search history.

(56) References Cited

U.S. PATENT DOCUMENTS

| | | | |
|---|---|---|---|
| 10,873,074 B2 * | 12/2020 | Cui | ........................ H01M 4/134 |
| 2022/0302493 A1 * | 9/2022 | Gwon | ................. H01M 10/052 |
| 2024/0266501 A1 * | 8/2024 | Yushin | ................... H01M 4/386 |

* cited by examiner

*Primary Examiner* — Jane J Rhee
(74) *Attorney, Agent, or Firm* — Finnegan, Henderson, Farabow, Garrett & Dunner, LLP

(57) ABSTRACT

Rechargeable battery cells and methods for extreme fast charging are disclosed. For example, such a rechargeable battery cell might be chargeable to at least 70% of usable capacity within 15 minutes. Such a rechargeable battery cell may include an anode having at least one surface with a reversible areal capacity, after formation, up to 8.0 mAh/cm$^2$, containing a Si—C composite within a porous structure and including a carbon-based conductive additive, wherein the Si—C composite is at least 30% Si by weight, and the material is at least 85% Si—C composite. The rechargeable battery cell may also include a cathode having at least one surface with a reversible areal capacity, after formation, up to 6 mAh/cm$^2$, wherein a ratio of areal capacity of the at least one surface of the anode to the at least one surface of the cathode is between 1.15 to 1.45.

30 Claims, 13 Drawing Sheets

Related U.S. Application Data

(60) Provisional application No. 63/490,117, filed on Mar. 14, 2023.

(51) Int. Cl.
*H01M 50/426* (2021.01)
*H01M 50/491* (2021.01)
*H01M 4/02* (2006.01)

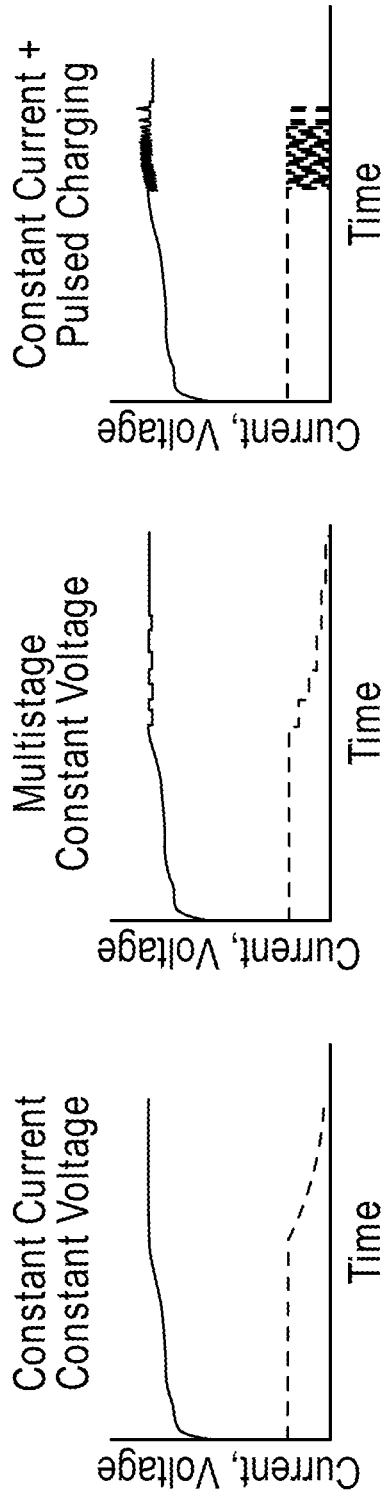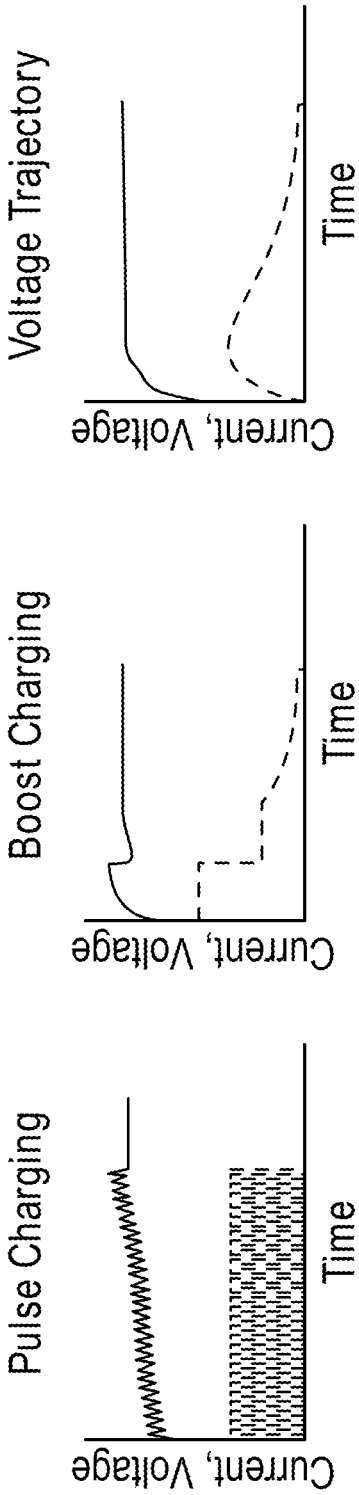
FIG. 8A Constant Current Constant Voltage
FIG. 8B Multistage Constant Voltage
FIG. 8C Constant Current + Pulsed Charging
FIG. 8D Pulse Charging
FIG. 8E Boost Charging
FIG. 8F Voltage Trajectory

LI-ION CELLS WITH EXTREME FAST CHARGING CAPABILITIES

CROSS-REFERENCE TO RELATED APPLICATIONS

The present application claims priority to International Application No. PCT/IB2024/052398, filed Mar. 12, 2024, which claims priority to U.S. Provisional Patent Application No. 63/490,117, filed on Mar. 14, 2023, each of which is incorporated herein by reference in its entirety.

TECHNICAL FIELD

The present disclosure generally relates to the field of energy storage devices. More particularly, some disclosed embodiments involve rechargeable battery cells with parameters designed to achieve extreme fast charging and extreme energy density properties.

BACKGROUND

The standard charging method for Li-ion batteries typically involves charging at a constant current until the battery voltage reaches a certain threshold, followed by a constant voltage charging phase until the battery is fully charged. This method is relatively slow and can take several hours to complete.

The standard charging method for Li-ion batteries typically involves charging at a constant current until the battery voltage reaches a certain threshold, followed by a constant voltage charging phase until the battery is fully charged. This method is relatively slow and can take several hours to complete. In contrast, "Extreme Fast Charging" (XFC) utilizes higher charging currents to speed up the charging process. XFC technology is applicable for any electrical vehicle (EV) including cars, aircrafts, bus, trucks, as well as other battery equipped devices, such as energy storage solutions. When used in the context of cars, the U.S. Department of Energy defines XFC as adding 200 miles of range within 10 minutes of charging. To achieve this property, XFC involves supplying a higher current to the battery, enabling it to charge at a much faster rate. Despite the best efforts of many battery designers and automakers, until the present disclosure, extreme fast charging was difficult to achieve with current EV batteries. A variety of problems prevented successful and repeatable extreme fast charging, mostly associated with the heat generated by faster moving electrons and ions in battery cells. To achieve extreme fast charging, batteries are often designed with one or more of an ability to: withstand higher charging currents; effectively reduced and dissipate generated heat; facilitate faster ion transport; and minimize the risk of side reactions.

The disclosed rechargeable battery cells with parameters and methods designed to achieve rapid charging overcome one or more of the problems set forth above and/or other problems of the prior art.

SUMMARY

Consistent with some disclosed embodiments, rechargeable battery cells and methods of using the same in extreme fast charging applications are disclosed. The rechargeable battery cells may include at least one anode. In some embodiments, at least one anode may have a conductive current collector coated with a composite containing at least 30% Si by weight. The rechargeable battery cell may also include at least one cathode that may also have a conductive current collector and be configured as a source of Li ions. The rechargeable battery cell may include a high porosity separator between the anode and the cathode, such as a separator having a porosity of at least 38%. An electrolyte in contact with the anode, the cathode, and the separator, may be capable of carrying Li-ions between the anode and the cathode. In some embodiments, the anode, the cathode, and the separator may be configured to cooperate to enable sequential charging and discharging, such that during sequential charging at least 70% of usable capacity is loaded within 15 minutes, such as within 10 minutes.

When configured as disclosed herein, some embodiments having a conductive current collector coated with a composite containing at least 30% Si by weight, a cathode configured as a source of Li ions, an electrolyte capable of carrying Li-ions between the anode and the cathode, and a separator with a porosity of at least 38% between the anode and the cathode may provide extremely fast charging of at least 70% of usable capacity loaded within 15 minutes.

Consistent with some disclosed embodiments, the at least one anode may contain mixtures and/or composites of Si—C within a porous structure. The rechargeable battery cell may also include at least one cathode. In some embodiments, the at least one cathode may be metal oxide-based and configured as a source of Li ions. The rechargeable battery cell may also include a separator between the anode and the cathode.

The rechargeable battery cell may further include an electrolyte in contact with the anode, the cathode, and the separator, wherein the electrolyte is capable of carrying Li-ions between the anode and the cathode. In some embodiments, the interface between the anode and the cathode is pressurized in an amount sufficient to manage volumetric changes during charging and discharging processes.

In some embodiments, the anode, the cathode, and the separator maybe configured to cooperate to enable sequential charging and discharging, such that during sequential charging at least 70% of usable capacity is loaded within 15 minutes, such as within 10 minutes.

When configured as disclosed herein, extremely fast charging of at least 70% of usable capacity loaded within 15 minutes can be achieved with the new combination of an anode containing mixtures and/or composites of Si—C within a porous structure, a metal oxide-based cathode, and an interface between the anode and cathode that is pressurized in an amount sufficient to manage volumetric changes during charging and discharging processes.

Consistent with some disclosed embodiments, the at least one anode may contain a conductive current collector coated with a composite containing a carbon-based material. In some embodiments, the at least one cathode may be configured as a source of Li ions, and an electrolyte capable of carrying Li-ions between the anode and the cathode. In some embodiments, the separator may have one or more layers and a total thickness of less than 20 microns.

In some embodiments, the anode, the cathode, and the separator may be configured to cooperate to enable sequential charging and discharging, such that during sequential charging at least 70% of usable capacity is loaded within 15 minutes. In some embodiments at least 70% of usable capacity is loaded within 10 minutes.

In some embodiments, a rechargeable battery cell that may include at least one anode containing a conductive current collector coated with a composite containing a carbon-based material, at least one cathode that may be configured as a source of Li ions, and a separator between the anode and the cathode, the separator may have a thickness of less than 20 microns. The rechargeable battery cell may also include an electrolyte capable of carrying Li-ions between the anode and the cathode.

When configured as disclosed herein, extremely fast charging of at least 70% of usable capacity loaded within 15 minutes can be achieved with the new combination of an anode, a cathode, and an ultra-thin separator between the anode and the cathode, that may include one or more layers and have a total thickness of less than 20 microns.

Consistent with some disclosed embodiments, anodes may have at least one surface with a reversible areal capacity, after formation, up to 8.0 mAh/cm$^2$. In some embodiments, the at least one cathode may have at least one surface with a reversible areal capacity, after formation, up to 6 mAh/cm$^2$. In some embodiments, the rechargeable battery cell has a ratio of areal capacity of at least one surface of the anode to the at least one surface of the cathode between 1.15 to 1.45. In some embodiments, the anode and cathode exhibiting the described ratio of areal capacity may be configured to cooperate to enable sequential charging and discharging, such that during sequential charging at least 70% of usable capacity is loaded within 15 minutes. In some embodiments at least 70% of usable capacity is loaded within 10 minutes.

When configured as disclosed herein, extremely fast charging of at least 70% of usable capacity loaded within 15 minutes can be achieved with the new combination of an anode having at least one surface with a reversible areal capacity, after formation, up to 8.0 mAh/cm$^2$ and a cathode having at least one surface with a reversible areal capacity, after formation, up to 6 mAh/cm$^2$, wherein a ratio of areal capacity of the at least one surface of the anode to the at least one surface of the cathode is between 1.15 to 1.45.

Consistent with some disclosed embodiments, anodes may have at least one surface with a reversible areal capacity, after formation, up to 8.0 mAh/cm$^2$ and may contain a Si—C composite within a porous structure and including a carbon-based conductive additive. In some embodiments, the Si—C composite is at least 30% Si by weight, and the material is at least 85% Si—C composite, without the current collector.

In some embodiments, cathodes may be configured as a source of Li ions and at least one surface with a reversible areal capacity, after formation, up to 6 mAh/cm$^2$. In some embodiments, the ratio of areal capacity of the at least one surface of the anode to the at least one surface of the cathode is between 1.15 to 1.45.

In some embodiments, the rechargeable battery cell may also include one or more of an electrolyte capable of carrying Li-ions between the anode and the cathode, a dielectric separator between the anode and the cathode, at least one carbon material or carbon additive, a binder in an amount less than 20% by weight, and a polymer-based dispersant in an amount less than 2% by weight. In some embodiments, the polymer-based dispersant includes polymer chains between 10,000 and 50,000 g/mol.

The rechargeable battery cell may also include an interface between the anode and the cathode that is pressurized in an amount sufficient to manage volumetric changes during charging and discharging processes.

In some embodiments, the anode, the cathode, and the separator may be configured to output an average discharge voltage of no greater than 3.55 V and enable sequential charging and discharging, such that during sequential charging at least 70% of usable capacity is loaded within 15 minutes. In some embodiments at least 70% of usable capacity is loaded within 10 minutes.

When configured to cooperate to enable sequential charging and discharging as disclosed in some embodiments herein, extremely fast charging of at least 70% of usable capacity loaded within 15 minutes, such as within 10 minutes, can be achieved with the new combination of an anode, a cathode, and separator described herein.

BRIEF DESCRIPTION OF THE DRAWINGS

The accompanying drawings, which are incorporated in and constitute a part of this specification, illustrate some disclosed embodiments and, together with the description, serve to explain the disclosed embodiments. The particulars shown are by way of example and for purposes of illustrative discussion of embodiments of the present disclosure. The description taken with the drawings makes apparent to those skilled in the art how embodiments of the present disclosure may be practiced.

FIG. 1(b) is another schematic cross-sectional view of a rechargeable battery cell, consistent with some disclosed embodiments. FIG. 1(c) is a schematic cross-sectional view of the rechargeable battery cell similar to FIG. 1(b), further having a ceramic film and a Li ion conducting polymer film on both sides of the base film. FIG. 1(d) is a schematic cross-sectional view of a rechargeable battery cell showing an interface between the anode and the cathode.

FIG. 8(a) to 8(f), are graphs showing various charging techniques that can be used with some disclosed embodiments, including FIG. 8(a) which is an exemplary charging profile of constant-current constant voltage (CCCV), FIG. 8(b) which is an exemplary charging profile of multi-stage constant current, FIG. 8(c) which is an exemplary charging profile of constant current and pulsed charging, FIG. 8(d) which is an exemplary charging profile of pulse charging, FIG. 8(e) which is an exemplary charging profile of boost charging, FIG. 8(f) which exemplifies schematic profiles of the voltage trajectory generally related to Li ion batteries.

FIG. 1-14(b) is a typical charging curve of a Si-based lithium-ion battery according to some embodiments of the present disclosure.

DETAILED DESCRIPTION

Figure 1A:
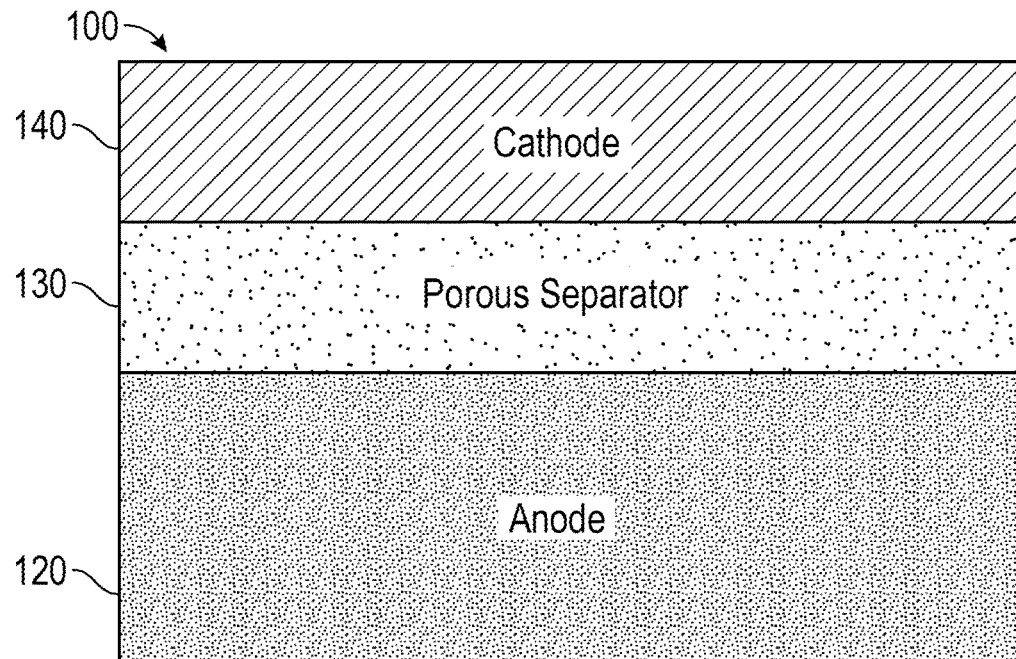
FIG. 1(a) to 1(d) are schematic cross-sectional views of rechargeable battery cells consistent with some disclosed embodiments, including FIG. 1(a), which is a schematic cross-sectional view of a rechargeable battery cell consistent with some disclosed embodiments.

This disclosure presents a few exemplary embodiments with the understanding that features of the exemplary embodiments may be combined with other disclosed features or may be incorporated into rechargeable battery cells, methods of charging such cells, or embodiments not described herein while still remaining within the scope of this disclosure. For convenience, any form of the word "embodiment" as used herein is intended to refer to at least one embodiment of this disclosure.

Consistent with some disclosed embodiments, extreme fast charging of lithium-ion batteries not only achieve a fast-charging rate, but also maintain other key performance indicators (KPIs) such as energy density and cycle life. According to some disclosed embodiments, it is possible to achieve extreme fast charging with minimal trade-offs in other KPIs. For example, supercapacitors can be charged extremely fast, but they have much lower energy density than lithium-ion batteries.

Lithium-ion batteries were traditionally known for their trade-offs between different KPIs. Prior to the present disclosure, for example, it was difficult to improve one property without sacrificing another. For instance, an electrolyte that performs well at low temperatures may be unstable at high temperatures. Similarly, while decreasing the particle size of active materials may help with fast charging, it may also reduce battery life and safety. Prior to the present disclosure, it was challenging to develop materials that can charge quickly while maintaining durability and safety over a wide range of temperatures.

Embodiments of the present disclosure relate to rechargeable battery cells that achieve extreme fast charging without sacrificing other KPIs. A rechargeable battery cell, also known as a secondary battery cell, is a type of battery that can be recharged and reused multiple times. In some disclosed embodiments, the rechargeable battery cell is configured to store and release electrical energy through reversible chemical reactions. While rechargeable battery cells come in various chemistries, each with its own characteristics and advantages, in some disclosed embodiments, the rechargeable battery cells may be lithium-ion (Li-ion) batteries.

In some embodiments, the rechargeable battery cell includes an anode. An anode is one of the two electrodes that participate in electrochemical reactions that produce and store electrical energy. An anode is the electrode where oxidation reactions occur during discharge (when the battery is providing power) and where reduction reactions occur during charging (when the battery is being recharged).

In some embodiments, the anode of the rechargeable battery cell exhibits a desired areal capacity. The areal capacity of an electrode refers to the amount of reversible charge that can be stored or delivered per unit area of the electrode's surface, after formation. It is typically measured in units of $mAh/cm^2$ (milliAmpere-hours per square centimeter) or $mWh/cm^2$ (milliwatt-hours per square centimeter). The areal capacity determines the reversible energy storage capacity and power density of the electrode. It represents the ability of the electrode material to store and release electrical energy per unit area. In aspects of some disclosed embodiments, the areal capacity of the positive and negative electrodes determines the overall reversible energy storage capacity of the battery. Higher areal capacities allow for greater energy storage within a given electrode area, leading to higher battery capacity and longer operating times.

As used herein, "reversible areal capacity" refers to the ability of the negative and positive electrodes to undergo an electrochemical process during discharging, and an opposite electrochemical process during charging, after the electrode is formed, "after formation", such as based on the finished cell design, and not the potential or ability of each individual electrode to provide and accept a certain Li amount. During discharge of the battery, ions (in the case of a lithium battery, lithium ions) move from the negative electrode (anode) to the positive electrode (cathode) through the electrolyte. This electrochemical process can be reversed during charging. The lithium ions move back from the positive electrode the negative electrode, and the electrons flow in the opposite direction through the external circuit. The ability of the negative and positive electrodes to undergo this reversal in the electrochemical process during charging is referred to as "reversible areal capacity". The total capacity absorbed by the electrode is the sum of the reversible and irreversible capacity.

Different electrode materials and designs can result in varying areal capacities, affecting the overall performance and characteristics of the battery. In some embodiments, the anode has at least one surface with a reversible areal capacity, after formation, of up to 8.0 mAh/cm2. In some embodiments, the anode has at least one surface with a reversible areal capacity, after formation, between 5 and 6 $mAh/cm^2$. In some embodiments, the anode has at least one surface with a reversible areal capacity, after formation, between 6 and 8.0 $mAh/cm^2$.

In some embodiments, the anode includes a conductive current collector. A material or substance that is conductive has the ability to transmit or carry electrical current. A current collector refers to a conductive material that facilitates the flow of electrons between the anode electrode and an external circuit. As a result, the current collector may have a low sheet resistance. As used herein, the sheet resistance of a current collector refers to the resistance per unit area of the material used for the current collector. It is a measure of how easily electrical current can flow through the material in a two-dimensional plane. The specific value considered "low" for sheet resistance depends on the application and the desired performance requirements.

In some embodiments, the current collector is a thin metal foil or mesh, such as copper, which is attached to the surface of the anode electrode. As indicated, it acts as a bridge between the active material of the anode and the external circuit, allowing the electrons to flow in and out of the anode. In some embodiments, the current collector is a thin metal foil or mesh, such as copper, which is attached to the surface of the anode electrode.

In some disclosed embodiments an anode contains carbon. In some embodiments, the current collector of the anode is coated with a composite containing a carbon-based material. A coating refers to a material applied to a surface. In this instance, the material applied to the surface of the anode includes a composite including a carbon-based conductive additive. A composite refers to a material made up of two or more distinct components with different properties. The components may be combined to create a new material with improved characteristics. A carbon-based conductive additive is a type of material containing carbon and which may be applied to impart or enhance electrical conductivity. For example, the carbon-based conductive additive may be the chemical element (C) itself or an allotrope of carbon, such as, for example, carbon black, graphite, hard carbons, graphene, fullerenes, carbon-based fibers or carbon nanotubes or combinations thereof. In some examples, composites containing carbon-based material may include graphene, carbon-loaded polymers, and graphene. The carbon's structure, such as graphite's layered structure provides suitable properties for the anode's function in the battery. For example, the use of carbon as at least part of the anode material in Li-ion batteries may be advantageous in some embodiments due to its ability to intercalate (absorb and release) lithium ions without significant structural damage. Carbon can accommodate the lithium ions between its layers, effectively storing them during charging and releasing them during discharge. This intercalation process at least partially enables the reversible cycling of the battery.

In some embodiments, the weight of the carbon-based material includes no more than 70% of a weight of the anode. 70% of a weight means that the carbon-based material makes up no more than 70% of the total weight of the coated part of the anode. For the avoidance of confusion, this weight excludes the weight of the current collector, which is also part of the anode. By way of non-limiting example, if a total coated part of anode weight were to be 10 grams, the portion of the anode weight attributed to the carbon-based material would be no more than 7 grams.

In some embodiments, the other 30% weight of the coated part of the anode may include any other material to contribute the anode's reversible capacity, apart from carbon-based materials. For example, in some embodiments, the rest of the 30% may consist of materials such as, but not limited to, Si, SiOx, SiC. In some disclosed embodiments, the other 30% weight of the coated part of the anode may include mixtures and/or composites of silicon-carbon (Si/C), silicon oxide-carbon (SiOx/C, wherein 0<x<2), SiN/C and combinations thereof. In some embodiments, the anode includes a conductive current collector. A material or substance that is conductive has the ability to transmit or carry electrical current. A current collector refers to a conductive material that facilitates the flow of electrons between the anode electrode and an external circuit. As a result, the current collector may have a low sheet resistance. As used herein, the sheet resistance of a current collector refers to the resistance per unit area of the material used for the current collector. It is a measure of how easily electrical current can flow through the material in a two-dimensional plane. The specific value considered "low" for sheet resistance depends on the application and the desired performance requirements.

Sheet resistance is typically represented by the symbol "$R_s$" and is measured in ohms per square ($\Omega$/sq). It quantifies the resistance encountered when a current travels across a square area of the material. The formula for calculating sheet resistance is: $R_s = R/A$, where:

$R_s$ is the sheet resistance,

R is the resistance of the material (measured between opposite edges),

A is the area of the square (measured in square units, such as square centimeters or square inches). Lower values of sheet resistance indicate better conductivity and lower resistance to current flow. Materials with low sheet resistance are desirable for current collectors as they enable efficient electron transfer between the electrode and the external circuit, minimizing power losses. For example, in some embodiments, the conductive current collector has a sheet resistance below 3 mOhm/sq. For instance, in some embodiments, a 10 μm thick aluminum current collector has a sheet resistance of 2.65 mOhm/sq. In some embodiments, a 10 μm thick copper current collector has a sheet resistance of 1.68 mOhm/sq. The primary function of a conductive current collector is to collect the electrical current generated during electrochemical reactions taking place at the anode. In some disclosed embodiments, the current collector is a thin metal foil or mesh, such as copper or aluminum, which is attached to the surface of the anode electrode. As indicated, it acts as a bridge between the active material of the anode and the external circuit, allowing the electrons to flow in and out of the anode.

The primary function of a conductive current collector is to collect the electrical current generated during electrochemical reactions taking place at the anode. In some disclosed embodiments, the current collector is a thin metal foil or mesh, such as copper or aluminum, which is attached to the surface of the anode electrode. As indicated, it acts as a bridge between the active material of the anode and the external circuit, allowing the electrons to flow in and out of the anode.

In some disclosed embodiments, the anode includes a conductive current collector coated with a composite containing at least 30% Si by weight. In some embodiments, the composite containing at least 30% Si by weight includes mixtures and/or composites of silicon-carbon (Si/C), silicon oxide-carbon (SiOx/C, wherein 0<x<2), SiN/C and combinations thereof. In some embodiments, the anode is made of at least 85% Si—C composite, relative to the anode.

Some embodiments involve a cathode configured as a source of Li ions. A cathode is an electrode where reduction reactions occur during discharge (when the battery is providing power) and where oxidation reactions occur during charging (when the battery is being recharged). A cathode is configured as a source of Li ions when it is made of material(s) that can intercalate (absorb) and release lithium ions as the battery charges and discharges. Non-limiting examples of materials that intercalate lithium ions include graphite, silicon-based materials, and metal oxides and sulfides. In some embodiments, the current collector is a thin metal foil or mesh, such as aluminum, which is attached to the surface of the cathode electrode. In some embodiments, the current collector is a thin metal foil or mesh, such as aluminum, which is attached to the surface of the cathode electrode.

During the discharge process, lithium ions migrate from the anode to the cathode through the electrolyte. At the cathode, reduction reactions take place as lithium ions are incorporated into the crystal lattice of the cathode material. This reduction process leads to the release of energy in the form of electrons, which flow through the external circuit, generating an electric current. When the battery is being charged, the opposite reactions occur. Lithium ions are driven out of the cathode material and move back to the anode, while electrons flow into the anode from the external circuit. In this context, the charging process involves oxidation reactions at the cathode as lithium ions are extracted from the cathode material and released into the electrolyte.

In some disclosed embodiments the cathode may be metal-oxide based. A metal-oxide based cathode is a cathode (as described earlier) that includes material composed of a combination of a metal element and oxygen. A metal oxide based cathode may or may not include a layered structure of various materials. For example, in some embodiments, the cathode may include materials based on layered, spinel and/or olivine frameworks, and include various compositions, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) LFP (lithium ferro phosphate) formulations (based on $LiFePO_4$), lithium rich cathodes, and/or combinations thereof.

In some embodiments, the cathode material may be LNMO (lithium nickel manganese oxide), such as $LiNiMnCoO_2$. As described herein, the amount of the transition metals in the composition, e.g., the Nickel, Manganese and Cobalt, may be represented by the abbreviation NMC. In some embodiments, the cathode material may be defined as NMC622. The numbers following NMC indicate the relative atomic proportions of each transition metal in the composition. For example, the composition of NMC622 cathode material consists of approximately 60% nickel (Ni), 20% manganese (Mn), and 20% cobalt (Co). A NMC622 cathode material has a relatively low amount of nickel (60%), which leads to a balance between energy density, capacity, and cycling stability.

In some embodiments, the cathode material includes $LiNi_xMn_yCo_zO_2$, represented by the nomenclature NMC811. In this embodiment, the cathode material typically consists of approximately 80% nickel (Ni), 10% manganese (Mn), and 10% cobalt (Co). This high nickel content in NMC811 offers several advantages over a cathode material having a lower nickel content such as NMC622, including higher energy density and greater capacity. The higher nickel content allows batteries to store more energy in a given volume or weight, which can lead to improved battery life and improved performance. High-nickel cathode formulations like NMC811 tend to have improved thermal stability compared to cobalt-rich cathode materials, which can enhance the safety of the overall battery.

In some embodiments, there is described a cathode material having approximately 90% nickel (Ni), e.g., NMC9xx. In addition to nickel rich cathodes, there is described other structures, such as Li-rich NMC cathodes. In some embodiments, there are described NCA-based cathodes.

In some embodiments, the cathode may comprise up 90 atomic % nickel, such as 60-90 atomic % or even 60-80 atomic % nickel. In some embodiments, the cathode may comprise 10-20 atomic % manganese, and 10-20 atomic % cobalt.

In some embodiments, there are described several different cathode materials for Li-ion batteries with a general formula AzM(TOy)yX. In this general formula:
  A—represents an alkali or alkaline-earth element, typically Li, alone or partially replaced by at most 10% of Na and/or K;
  Z is defined by $1 \leq z \leq 3$,
  M—represents a metal, typically Fe, Mn, Ni, Al, V, Co or more aliovalent or isovalent metals selected from Mg, Mo, Nb, Ti, Ta, Ge, La, Y, Yb, Cu, Sm, Ce, Hf, Cr, Zr, Bi, Zn, Ca, B and W or combination thereof;
  T—represents a p-block element, typically Si, P, S or combination thereof;
  y is defined by $2 \leq y \leq 4$; and
  X—represents O, OH, or F.

As previously indicated, in some embodiments, different electrode materials and designs can result in varying areal capacities, affecting the overall performance and characteristics of the battery. In some embodiments, the cathode has at least one surface with a reversible areal capacity, after formation, up to 6 $mAh/cm^2$. In some embodiments, the cathode has at least one surface with an areal capacity between 4 and 5 $mAh/cm^2$. In some embodiments, the anode has at least one surface with a reversible areal capacity, after formation, between 5 and 6 $mAh/cm^2$.

In some embodiments, areal capacity is defined by the ratio of the areal capacity of the anode to the areal capacity of the cathode. The ratio of the areal capacity of the anode to the areal capacity of the cathode balances the energy storage capabilities of a battery by influencing how much energy can be stored and delivered by the battery per unit area of the electrode surfaces. Achieving a balanced ratio ensures that both electrodes contribute equally to the overall energy storage capacity of the battery.

The anode-cathode areal capacity ratio influences the voltage of the battery, as voltage is determined by the potential difference between the anode and cathode. If the anode has a significantly higher capacity than the cathode, it may lead to a higher overall capacity but a lower voltage. Conversely, if the cathode has a much higher capacity, it can result in a higher voltage but potentially lower capacity.

Imbalances in the anode-cathode areal capacity ratio can affect the long-term durability and cycle life of a battery. A mismatch can lead to uneven wear and tear on the electrodes, potentially causing capacity fade and reducing the battery's overall lifespan. Non-limiting examples of safety issues associated with an imbalance in the anode-cathode areal capacity ratio, and how it can affect the battery, include: lithium plating, capacity fade, and thermal instability. Regarding lithium plating, if the anode has a lower capacity than the cathode, lithium ions will be deposited on the anode surface during charging. This can lead to the formation of lithium dendrites, which can pierce the separator and cause a short circuit. Regarding capacity fade, if the cathode has a lower capacity than the anode, the battery will not be able to fully charge. This can lead to a decrease in the battery's capacity over time. Regarding thermal instability, an imbalance in the anode-cathode areal capacity ratio can lead to thermal instability, which can increase the risk of fire and explosion.

In some embodiments, desired anode-cathode areal capacity ratio achieves the right balance of properties ensures that a battery can meet the specific requirements of a given application in terms of capacity, voltage, energy density, and cycle life. For example, in some embodiments, the cathode has at least one surface with a reversible areal capacity, after formation up to 6 mAh/cm2. In some embodiments, the cathode has at least one surface with a reversible areal capacity, after formation, between 4 and 5 mAh/cm2. In some embodiments, the anode has at least one surface with a reversible areal capacity, after formation, up to 8.0 mAh/cm2. such as between 5 and 6 mAh/cm2. In some embodiments, the ratio of areal capacity of the at least one surface of the anode to the at least one surface of the cathode is between 1.25 to 1.45.

In some embodiments, the anode may have at least one surface with a reversible areal capacity, after formation, between 6 and 8.0 $mAh/cm^2$ and the cathode may have at least one surface with a reversible areal capacity, after formation, between 5 and 6 $mAh/cm^2$. In some embodiments, the ratio of areal capacity of the at least one surface of the anode to the at least one surface of the cathode is between 1.15 and 1.35. In some embodiments, the ratio between an areal capacity of the cathode to the anode may be between 0.70 and 0.81.

In some embodiments, the anode includes at least one active material. Anode active material refers to a material that stores and releases electrical energy during the charging and discharging processes. In one non-limiting embodiment, the anode active material may include graphite. Graphite consists of layers of carbon atoms arranged in a hexagonal lattice. During charging, lithium ions are inserted into the spaces between the graphite layers, and during discharging, they are extracted.

In some embodiments, the anode active material may include silicon, which may be useful for lithium-ion storage. Other non-limiting examples of anode active material include metal oxides, such as tin oxide ($SnO_2$), titanium dioxide ($TiO_2$), and manganese oxide ($MnO_2$). In addition to, or in the alternative, organic materials, including various carbon-based compounds and conductive polymers, may be used as anode materials. Desired properties for such anode active materials include capacity, voltage profile, and stability.

The capacity of an anode material refers to the amount of electrical charge it can store and release. The voltage profile of the anode material indicates the voltage at which it operates during charging and discharging. In some embodiments, the voltage profiles of the anode and cathode materials should match to ensure the overall performance of the battery. Anode materials must maintain their structural integrity and electrochemical stability during repeated charge and discharge cycles.

In some embodiments, the rechargeable cell includes an electrolyte capable of carrying Li-ions between the anode and the cathode. An electrolyte refers to a substance or medium that allows the flow of electrically charged particles, called ions, between the battery's anode and cathode electrodes. The electrolyte acts as a conductor for these ions while providing the necessary environment for the electrochemical reactions that occur within the battery. An electrolyte is considered capable of carrying Li-ions between the anode and the cathode if it has an ionic capability to conduct lithium ions. In some embodiments, the electrolyte facilitates the movement of lithium ions between the cathode and anode electrodes during charge and discharge cycles. The electrolyte acts as a medium for ion transport and provides the necessary ionic conductivity for the battery's electrochemical reactions. The electrolyte in a Li-ion battery is typically a solution or mixture containing lithium salts dissolved in an organic solvent. Non-limiting examples of lithium salts that can be used in some embodiments include: lithium hexafluorophosphate ($LiPF_6$), $LiBF_4$, lithium bis (oxalato)borate, $LiN(CF_3SO_2)_2$, $LiN(C_2F_5SO_2)_2$, $LiAsF_6$, $LiC(CF_3SO_2)_3$, lithium perchlorate ($LiClO_4$), and lithium bis(trifluoromethanesulfonyl)imide (LiTFSI) or combinations thereof. The described lithium salts may be used in combination with at least one additive for improving a lifetime of the battery cell.

In some embodiments, the rechargeable battery cell includes a separator, such as a dielectric or hydrophilic separator located between the anode and cathode. A dielectric separator refers to a separator that electrically insulates the positive electrode (cathode) from the negative electrode (anode), while allowing ionic conductivity therebetween. Dielectric properties determine the separator's ability to prevent electrical conductivity between the electrodes. A separator with high dielectric strength effectively isolates the electrodes, minimizing the risk of short circuits and ensuring safe battery operation.

In some embodiments, the rechargeable battery cell includes a hydrophilic separator located between the anode and cathode. A hydrophilic separator refers to a material for disposal between an anode and a cathode to electrically insulate the anode from the cathode, as described, and that has an affinity for water or moisture, allowing the separator to absorb and retain some liquid electrolyte. The hydrophilic nature of the separator helps facilitate ion flow between the positive and negative electrodes while preventing physical contact between them.

The hydrophilic nature of the separator may help in retaining the liquid electrolyte within the battery. This ensures that there is enough electrolyte to enable the ion transport between the electrodes. Additionally, it may help to maintain the separator's integrity and performance over the battery's lifespan.

In some embodiments, the hydrophilic separator assists in the thermal management of the battery. For example, in some embodiments, in the event of overheating, the hydrophilic separator can absorb and distribute heat, contributing to the safety of the battery. In some embodiments, the hydrophilic properties can be achieved by several methods.

Hydrophilic properties can be added to battery separators disclosed herein through various methods and materials. These methods are designed to enhance the separator's affinity for water or moisture, ensuring it can effectively manage the liquid electrolyte and maintain ion transport. For example, hydrophilicity may be achieved by (a) surface modification; (b) use of additives; (c) material or polymer selection, including cross-linking of polymer layer; or (d) by the separator structure itself, such as its porosity.

Surface modification involves treating the separator material's surface with hydrophilic agents or coatings. In some embodiments, these agents might include surfactants, polymers, or chemicals that have hydrophilic properties. When applied to the separator's surface, they can attract and retain the electrolyte's solvents, allowing for improved wetting and ion conduction. For example, in one embodiment, by treating the separator's surface with hydrophilic agents or coatings, the separator can be made more wett by the electrolyte.

In some embodiments, hydrophilic additives can be blended with the separator material during its manufacturing process. These additives may be in the form of nanoparticles, fibers, or other structures that have inherent hydrophilic properties. For example, adding nanoscale silica particles or cellulose fibers to the separator material can enhance its hydrophilic nature.

In some embodiments, the choice of polymer material for the separator can influence its hydrophilic properties. Some polymer materials inherently have hydrophilic characteristics. Polyethylene oxide (PEO), for instance, is known for its hydrophilic nature and is used in some separator formulations.

In some embodiments, the separator's porosity can also impact its hydrophilic properties. A highly porous separator with interconnected pores can facilitate the retention of liquid electrolyte and promote ion transport. The size and distribution of these pores can be tailored to enhance hydrophilicity.

In some embodiments, physical treatment can be used to impart hydrophilic properties to the separator. Techniques like plasma treatment or corona discharge may be used to alter the surface chemistry of the separator material, making it more receptive to electrolyte.

In some embodiments, chemical treatment can be used to impart hydrophilic properties to the separator. Chemical functionalization may involve introducing specific functional groups to the separator material, making it more hydrophilic. For example, the addition of hydroxyl (—OH) or carboxyl (—COOH) groups can increase the material's affinity for water.

In some embodiments, coating the separator with hydrophilic materials can be used to impart hydrophilic properties to the separator. Thin hydrophilic layers can be applied to the separator's surface using methods such as spray coating or chemical vapor deposition.

In some embodiments, the separator thickness for a lithium-ion cell depends on a number of factors, including the cell's chemistry, its intended application, and its cost. In general, however, thinner separators are used for their improved rate performance. The separator thickness in a lithium-ion cell has a number of influences on the cell's performance, including rate performance, dendrite growth and electrochemical stability.

Regarding rate performance, generally thinner separators allow for faster ion transport, which can improve the cell's rate performance. This is because the thinner separator offers less resistance to the flow of ions.

Regarding dendrite growth, thicker separators can help to suppress dendrite growth. This is because the thicker separator provides a larger barrier to the growth of dendrites. Dendrite growth is a major cause of cell failure, so thicker separators can help to improve the cell's lifespan.

Regarding electrochemical stability, thicker separators can help to improve the electrochemical stability of the cell. This is because the thicker separator provides a more robust barrier to the migration of electrons. Electron migration can lead to cell failure, so thicker separators can help to improve the cell's safety.

In some embodiments, the separator between the anode and the cathode is ultra-thin, meaning having a thickness of less than 20 microns, such as between 9 and 16 microns. Despite its thinness, the separator has dielectric properties and electrically insulates the electrodes from each other while allowing the passage ions (in the instantly discussed embodiment, lithium ions) during the battery's operation. In some embodiments, the separator may include any thin, porous, and insulating material that prevents direct contact between the cathode and anode, thereby preventing short circuits and minimizing the risk of internal damage or thermal runaway. The separator's porous nature may allow the transport of lithium ions while hindering the passage of electrons, ensuring proper functioning and safety of the battery. In some embodiments, the dielectric separator has a porosity of at least 38%, such as at least 40%, or even at least 45%.

While separators prevent the flow of electrons, they should allow the passage of ions, such as lithium ions. Dielectric properties influence the material's ability to facilitate ion conduction. The separator's porosity, tortuosity, and ionic conductivity are some of the non-limiting factors in maintaining efficient ion transport between the electrodes.

In some disclosed embodiments, the separator includes a high ionic conductivity material to facilitate the movement of lithium ions between the cathode and anode during charge and discharge cycles. Ionic conductivity is a measure of how well ions (i.e., electrically charged particles) can move within a material when an electric field is applied. A high ionic conductivity material is a substance that has the ability to efficiently conduct ions through its structure. The unit of measurement for ionic conductivity is siemens per meter (S/m) in the International System of Units (SI). High ionic conductivity enables efficient ion transport and promotes battery performance. In some embodiments, the separator possesses sufficient mechanical strength to withstand the assembly process and the expansion and contraction of the electrodes during battery operation while maintaining its integrity and preventing electrode-to-electrode contact even under typical mechanical stress. In an embodiment, the separator exhibits thermal stability and resistance to heat to prevent thermal runaway and maintain the separator's functionality and be chemically stable to prevent reactions with the battery's electrolyte or other electrode materials.

Various materials that meet the foregoing properties that may be used for the separator include a polymer film, or other appropriate materials that offer good mechanical strength, high thermal stability, and chemical resistance. Non-limiting examples of the polymer film include a polyolefin film and various types of cellulose (e.g., $(C_6H_{10}O_5)_n$) derivatives. The polyolefin film may include a material such as polyethylene (PE), or polypropylene (PP). In some embodiments, the polyolefin polymer separator has a porosity above 40%. The cellulose derivatives are mainly classified into cellulose esters and cellulose ethers, although mixed ethers could also be found. Non-limiting examples of such mixed ethers include methylcarboxymethyl cellulose (MCMC) and hydroxyethylcarboxymethyl cellulose (HECMC) among others.

In some embodiments, the separator may be coated or modified with additives to improve performance, such as enhancing wettability or enhancing resistance to dendrite formation. For example, in some embodiments, the separator may be coated or modified with one or more wetting agents (also referred to as "surfactants") to improve its wettability or electrolyte uptake. These additives help the separator absorb and distribute the electrolyte more effectively, ensuring uniform ion transport and reducing the risk of dry spots or concentration gradients. Improved wettability enhances battery performance by enhancing ion conductivity and reducing internal resistance.

Additionally or alternatively, the separator may be coated or modified with one or more dendrite-resistant coatings or layers on one or both sides. One challenge in Li-ion batteries is the formation of dendrites—filament-like structures that can grow from the surface of the anode and penetrate the separator, potentially leading to short circuits or reduced battery performance. To mitigate dendrite formation, the separator can be coated with materials that possess dendrite-inhibiting properties. These coatings can be polymer-based or inorganic materials, and act as a physical or chemical barrier to hinder dendrite growth. Non-limiting examples of dendrite-resistant coatings include polymers, such as polyvinylidene fluoride (PVDF) or ceramic materials like aluminum oxide ($Al_2O_3$), Boehmite-based (AlO(OH)), aramid layer, BaSO4, or magnesium oxide (MgO). Combinations of these dendrite-resistant coatings may also be used in some embodiments.

In some embodiments, a combination of polymer and ceramic materials may also be used as a separator, such as in a multilayer structure. In some embodiments, a multilayer structure may include at least one polymer layer and at least one ceramic layer. In some embodiments, when the separator has multiple layers, and at least one of the multiple layers includes a ceramic material, the separator may be configured such that the ceramic material faces the cathode or the anode, or both.

As used herein, the term "interface" refers to the boundary between two phases of matter. In the case of a lithium-ion battery, the interface is the boundary between the electrolyte and the electrode. The interface is a two-dimensional region where the properties of the electrolyte and the electrode are not the same.

As used herein, the term "interphase" is a thin layer that is formed at the interface between two phases of matter. The interphase is a three-dimensional region that has properties that are different from the properties of either of the two phases. In a lithium-ion battery, the interphase is the solid electrolyte interphase (SEI). The SEI is a thin layer of solid material that is formed at the interface between the electrolyte and the anode. The SEI is formed by the decomposition of the electrolyte at the anode. The SEI serves to protect the anode from further decomposition of the electrolyte and to improve the electrochemical performance of the battery.

In some embodiments, the anode and the cathode include an interface. The interface between the anode and the cathode facilitates the reversible electrochemical reactions during charge and discharge cycles. This interface may often be referred to as the "electrolyte-electrode interface" or simply the "electrode interface." In some embodiments, the anode is typically coated with a thin layer of solid-electrolyte interface (SEI) mainly during the initial charging cycles. The SEI forms due to the electrolyte decomposition on the anode's surface and acts as a protective layer. It helps control the reactions at the anode-electrolyte interface and prevents further electrolyte decomposition. During charging, the reactions at the electrode interface are reversed. Lithium ions or other charge carriers are extracted from the cathode and inserted back into the anode. The SEI layer on the anode can also undergo reversible changes during this process. The quality and stability of the electrode interface are crucial for the performance and lifespan of a rechargeable battery. If the interface degrades over time, it can lead to capacity loss, increased internal resistance, and reduced overall battery efficiency.

In some embodiments, volumetric changes at the electrode interface during charging and discharging in rechargeable battery cells can lead to mechanical stress, cracking, and degradation of the electrode structure, which can ultimately result in reduced battery performance and cycle life. To address such issues, in some embodiments, the interface between the anode and the cathode may be pressurized in an amount sufficient to manage volumetric changes during charging and discharging processes. In some embodiments, the amount of pressure sufficient to manage volumetric changes is defined as an amount that maintains porosity of the porous structure of the anode. In some embodiments, this pressure helps to ensure that the lithium ions can move freely through the electrolyte and reach the electrode surfaces. If the pressure is too low, the anode may collapse, and the lithium ions will not be able to reach the active material. Alternatively, if the pressure is too high, the anode will swell and the lithium ions will be trapped in the pores.

In some embodiments, the amount of pressure that maintains porosity of the porous structure is less than 2 Atm. In some embodiments, the pressure is less than 1 Atm. In some embodiments, the amount of pressure sufficient to manage volumetric changes is determined based on a cell capacity relative to dimension of the case which encompasses the battery cell.

In some embodiments, pressure can be applied to the cell in any of the following modes: constant pressure, constant gap, and changeable pressure and/or gap. In the constant pressure mode, the pressure is maintained at a substantially constant level throughout the formation, charge, discharge, and rest/storage cycles.

In the constant gap mode, the gap between the electrodes is maintained at a substantially constant level throughout the formation, charge, discharge, and rest/storage cycles. This pressure is typically a result of various factors related to the physical and chemical processes occurring within the battery. For example, during the charge and discharge cycles of a Li-ion battery, lithium ions are intercalated into and de-intercalated from the electrodes (anode and cathode). This process leads to volume changes in the electrode materials. As lithium ions move in and out, the electrode materials may expand and contract. If the gap between the electrodes remains constant, this volume change can exert mechanical pressure on the battery.

As a result of chemical reactions within the battery, some gas evolution can occur, such as the release of oxygen and hydrogen during overcharge conditions. A constant gap between the electrodes can lead to a build-up of internal pressure as gases are generated and trapped within the sealed battery.

In addition, during the charge and discharge cycles, the battery may experience temperature changes due to resistive heating. These temperature fluctuations can cause the various components within the battery, including the electrodes and the separator, to expand and contract. A constant gap between the electrodes can exacerbate these thermal expansion effects and lead to increased internal pressure. For example, changes in temperature and pressure can affect the behavior of the electrolyte, potentially causing it to expand or contract. This, in turn, can influence the overall pressure within the battery.

In the changeable pressure and/or gap mode, the pressure and/or gap can change linearly or non-linearly according to the state of charge of the cell, the cell's temperature, the cell's thickness, or any combination of these conditions.

As explained above, in some embodiments, the applied pressure can be applied during any or all of the following stages:

Formation: This is the first cycle or set of cycles that the cell undergoes after it is manufactured. The formation process helps to create a stable and uniform layer of electrolyte between the electrodes.

Charge: This is the process of adding energy to the cell.

Discharge: This is the process of removing energy from the cell.

Rest/storage: This is the period of time when the cell is not being used.

The specific mode of applied pressure and the timing of the application will depend on the specific design of the battery and the desired performance characteristics. For example, in some embodiments, the pressure can be applied on a pouch cell as well as on a hard-cased prismatic cell.

Applied pressure helps to prevent mechanical damage to the anode during charging, when it expands, and during discharging, when it contracts. The pressure also helps to keep the anode particles in close contact with each other, which improves the electrochemical performance of the cell. Additionally, the pressure helps to maintain a close contact between the anode, separator, and cathode, which reduces the electrical resistance of the cell.

Non-limiting examples of the potential benefits of applied pressure in lithium-ion batteries include: reduced mechanical damage, improved contact between electrodes, and reduced electrical resistance.

Regarding the potential benefit of reduced mechanical damage, the anode in a lithium-ion battery expands during charging and contracts during discharging. This expansion and contraction can cause mechanical damage to the anode, such as cracking or delamination. Applied pressure helps to prevent this damage by holding the anode particles in place.

Regarding the potential benefit of improved contact between electrodes, the anode, separator, and cathode are the three main components of a typical lithium-ion battery. The electrodes are separated by the separator. Applied pressure helps to maintain a close contact between the electrodes, which improves the electrochemical performance of the cell. This is because the close contact between the electrodes allows for more efficient electron transfer.

Regarding the potential benefit of reduced electrical resistance, the electrical resistance of a lithium-ion battery is the opposition to the flow of electrical current through the cell. Applied pressure helps to reduce the electrical resistance of the cell by maintaining a close contact between the electrodes and by preventing the formation of dendrites, which are needle-like growths of metal that can short-circuit the cell.

In some embodiments, pressurization of the interface between the anode and the cathode may be used in addition to one or more other strategies that help to manage volumetric changes during charging and discharging processes. For example, the electrodes can be modified, as described herein, to accommodate the expansion and contraction of active materials during charge and discharge cycles. In some embodiments, the structure, porosity, and composition of the electrodes, as well as the electrode additives, can be used to enhance the mechanical properties and flexibility of the electrode. In some embodiments, such additives can help alleviate the stress caused by volumetric changes.

Additionally or alternatively, the choice of electrolyte can also impact volumetric changes. Certain electrolyte additives or formulations can form stable and protective solid-electrolyte interface (SEI) layers on the electrode surface. A stable SEI layer can reduce side reactions and mitigate volumetric changes during cycling.

Figure 15:
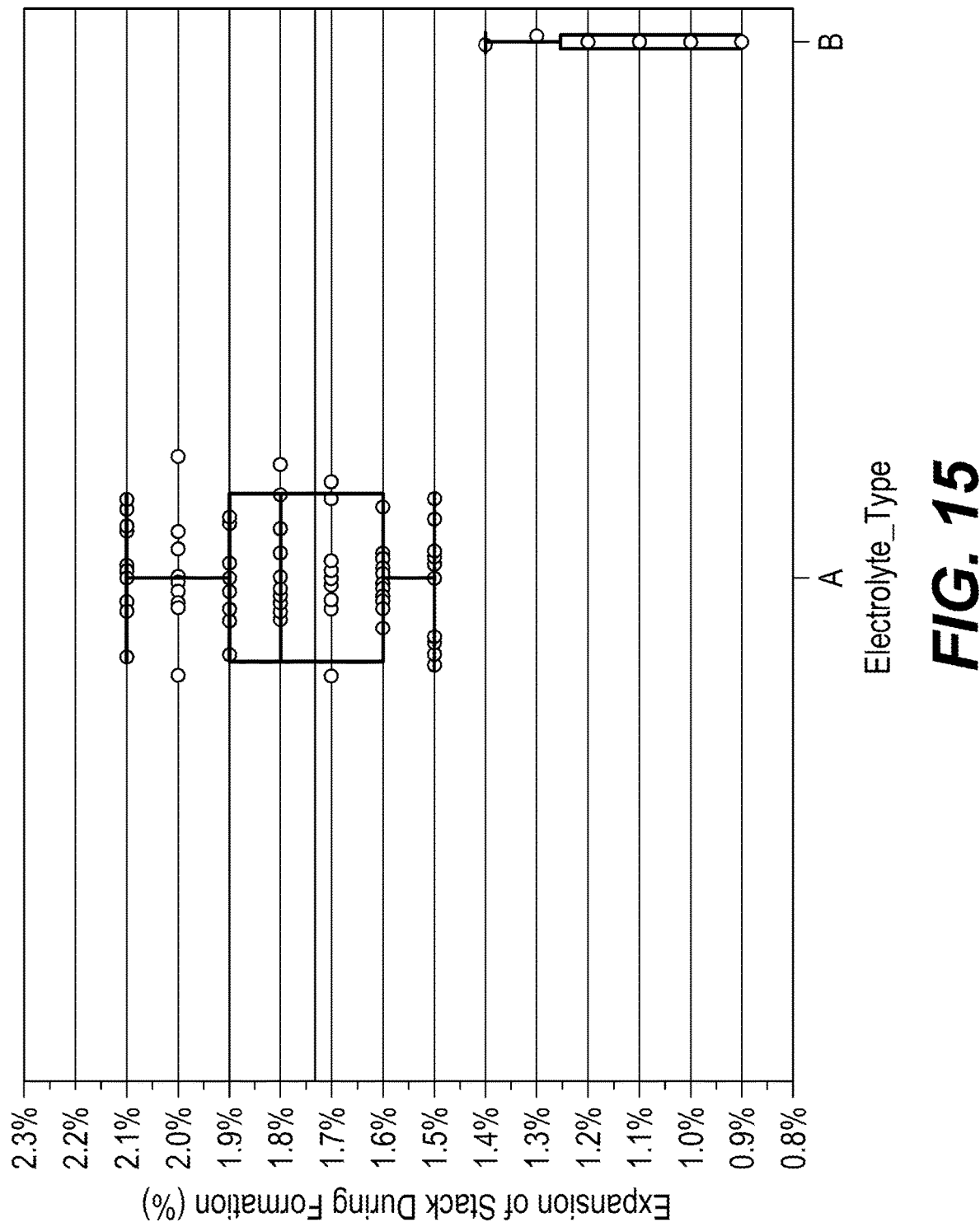
FIG. 15 is a graph showing measured and calculated expansion of stack thickness, without laminate housing, when the only difference was the type of electrolytes used.

Electrolyte additives or formulations that promote the formation of a stable and protective SEI layer can effectively mitigate cycle-induced volume changes and enhance battery longevity. In some embodiments, various electrolyte additives have demonstrated promising results in improving SEI stability and reducing volumetric changes. These additives typically include lithium salts, organic compounds, and inorganic nanoparticles. FIG. 15 provides a graph representation that demonstrates the effect of electrolyte type on expansion during formation.

As discussed in more detail below, charging and discharging protocols can be optimized to mitigate the impact of volumetric changes and reduce the stress on the electrode interface.

In some embodiments, the anode, cathode and separator are configured to cooperate to provide an average discharge voltage of no greater than 3.55V. In some embodiments, the anode and the cathode are configured to cooperate to provide an lower cutoff voltage of no less than 2.5V. In some embodiments, the average discharge voltage range, or the stable and usable voltage output that the battery can deliver during its discharge cycle, is between 2.5V and 3.55V. In some embodiments, the average discharge voltage range, or the stable and usable voltage output that the battery can deliver during its discharge cycle, is between 2.5V and 4.3V, defined by lower and upper cutoff, respectively. The usable range for average discharge voltage in a rechargeable battery refers to the voltage window within which the battery can reliably deliver electrical energy while maintaining its intended performance and safety characteristics. In some embodiments, the discharge voltage stays within this range for to achieve optimal performance, safety, and longevity. Allowing the battery voltage to drop below the lower limit of the usable range can cause irreversible damage, reducing battery capacity and potentially rendering it unusable. In contrast, charging the battery above the upper limit of the usable range can lead to gas generation, thermal runaway, and safety hazards. Operating a battery at the extreme ends of the usable range can result in reduced energy storage capacity and a decline in overall battery performance.

In some embodiments, the rechargeable battery cell includes one or more binders. In some embodiments, the binder is found in an amount sufficient for holding the active electrode materials (e.g., cathode or anode materials) together. The binder may also adhere the electrodes to the current collector (if present) while allowing for the flow of ions and electrons during charge and discharge cycles.

In some embodiments, the binder is made of a halogenated compound, which may be present in an amount of less than 20% by weight of the battery cell. In some embodiments, the halogenated binder may be present in an amount of between 4-10% by weight of the battery cell. In some embodiments, the halogenated binder is made of polyvinylidene fluoride (PVDF). The binder may include PVDF in combination with another fluorinated monomer, such as hexafluoropropylene (HFP). For example, in some embodiments, the binder may include a co-polymer of polyvinylidene fluoride-co-hexafluoropropylene (PVDF-HFP) or a modified PVD.

In some embodiments, a modified PVDF substitutes for one or more of the functional groups on the backbone of the polymer. For example, in some embodiments, some of the protons (H) or fluorine (F) are substituted with fluorine (F), chlorides (Cl), hydroxyl (OH).

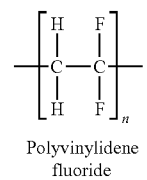

Polyvinylidene fluoride

In addition, as described above, in some embodiments, a copolymer of PVDF may also be used with another polymer type to form different types of copolymers, such as block or graft copolymers.

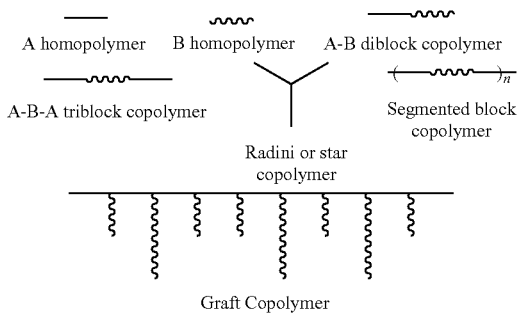

One non-limiting benefit of using block copolymers, is that it allows binder properties (such as Tg, Tm, rheology, adhesion, chemical properties) to be manipulated or tuned to a desired value.

PVDF-HFP is a copolymer that takes advantage of the specific properties of each polyvinylidene fluoride (PVDF) and hexafluoropropylene (HFP). For example, PVDF exhibits chemical resistance, thermal stability, and electrical insulating properties. In addition to these properties, PVDF may be used as a binder due to its adhesion characteristics. PVDF helps hold the active electrode materials together and attach them to the current collector in the battery. It also provides mechanical stability and helps maintain the structural integrity of the electrode during charge and discharge cycles.

HFP is another fluorinated monomer that may be employed to contribute to flexibility and low-temperature performance of the copolymer. HFP contributes to the overall flexibility and elasticity of the binder, which may be instrumental in applications where the battery undergoes mechanical stress or temperature variations.

The combination of PVDF and HFP in a copolymer, such as PVDF-HFP, results in a binder material that offers a balance of adhesion, flexibility, and low-temperature performance. These properties make it suitable for use in battery applications where the battery may experience mechanical stress, temperature fluctuations, and repeated charge/discharge cycles.

In some manufacturing embodiments, PVDF-HFP may be dissolved in a solvent, such as N-methyl-2-pyrrolidone (NMP), to create a binder solution, which is then mixed with active electrode materials (such as lithium cobalt oxide or graphite) to form an electrode slurry. This slurry is coated onto the current collector, dried, and compressed to create the battery electrode.

While the foregoing description focuses on an embodiment made of a PVDF-HFP copolymer, other binders may be used in the described rechargeable battery cell if they achieve similar characteristics. Such characteristics include an electronic conductivity that allows the flow of electrons between the active material particles and the current collector. This ensures efficient charge and discharge processes.

In addition, binders need to be flexible to accommodate the expansion and contraction of the electrode materials during cycling. This flexibility helps prevent the detachment of active materials from the current collector, which can lead to capacity loss or electrode degradation.

Binders should be chemically stable in the battery's operating environment and not undergo significant degradation during cycling. This stability helps maintain the long-term performance and safety of the battery.

In some embodiments, the rechargeable battery cell includes one or more polymer-based dispersants, such as in an amount less than 2% by weight, wherein the polymer-based dispersant includes polymer chains between 10,000 and 50,000 g/mol. Polymer-based dispersants improve the dispersion and stability of the active materials, such as lithium-ion cathode or anode materials, within the electrode slurry. A well-dispersed electrode slurry helps achieve uniform and consistent coatings on the current collector, which, in turn, leads to enhanced battery performance.

Dispersants also help stabilize the dispersion of active materials over time. This can be instrumental when slurry formulations sit for some time before being used in the electrode coating process. Without proper stabilization, the materials may settle or agglomerate, leading to inconsistency in electrode quality.

In some embodiments, the polymer-based dispersants may include polyelectrolytes. Polyelectrolytes are polymers with charged functional groups that can interact with the charged surfaces of particles, preventing them from aggregating. Examples include polyacrylic acid (PAA) and poly(sodium 4-styrenesulfonate) (PSS).

In some embodiments, the polymer-based dispersants may include polymeric surfactants. These are polymers with amphiphilic properties, meaning they have both hydrophobic and hydrophilic regions. They can stabilize the dispersion of particles by forming a protective layer around them. Polyvinyl alcohol (PVA) is an example of a polymeric surfactant.

In one embodiment, the anode includes active material in an amount ranging from 86-94% and conductive additives in an amount ranging from 0-2% by weight.

FIG. 1(a) illustrates a schematic cross-sectional view of a rechargeable battery cell 100 consistent with some embodiments of the present disclosure. In general, rechargeable battery cell 100 includes an anode electrode structure 120, a cathode electrode structure 140 and a porous separator 130 located between the anode electrode structure 120 and the cathode electrode structure 140.

Figure 1B:
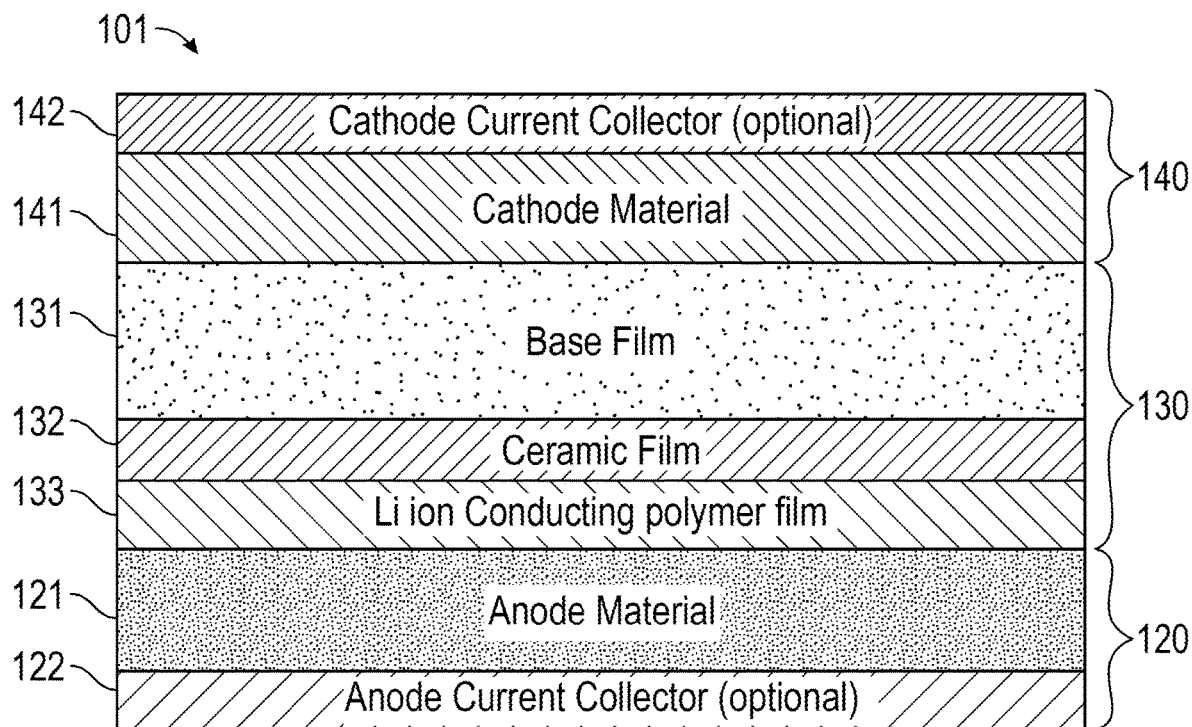

FIG. 1(b) illustrates a schematic cross-sectional view of a rechargeable battery cell 101 consistent with some embodiments of the present disclosure. The rechargeable battery cell 101 is made of an anode electrode structure 120, that includes an anode material 121, and a cathode electrode structure 140 that includes a cathode material 141. In some embodiments, a porous separator 130, that includes a base film 131, may be located between the anode electrode structure 120 and the cathode electrode structure 140.

Figure 1C:
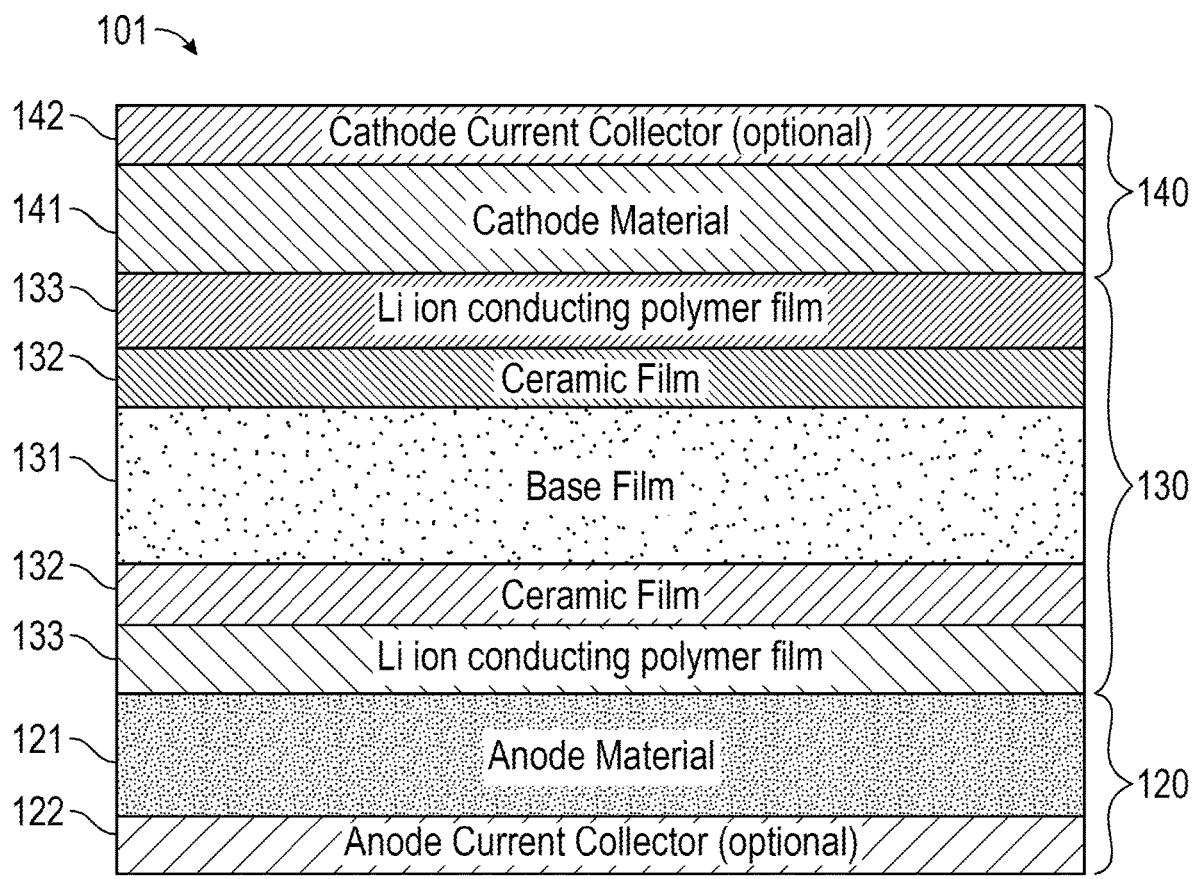

In some embodiments, such as shown in FIG. 1(c), one or both sides of the separator 130 may also include a ceramic film 132.

Figure 1D:
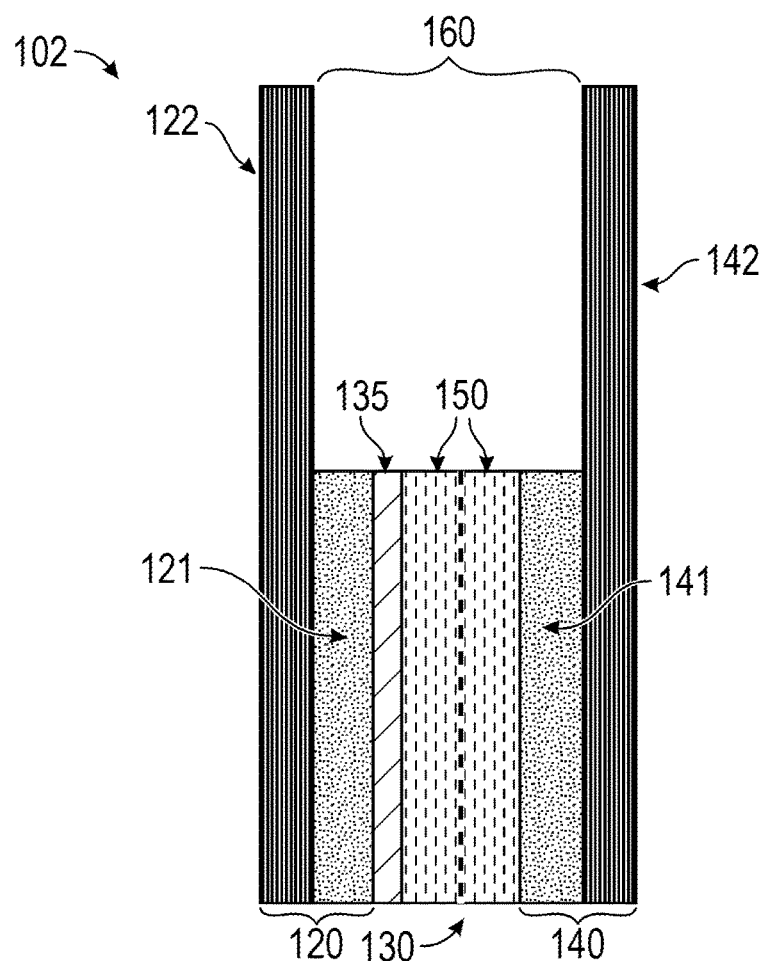

FIG. 1(d) illustrates a schematic cross-sectional view of a rechargeable battery cell 102 consistent with some embodiments of the present disclosure. Similar to FIG. 1(b), the rechargeable battery cell 102 shown in this figure is made of an anode electrode structure 120, that includes an anode material 121 and an anode current collector 122. The rechargeable battery cell 102 further includes a cathode electrode structure 140 including a cathode material 141 and a cathode current collector 142. In some embodiments, an ultrathin porous separator 130 is located between the anode electrode structure 120 and the cathode electrode structure 140. An electrolyte 150 surrounds the ultrathin porous separator and thus is located between the anode electrode structure 120 and the cathode electrode structure 140. The electrolyte material is one that acts as an ionic conductor (e.g., to allow the conduction of lithium ions) and an electronic insulator (to block the electrons through it during the charging and discharging process).

FIG. 1(*d*) shows a SEI (solid electrolyte interface) 135, which results from the decomposition of solvents in an electrolyte when the electrolyte comes into contact with the anode during formation process. This passivating SEI layer protects the electrode from the corrosion and further consumption of electrolyte. An effective SEI layer is typically a few nanometers thick and provides the battery with a good cycling ability by preventing further consumption of the electrolyte. An effective SEI layer also leads to improved battery operation and stability by virtue of a high ionic conductivity, thus allowing the lithium ions to flow to the electrodes. The SEI layer should also have excellent electronic insulating properties to block the direct contact of electrons from the electrode with electrolyte because contact causes degradation and reduction of electrolyte.

FIG. 1(*d*) further shows an interface between the anode and the cathode 160 that can be pressurized in an amount sufficient to manage volumetric changes during charging and discharging processes.

Consistent with some embodiments, the rechargeable battery cells 100, 101 and 102, may include an anode material 121 that includes a material compatible with the cathode material 141. For example, the anode material 121 may include a carbon material, such as carbon black or graphite. Other non-limiting examples of the material that can make up the anode material include silicon, silicon oxide, silicon nitride, silicon oxycarbide, a silicon-containing graphite, lithium metal, nickel, copper, tin, oxides or combinations thereof. In general, the anode material 121 may include intercalation compounds containing lithium or insertion compounds containing lithium.

Consistent with some embodiments, the rechargeable battery cells 100, 101 and 102, may include a cathode material 141 that includes a material compatible with the anode material 121. In some embodiments, the cathode material 141 may include an intercalation compound or an electrochemically active polymer. Non-limiting examples of intercalation materials include lithium-containing metal oxides, $MoS_2$, $FeS_2$, $BiF_3$, $Fe_2OF_4$, $MnO_2$, $TiS_2$, $NbSe_3$, $LiCoO_2$, $LiNiO_2$, $LiMnO_2$, $LiMn_2O_4$, $V_6O_{13}$ and $V_2O_5$. Non-limiting examples of electrochemically active polymers include polyacetylene, polypyrrole, polyaniline, and polythiophene. In some embodiments, the cathode material 141 may be made from a layered oxide, such as lithium cobalt oxide, an olivine, such as lithium iron phosphate, or a spinel, such as lithium manganese oxide and lithium nickel oxide.

In some disclosed embodiments, an anode electrode structure 120 may include a conductive current collector 122 integrally attached to the anode material 121. In some embodiments, a porous separator 130 has a base film 131. In some embodiments, either one or both sides of the base film 131 may also include a ceramic film 132. Similarly, in some embodiments, either one or both sides of the base film 131 may also include a Li-ion conducting polymer film 133. In some embodiments, the cathode material 141 may include a cathode current collector 142 on the surface of the cathode material 141.

In some embodiments, the current collectors 122 and 142, on the anode material 121 and cathode material 141, respectively, can be made of the same or different electrically conducting materials. Non-limiting examples of such electrically conducting materials that may be used as current collectors 122 and 142, include metals such as aluminum (Al), copper (Cu), zinc (Zn), nickel (Ni), cobalt (Co), manganese (Mn), chromium (Cr), alloys and combinations thereof. In some embodiments, the current collector may have a sheet resistance below 3 mOhm/sq.

In some embodiments, and as shown in FIG. 1(*d*), the current collectors 122 and 142 extend beyond the stack. See also FIG. 7(*a*) at 725 and 745, and FIG. 7(*b*) at 715 and 717. In some embodiments, the portions of the current collector 122 and 142 extending beyond the stack may be used as tabs for both the anode electrode structure 120 and the cathode electrode structure 140. For example, in some embodiments having a battery cell configuration that is cylindrical, the anode electrode structure 120 has one or more anode tabs, and the cathode electrode structure 140 has more cathode tabs. In other embodiments, each of the anode electrode structure 120 and the cathode electrode structure 140 have a continuous tab (not shown).

In some embodiments, anode tabs 122 and cathode tabs 142 serve to make electrical connections between the active electrode materials and the external circuit. In some embodiments, the anode tab includes a thin strip or foil typically made of a conductive material such as copper or aluminum. It may be attached to the anode current collector, such as described herein, which including a conductor such as metallic foil coated with the active anode material (e.g., graphite). In some embodiments, the anode tab extends from the current collector, providing a point of electrical contact for the anode.

In some embodiments, during battery assembly, the anode tab may be welded or bonded to the anode current collector, ensuring a secure and low-resistance connection. In some embodiments, the other end of the anode tab can be left exposed or bent to allow for subsequent electrical connections, such as via soldering or attachment to a battery terminal.

Similar to the anode tab, the cathode tab includes a conductor, such as a thin strip or foil made of a conductive material like aluminum or copper. In some embodiments, the cathode tab is attached to the cathode current collector, which may be a metallic foil coated with the active cathode material (e.g., lithium cobalt oxide, lithium iron phosphate). In some embodiments, the cathode tab extends from the current collector, providing a point of electrical contact for the cathode.

In some embodiments, during battery assembly, the cathode tab may be welded or bonded to the cathode current collector, ensuring a secure and low-resistance connection. In some embodiments, the other end of the cathode tab can be left exposed or bent for subsequent electrical connections, such as via soldering or attachment to a battery terminal.

The anode and cathode tabs play a role in the overall performance and reliability of the battery as they allow for efficient transfer of electrical current between the active electrode materials and the external circuit. Accordingly, it is beneficial for the tabs to have good electrical conductivity, mechanical strength, and resistance to corrosion to ensure long-term performance and stability of the battery.

Some disclosed embodiments may include anode current collectors 122 that are coated with a composite containing at least 30% Si by weight, such as at least 35% by weight or at least 40% by weight. Non-limiting examples of the Si material that may coat the conductive current collector are mixtures and/or composites of silicon-carbon (Si/C), silicon oxide-carbon (SiOx/C, wherein 0<x<2), SiN/C, and combination thereof.

In some embodiments, the anode current collector 122 includes a metal or a metal containing composition, such as a copper containing composition, the cathode current collector 142 includes a metal or a metal containing composition, such as an aluminum containing composition. In some embodiments, the described current collectors may include a metal deposited on a polymer material. For example, metallized PET (polyethylene terephthalate) current collectors. Sheet resistance for two sides for this kind of current collector will be less than 30 mOhm/sq.

Consistent with some embodiments, the rechargeable battery cells 100, 101 and 102 may include a porous separator 130 that includes a Li-ion conducting material 133, which may be in the form of a polymer film. Non-limiting examples of Li-ion conducting polymers that may be used to form the polymer film 133 include, polyvinylidene difluoride (PVDF), polyethylene oxide (PEO), polyacrylic acid (PAA), alginate, ethylene oxide (EO), polyacrylonitrile (PAN), polyether ether ketone (PEEK), carboxymethyl cellulose (CMC), styrene butadiene rubber (SBR) ionic liquids and combinations thereof.

Consistent with some embodiments, the rechargeable battery cells 100, 101 and 102, may include a porous separator 130 that is located between the anode electrode structure 120 and the cathode electrode structure 140. In some embodiments, the separator may be a porous polymeric substrate (e.g., a film) capable of conducting ions, such as a polyolefin polymer or/and various types of cellulose derivatives. In some embodiments, the porous polymeric substrate has a porosity of at least 38%, such as at least 40%. In some embodiments, the porous separator 130 may be made of a porous polymeric substrate having an average pore size in the range of 0.5 microns to 5 microns. In some embodiments, the porous polymeric substrate has a Gurley number below 300 s/100 mL, below 200 s/100 mL, below 200 s/100 mL, below 100 s/100 mL. Non-limiting examples of the material used to make the porous polymeric substrate are polyolefins such as polypropylene, polyethylene, various types of cellulose derivatives, or combinations thereof. A multilayer separator 130 may contain a combination of polyolefins layers, one or more ceramic layers, aramid layers, PVDF layers or combination of thereof. The base-film may consist of embedded ceramic particles. A base film 131 may be also made of cellulose, polyesters, such as PET.

Some disclosed embodiments may include a separator 130 that has multiple layers. In some embodiments, at least one of the multiple layers may include a ceramic material 132. Non-limiting examples of the ceramic material include aluminum oxide ($Al_2O_3$), Boehmite-based (AlO(OH)), aramid layer, $BaSO_4$, magnesium oxide (MgO) and combinations thereof. In some embodiments, the ceramic material includes AlOx, AlOxNy, aluminum oxyhydroxide AlO(OH), AlN (aluminum deposited in a nitrogen environment), calcium carbonate (CaCO3), titanium dioxide ($TiO_2$), niobium oxide ($Nb_2O_5$), $SiS_2$, $SiPO_4$, silicon oxide ($SiO_2$), zirconium oxide ($ZrO_2$), MgO, $TiO_2$, $Ta_2O_5$, $Nb_2O_5$, $LiAlO_2$, $LiNbO_3$, $LiTaO_3$, $Li_2NbO_3$, $BaTiO_3$, $BaSO_4$.

Some disclosed embodiments include an electrolyte that surrounds the anode electrode structure 120, the cathode electrode structure 140 and the ultra thin porous separator 130. In some embodiments, the electrolytes may be in the form of a liquid/gel or a solid polymer. In some embodiments, the electrolyte contains at least one Li salt and at least one additive for improving a lifetime of the battery cell. For example, in one embodiment, the Li salt is selected from a group consisting of $LiPF_6$, $LiBF_4$, lithium bis(oxalato)borate, $LiN(CF_3SO_2)_2$, $LiN(C_2F_5SO_2)_2$, $LiAsF_6$, LiC$(CF_3SO_2)_3$, $LiClO_4$, and LiTFSI or combinations thereof.

In some embodiments, the electrolyte further includes at least one additive for improving the lifetime of the battery cell. An additive is a substance that is added in small quantities to another substance or mixture to achieve a specific effect, enhance properties, or modify characteristics—in this instance, improving battery life. Non-limiting examples of such additives include ethylene carbonate (EC), dimethyl carbonate (DMC), diethyl carbonate (DEC), ethyl methyl carbonate (EMC), vinyl carbonate (VC), fluoroethylene carbonate (FEC), propane sultone (PS), or/and prop-1-ene-1,3-sultone (PES), as well as other functional additives such as water or/and acid scavengers, anti-flammable agents. In some embodiments, the electrolyte includes at least two of EC, VC, DMC, and FEC, propane sultone (PS), or/and prop-1-ene-1,3-sultone (PES), as well as other functional additives such as water or/and acid scavengers, and/or anti-flammable agents.

A number of contaminants and impurities located in the electrolyte can lead to the formation of unwanted byproducts, such as solid-electrolyte interphase (SEI) layers, which can reduce battery capacity and cycling stability. Contaminants can contribute to the development of internal shorts, which can pose safety risks by causing thermal runaway in the battery. As a result, in some embodiments, contaminants including water, chlorides and metallic impurities are kept to trace levels, such as in the part-per-million (ppm) range.

For example, the water content of the electrolyte in a lithium-ion (Li-ion) battery can affect the battery's performance, safety, and overall lifespan. Therefore, water is considered an impurity in Li-ion battery electrolytes because it can have detrimental effects on battery performance. For example, water can react with the lithium salt and form lithium hydroxide (LiOH) and other unwanted byproducts. These reactions can degrade the capacity and cycling performance of the battery.

In addition to the formation of lithium hydroxide, water, or a trace amount of moisture can also react with the lithium salt to form hydrofluoric acid (HF). HF is a highly corrosive and toxic gas that can damage the battery's components and cause safety hazards. The formation of HF can be accelerated by high temperatures and high current densities, which may lead to adverse effects in lithium-ion batteries, such as corrosion of the battery's components, such as the electrodes, separator, and current collectors, degradation of the battery's capacity and cycling performance, and safety hazards, such as gas generation and electrolyte leakage. In addition, HF can react with the SEI, and cause it to degrade, which may lead to increased capacity loss and reduced battery life. While HF can also have some beneficial effects on the SEI, such as helping to form a more LiF-rich SEI, which is more stable and protective, it is generally best to avoid HF contamination of lithium-ion batteries.

Water can promote corrosion of electrode materials, especially the anode (typically made of graphite or other carbon-based materials). This corrosion can lead to the formation of a solid electrolyte interphase (SEI) layer, which can reduce the battery's capacity and cycling stability. Water can also cause the decomposition of electrolyte components, leading to gas evolution and potential safety risks.

The presence of water in the electrolyte can also affect the battery's voltage and capacity. For example, water can increase the concentration of hydroxide ions (OH—) in the electrolyte, which can alter the redox reactions at the electrode surfaces. This can result in changes in the battery's open-circuit voltage and discharge capacity.

Water is a protic solvent and can facilitate internal short circuits within the battery, especially at high temperatures or during overcharging. This can lead to thermal runaway and, in extreme cases, battery fires or explosions. For at least these reasons, in some embodiments, the electrolyte has a water content of less than 20 ppm.

To mitigate or avoid the presence of water, in some embodiments, one or more water scavengers may be used. The following provides a non-limiting list of water scavengers that can be used in the lithium-ion batteries described herein:

Molecular sieves: Molecular sieves are porous materials that can trap water molecules. They are made of a variety of materials, including zeolites, alumina, and silica.

Organic drying agents: Organic drying agents are compounds that can absorb water molecules. They are typically made of amines or alcohols.

Inorganic drying agents: Inorganic drying agents are compounds that can absorb water molecules. They are typically made of metal oxides or hydroxides.

MOFs: Metal-organic frameworks (MOFs) are a type of porous material that can trap water molecules. They are made of metal ions and organic linkers.

Graphene oxide: Graphene oxide is a type of carbon material that can absorb water molecules.

The choice of water scavenger will depend on the specific application and the desired properties. For example, a molecular sieve may be a good choice for a battery that needs to be able to operate at high temperatures, while an organic drying agent may be a better choice for a battery that needs to be able to withstand chemical attack.

As some water scavengers can react with the electrolyte and form unwanted byproducts, a water scavenger should be selected that is compatible with the specific battery chemistry, does not react with the electrolyte or the battery components and does not degrade over time.

Another contaminant that is controlled in the claimed electrolyte is chloride. The chloride content in battery electrolytes, specifically lithium-ion (Li-ion) battery electrolytes, is generally kept at very low levels. Chloride ions (Cl—) are anionic species derived from chlorine (Cl), which is a highly reactive element. As a result, chloride ions can have detrimental effects on battery performance and safety.

Chloride ions can be corrosive and can promote the formation of solid electrolyte interphase (SEI) layers on the electrode surfaces. As described herein, the SEI is an important passivation layer that forms naturally in Li-ion batteries and protects the electrodes from further reaction with the electrolyte. Excessive chloride ions can disrupt this layer, leading to capacity fade and reduced cycle life.

Beyond performance considerations, chloride ions can also have safety implications in certain battery chemistries. For example, in some lithium metal battery systems, the presence of chloride ions can contribute to safety issues such as dendrite growth and internal short circuits, which could lead to thermal runaway. In some embodiments, the electrolyte contains chlorides in an amount less than 5 ppm.

Metal residue content in battery electrolytes refers to the presence of metallic impurities in the electrolyte solution. These metallic impurities can originate from various sources during the manufacturing process or from the degradation of battery components. The metal residue content is a factor in battery quality control and can have significant implications for battery performance, safety, and lifespan.

Metallic impurities can enter the electrolyte during the production of battery components, such as electrodes, separators, and current collectors. Contaminants can arise from the materials used, equipment, or even handling procedures during manufacturing.

The most common metal impurities in lithium-ion battery electrolytes are: Iron, Copper, Nickel, Lead and Aluminum. Iron is a common impurity in lithium-ion batteries because it is a component of the steel used to make the battery's casing and other components. Iron can also be introduced into the electrolyte during the manufacturing process by the use of iron tools or equipment. Copper is another common impurity in lithium-ion batteries because it is a component of the current collectors. Copper can also be introduced into the electrolyte during the manufacturing process by the use of copper tools or equipment. Nickel is a common impurity in lithium-ion batteries because it is a component of the cathode material. Nickel can also be introduced into the electrolyte during the manufacturing process by the use of nickel tools or equipment. Lead is a common impurity in lithium-ion batteries because it is a component of the solder used to join the battery's components. Lead can also be introduced into the electrolyte during the manufacturing process by the use of lead tools or equipment. Aluminum is a common impurity in lithium-ion batteries because it is a component of the separator. Aluminum can also be introduced into the electrolyte during the manufacturing process by the use of aluminum tools or equipment.

Each of these metal impurities can have a number of negative effects on lithium-ion batteries, such as reducing the battery's capacity and lifespan, increasing the battery's susceptibility to corrosion, promoting the growth of dendrites, which can lead to short circuits and battery failure, and triggering electrolyte decomposition, which can release toxic gases and cause safety hazards.

In addition to the metal impurities mentioned above, other metal impurities that can be found in lithium-ion battery electrolytes include Tin, Zinc, Magnesium, Manganese, Chromium, Cobalt, Vanadium, Molybdenum, Tungsten, Platinum, and Gold.

As a battery undergoes charge and discharge cycles, the electrodes can degrade over time. This degradation can release metal particles or ions into the electrolyte. For example, in lithium-ion batteries, the anode can release lithium metal particles. Metallic impurities can negatively impact battery performance and safety by promoting unwanted side reactions, altering electrode/electrolyte interfaces, and causing capacity fade. For example, metallic impurities can catalyze reactions that lead to the formation of unwanted byproducts, such as solid-electrolyte interphase (SEI) layers, which can reduce battery capacity and cycling stability. For these reasons, in some embodiments, the electrolyte contains metal residues in an amount less than 5 ppm.

In some embodiments, the electrolyte contains chlorides in an amount less than 5 ppm and metal residues in an amount less than 5 ppm.

The density of an electrolyte refers to its mass per unit volume and is typically expressed in grams per milliliter (g/mL). The density of an electrolyte is influenced by its chemical composition, including the type and concentration of lithium salts, solvents, and additives used. In some embodiments, the density of the liquid electrolyte in traditional Li-ion batteries is in the range of 0.95 to 1.35 grams per milliliter (g/mL) at room temperature. In some embodiments, electrolytes disclosed herein, such as ethylene carbonate (EC) and dimethyl carbonate (DMC) have densities around 1.2 g/mL.

Electrolyte conductivity measures the ability of the electrolyte to conduct electrical current by facilitating the movement of ions. In other words, electrolyte conductivity is a measure of the electrolyte's ability to carry electrical charge through the motion of ions (positively and negatively charged particles). In general, a higher ionic conductivity is generally desirable because it allows for faster ion transport, which can improve the battery's rate performance. However, a higher ionic conductivity can also make the electrolyte more corrosive and can increase the risk of dendrite growth.

The optimum ionic conductivity for a lithium-ion battery will depend on the specific application and the desired properties. For example, a battery that needs to be able to operate at high temperatures will require an electrolyte with a higher ionic conductivity than a battery that will be operated at room temperature.

Non-limiting factors that can affect the ionic conductivity of the electrolyte in lithium-ion batteries include: the electrolyte composition; the battery chemistry; and the operating conditions.

Regarding the electrolyte composition, the ionic conductivity of the electrolyte is determined by the type of solvent and salt that are used. Solvents with a higher dielectric constant tend to have a higher ionic conductivity. Salts with a higher charge density also tend to have a higher ionic conductivity.

The battery chemistry can also affect the ionic conductivity of the electrolyte. For example, batteries with a lithium-metal anode typically require an electrolyte with a higher ionic conductivity than batteries with a graphite anode.

The operating conditions, such as the temperature and the current density, can also affect the ionic conductivity of the electrolyte. Higher temperatures and higher current densities tend to increase the ionic conductivity. In some embodiments, the electrolyte exhibits an ionic conductivity [mS/cm] ranging from 2-25, such as 5-25 mS/cm2, 8-24 mS/cm2, such as 10-20 mS/cm2.

Figure 4C:
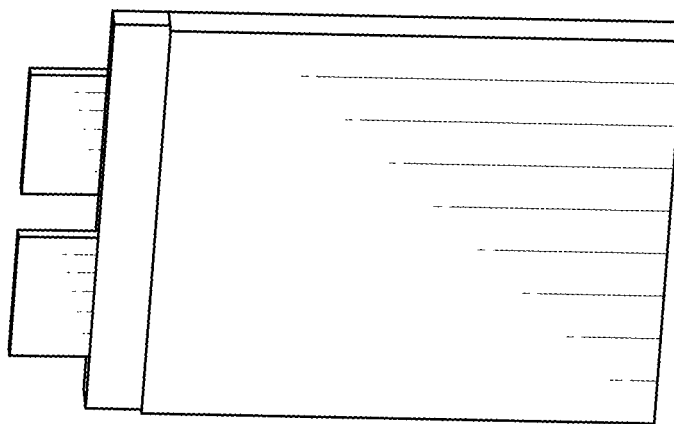
FIG. 4(c) is a representation of a pouch cell design consistent with some disclosed embodiments.
Figure 4B:
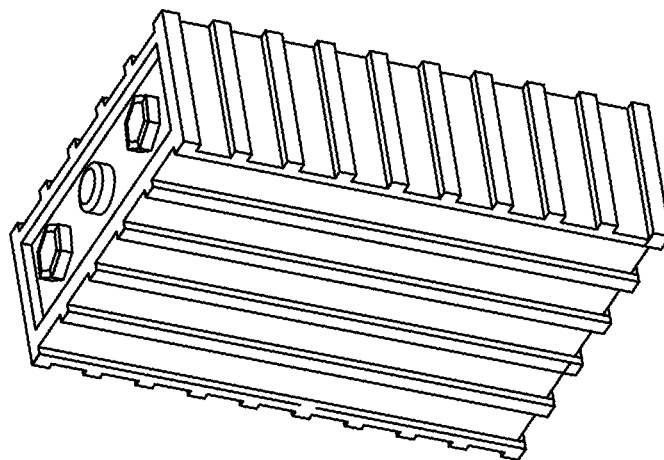
FIG. 4(b) is a representation of a prismatic cell design consistent with some disclosed embodiments.
Figure 4A:
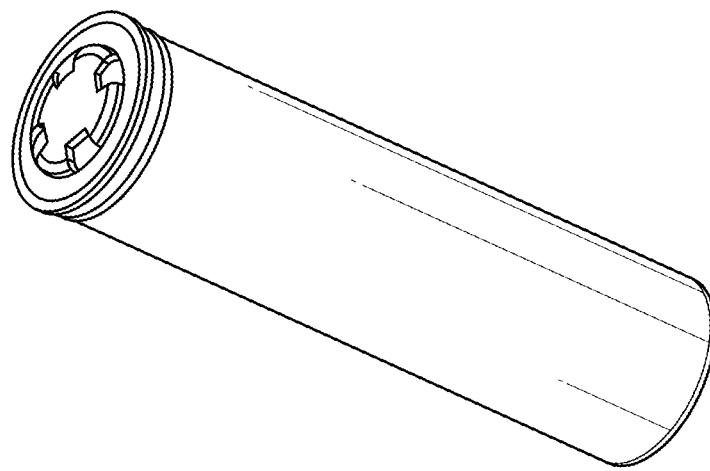
FIG. 4(a) is a representation of a cylindrical cell design consistent with some disclosed embodiments.

The rechargeable battery cells 100, 101 and 102 in FIG. 1(a), FIG. 1(b), and FIG. 1(d), respectively, are shown in two dimensions for illustrative purposes, but when constructed take on various three-dimensional shapes such as those shown by way of example in FIG. 4(a)-(c). Non-limiting examples of such configurations include a cylinder FIG. 4(a), prismatic FIG. 4(b), pouch/polymer FIG. 4(c), or stacked electrode configuration. The pouch/polymer configuration is attractive in electrical vehicles, portable devices, and other implementations due to a flexible and lightweight design. The flexible outer pouch or casing of pouch battery cells may be formed of any durable and non-corrosive insulator. The outer pouch may have a laminated structure made of layers of materials that provide structural support, protection, and electrical insulation. In some embodiments, the pouch material includes a combination of metalized films, such as aluminum or stainless steel, and polymer layers like polyethylene terephthalate (PET) or polypropylene, polyethylene, nylon or combination thereof polypropylene, polyethylene, nylon or combination thereof.

Figure 2:
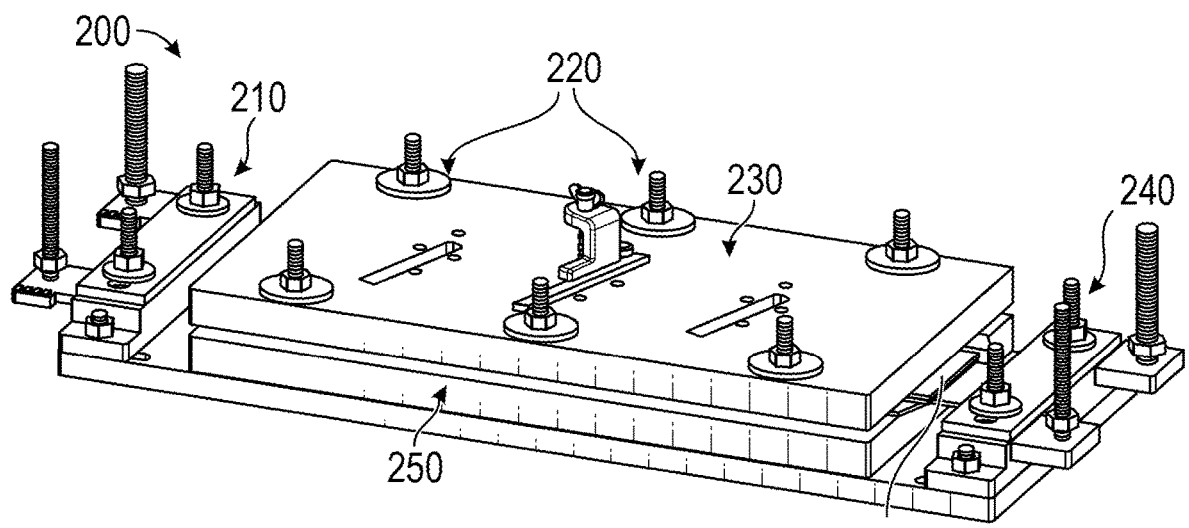
FIG. 2 is a schematic of pressure plates for use with a constant gap configuration to pressurize the interface between the anode and the cathode in an amount sufficient to manage volumetric changes during charging and discharging processes, according to some disclosed embodiments.

In some embodiments, the gap between the electrodes is maintained at a constant level throughout the formation, charge, discharge, and rest/storage cycles. A non-limiting illustration of this embodiment is provided in FIG. 2. This figure shows a configuration 200 that is set to harness the cell 260, such as a pouch cell, between an upper pressure plate 230 and a lower pressure plate 250 in a constant gap. The constant gap configuration that fixes a pouch cell 260 between two plates 230 and 250, is remained fixed by bolts 220. The configuration 200 further includes busbars for the cathode 210 and anode 240.

Figure 3A:
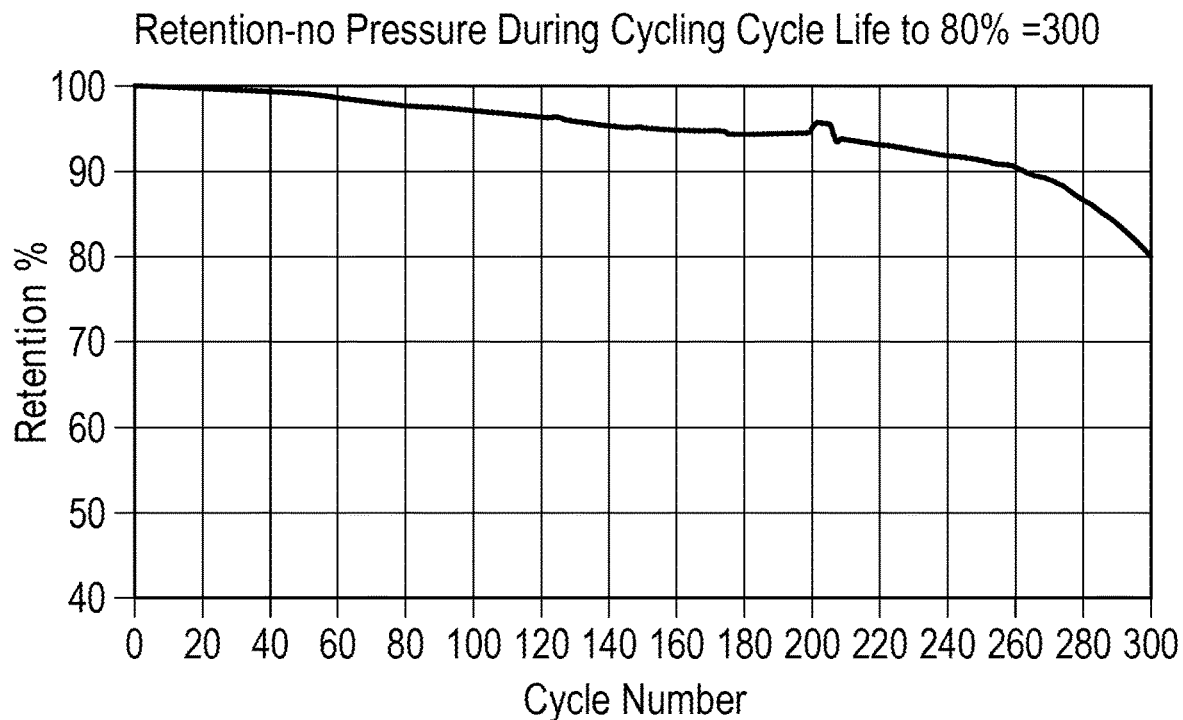
FIG. 3(a) is a graph showing capacity retention properties when no pressure is applied during cycling for cycle life to 80%=300.
Figure 3B:
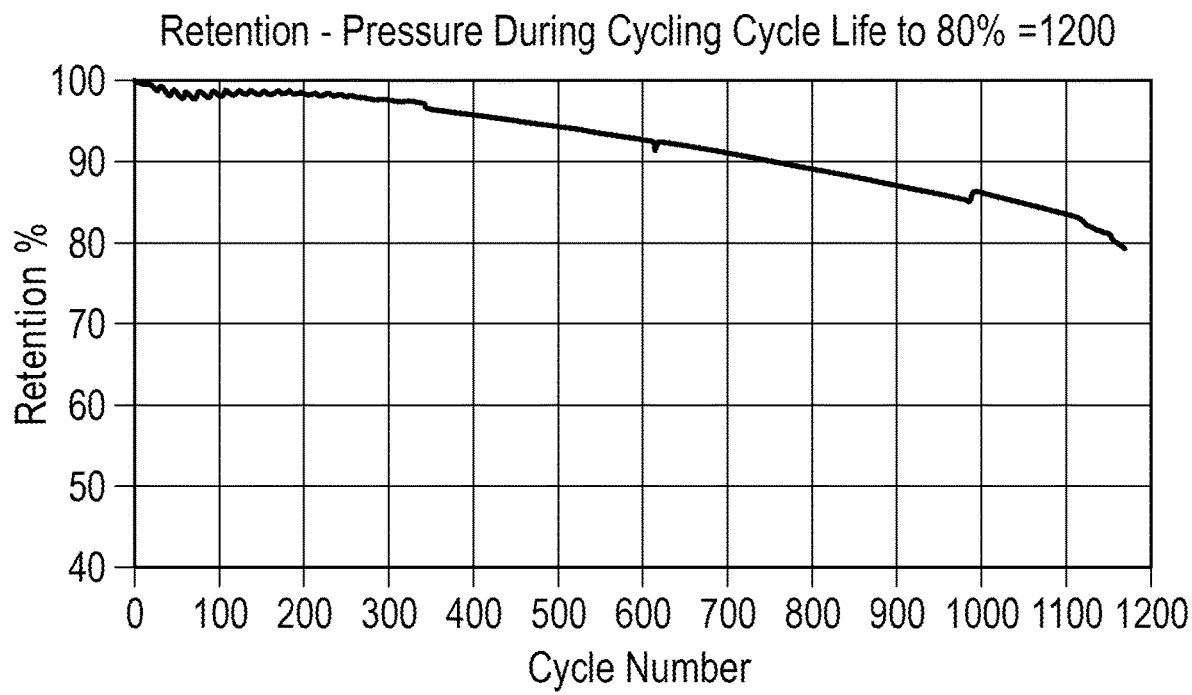
FIG. 3(b) is a graph showing capacity retention properties when pressure is applied during cycling for cycle life to 80%=1200.

FIG. 3(a) and FIG. 3(b), respectively, show how capacity retention properties change when no pressure is applied during cycling and when pressure is applied during cycling. Capacity retention in lithium-ion batteries refers to the ability of the battery to maintain its original storage capacity over time and through repeated charge-discharge cycles. The industry standard for capacity retention is 80%, meaning that after a certain number of cycles, the battery should still be able to store and deliver at least 80% of its initial capacity. As evident in FIG. 3(a), when no pressure is applied, at least 80% capacity retention is maintained up to 300 cycles. In contrast, as shown in FIG. 3(b), when pressure is applied, at least 80% capacity retention is maintained over 1100 cycles.

In some embodiments, the rechargeable battery cell configuration is in the form of a jellyroll. As used herein, a jellyroll (may also be described as "winded") configuration typically refers to an arrangement of internal components in a rolled-up structure to form a cylindrical battery. In this configuration, the anode, cathode, and separator are stacked and wound into a spiral or rolled-up structure, forming a compact cylindrical shape. This design can maximize the surface area available for chemical reactions, enhances the overall energy density, and allows efficient space utilization within the battery cell.

The jellyroll structure is encased in a cylindrical metal to provide structural support, house the components, and serve as the negative terminal of the battery. The positive terminal is typically connected to the cathode material within the jellyroll. In some embodiments, this design is favored for its ability to pack a significant amount of energy into a small space, making it suitable for applications where space is a critical factor.

In some embodiments, the rechargeable battery cell configuration is prismatic, and the anode, cathode, and separator are configured in a stack form, where individual sheets of anode and cathode electrodes are placed alternately with a separate separator sheet in between. In some embodiments, the stack form of a rechargeable battery cell may include a z-folded separator.

Figure 5B:
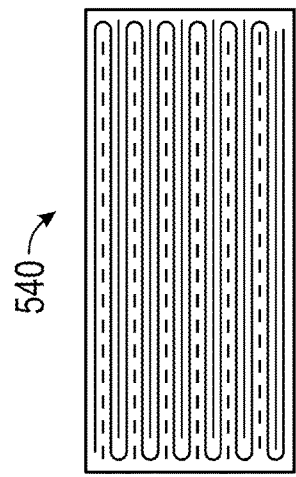
FIG. 5(b) is a cross-sectional illustration of the battery of FIG. 5(a) following assembly, consistent with some disclosed embodiments.
Figure 5A:
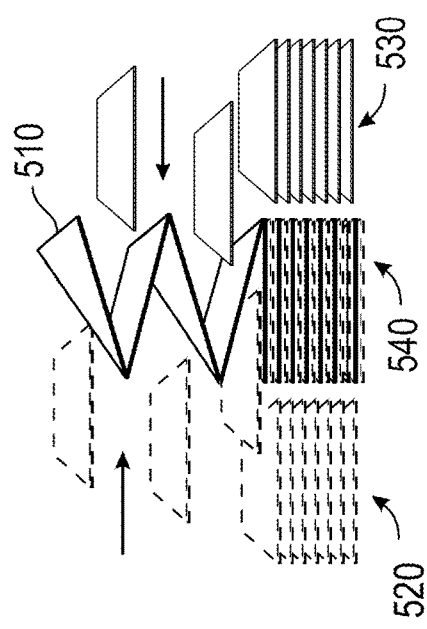
FIG. 5(a) is an illustration of a battery assembly process, consistent with some disclosed embodiments.

Z-folding is a technique where a separator is folded and/or stacked in a zigzag manner. This may minimize the stress of battery cells while preventing contact between anodes and cathodes. Folding of the separators in a zigzag or accordion-like pattern helps to maximize the surface area of the separator within the limited space of the battery, ensuring efficient ion flow and maintaining proper insulation between the electrodes. For example, folding the separator may increase its effective length, which allows for a longer path for lithium ions to travel during charging and discharging. This longer path can enhance the battery's energy and power density by enabling better electrode utilization and reducing internal resistance. FIG. 5(a) is an example of the z-folding technique, consistent with disclosed embodiments. For example, in the exemplary z-folding technique illustrated, separators 510 are evenly stacked in a zigzag manner between the anode 530 and cathode 520 to form a battery 540. FIG. 5(b) is a cross-sectional illustration of the battery of FIG. 5(a) following assembly.

Figure 6B:
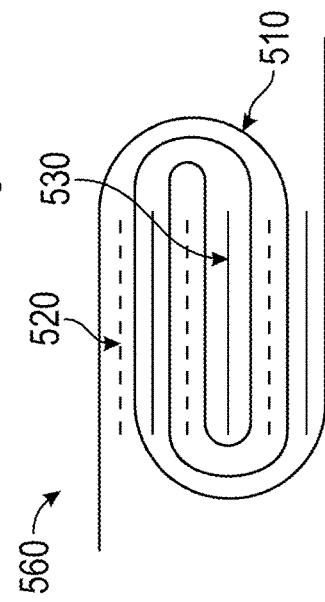
FIG. 6(b) is a hybrid cell configuration that is a combination of winding and stacking, both of which are consistent with some disclosed embodiments.
Figure 6A:
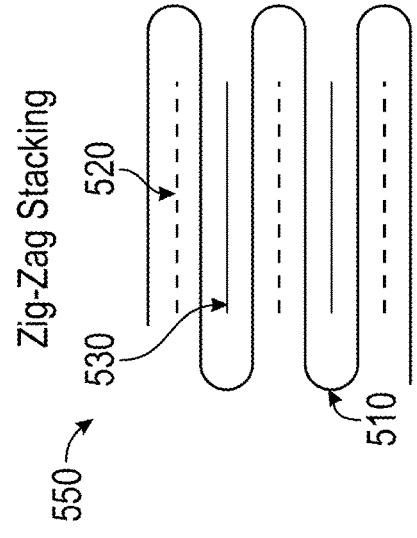
FIG. 6(a) is a cross-sectional illustration comparing a rechargeable battery cell configuration for a standard zig-zag stack.

In some embodiments, the rechargeable battery cell configuration is a hybrid form of the foregoing configurations. For example, in some embodiments the cell configuration is a combination of winding and stacking. This method involves winding the individual anode and cathode with continuous separator together. This hybrid configuration may lead to more efficient and cost-effective batteries by taking advantage of the desirable benefits of both configurations, including a high energy density cell with low internal impedance that provides efficient utilization of the active components. Reference is made to FIGS. 6(a) and 6(b), which illustrates the differences between a standard zig-zag stacking 550 and a wound stacking 560 of the anode 530 and cathode 520.

In some embodiments, the described lithium salts may be used in combination with at least one additive for improving a lifetime of the battery cell. Such additives may be in the form of an organic solvent. Non-limiting examples of organic solvents that may be used in some embodiments include: Ethylene Carbonate (EC), Dimethyl Carbonate (DMC), Diethyl Carbonate (DEC), Ethyl Methyl Carbonate (EMC), vinyl carbonate (VC), or fluoroethylene carbonate (FEC). In some embodiments, the electrolyte includes at least two of EC, VC, DMC, and FEC.

Table 1 below provides properties related to these organic solvents, as provided in Benjamin Flamme et al., "Guidelines to design organic electrolytes for lithium-ion batteries: environmental impact, physicochemical and electrochemical properties," *Green Chem.*, 2017, 19, 1828-1849.

common organic solvents. The high dielectric constant of DMC helps to increase the solubility of lithium salts in the electrolyte, which is also important for the battery performance.

As for the low-temperature performance of DMC, it has been shown to improve the low-temperature performance of lithium-ion batteries. The specific value of the low-temperature performance improvement will depend on a number of factors, such as the concentration of DMC in the electrolyte, the type of lithium salt used, and the battery design.

DMC has additional low-temperature performance properties that make it an attractive organic solvent in some embodiments. For example, DMC has a freezing point of −40 degrees Celsius. This means that it can still be used as an electrolyte in lithium-ion batteries that are designed to operate in cold environments. DMC also has a high ionic conductivity at low temperatures. This means that it can still transport lithium ions efficiently in lithium-ion batteries that are operating in cold environments.

In some embodiments, Diethyl Carbonate (DEC) may be used as an organic solvent because it has a higher-boiling-point that contributes to the electrolyte's high-temperature stability. It enhances the wetting properties and can improve the stability of the solid electrolyte interface (SEI) layer formed on the electrodes during battery operation. The wetting enhancement of DEC is due to its high dielectric

TABLE 1

| Solvent | melting point ° C. | boiling point ° C. | viscosity @ 20° C. [cP] | dielectric constant | density [gr/cc] | ionic conductivity mS/cm | Eox vs. Li+/Li [V] |
|---|---|---|---|---|---|---|---|
| DMC | 4.6 | 91 | 0.59 | 3.1 | 1.06 | 6 | 5.5 |
| DEC | −74.3 | 126 | 0.75 | 2.8 | 0.97 | 2.4 | 5.2 |
| EMC | −53 | 110 | 0.65 | 2.9 | 1.01 | 3.5 | 6.1 |
| EC | 36.4 | 248 | 1.9 | 89.8 | 1.32 | 8.3 | 5.5 |
| FEC | 17.3 | 210 | 4.1 | 78.4 | 1.5 | 5 | 6.6 |
| VC | 22 | 162 | 1.54 | 126 | 1.35 | 13.2 | 4.7 |

Dynamic viscosity in cP at 20° C.
Dielectric measured constant at 25° C.
Molar volume in $cm^3 \cdot mol^{-1}$ at 25° C.
Density measured at 25° C.
Ionic conductivity of 1M $LiPF_6$ in $mS \cdot cm^{-1}$ at 25° C.
Oxidation potential vs. Li/Li+ in V at room temperature determined in 1M $LiPF_6$ In some embodiments, Ethylene Carbonate (EC) may be used as an organic solvent because of its a high-dielectric constant solvent that enhances the solubility of lithium salts and promotes ion mobility. It has good compatibility with lithium-ion electrodes and exhibits a wide electrochemical stability window. However, it can be susceptible to oxidative decomposition at high voltages.

In some embodiments, Dimethyl Carbonate (DMC) may be used as an organic solvent because it is a low-viscosity and high-dielectric constant solvent that enhances the ionic conductivity of the electrolyte. It provides good solubility for lithium salts and exhibits good compatibility with electrode materials. DMC can help improve the low-temperature performance of Li-ion batteries. For example, the addition of DMC to a lithium-ion battery electrolyte could improve the low-temperature performance of the battery by up to 10%.

The viscosity of DMC is 0.85 centipoise at 25 degrees Celsius. This is lower than the viscosity of other common organic solvents used in lithium-ion batteries, such as ethylene carbonate (EC) and dimethyl sulfoxide (DMSO). The lower viscosity of DMC helps to improve the ionic conductivity of the electrolyte, which is important for the battery performance.

The dielectric constant of DMC is 68.4 at 25 degrees Celsius. This is higher than the dielectric constant of other constant, which makes it a good solvent for the lithium ions. This allows the lithium ions to move more easily through the electrolyte, which improves the wetting of the electrodes. The stability improvement of DEC is due to its low reactivity with the electrodes. This helps to prevent the formation of a SEI layer that is unstable and can degrade the battery performance.

In some embodiments, Ethyl Methyl Carbonate (EMC) may be used as an organic solvent because it improves the solubility of lithium salts and enhances the overall performance of the electrolyte. It helps optimize the viscosity and conductivity of the electrolyte solution. The wetting enhancement of EMC is due to its high dielectric constant, which makes it a good solvent for the lithium ions. This allows the lithium ions to move more easily through the electrolyte, which improves the wetting of the electrodes. The viscosity optimization of EMC is due to its low viscosity, which makes it a good thinner for the electrolyte. This helps to improve the conductivity of the electrolyte, which is important for the battery performance. Other factors that can affect the wetting enhancement and viscosity optimization of EMC include the temperature of the electrolyte. The wetting enhancement and viscosity optimization of EMC will decrease as the temperature increases. In addition, the type of lithium salt used can affect the wetting enhancement and viscosity optimization of EMC. Some lithium salts are more soluble in EMC than others. This may affect the wetting enhancement and viscosity optimization of the electrolyte. Further, the presence of other additives in the electrolyte may affect the wetting enhancement and viscosity optimization of the electrolyte. Some additives can improve the wetting enhancement and viscosity optimization of EMC, while others can have the opposite effect.

In some embodiments, vinyl carbonate (VC) may be used as an organic solvent because it is a cyclic carbonate compound that may be used as an electrolyte additive due to its ability to form a stable solid electrolyte interface (SEI) layer on the surface of the anode electrode. Non-limiting potential benefits of using VC as an electrolyte additive include improved stability of the anode-electrolyte interface, leading to reduced electrolyte decomposition and increased cycling stability, enhanced lithium-ion transport, promoting better electrode performance and overall battery efficiency, and protection against the formation of lithium dendrites, which can cause internal short circuits and compromise battery safety.

In some embodiments, Fluoroethylene Carbonate (FEC) may be used as an organic solvent because it is another cyclic carbonate compound that may improve the stability and performance of Li-ion batteries, particularly at high voltages and low temperatures. FEC has a higher boiling point and enhanced solubility for lithium salts compared to other organic solvents, making it suitable for demanding battery applications. Non-limiting benefits of using FEC as an electrolyte additive include: enhanced formation of a stable SEI layer on the surface of both the anode and cathode, improving the overall stability of the battery; improved cycling performance, especially at high voltages, by reducing the irreversible capacity loss and enhancing the battery's overall energy density; and better low-temperature performance, allowing for improved ion transport and increased battery efficiency even in cold environments. For example, the addition of 5-10% FEC to a lithium-ion battery electrolyte could improve the high-voltage performance of the battery by up to 20% and could improve the low-temperature performance of the battery by up to 10%. In parallel, lithium-ion conductivity could also, improve the cycling stability of the battery by up to 200%, could improve the stability of the SEI layer, and increase the cycle life of the battery by up to 50%.

In some embodiments, the properties of FEC make it an attractive organic solvent. Non-limiting examples of such properties include its boiling point, which is 287 degrees Celsius. This is higher than the boiling points of other common organic solvents used in lithium-ion batteries, such as ethylene carbonate (EC) and dimethyl carbonate (DMC). This means that FEC is less likely to evaporate during battery operation, which can help to improve the battery's safety. This higher boiling point also makes it suitable for use in lithium-ion batteries that operate at high voltages.

In addition, FEC also has a good low-temperature performance, with a freezing point of −45 degrees Celsius. This makes it suitable for use in lithium-ion batteries that are designed to operate in cold environments.

Further, FEC can improve the stability of the SEI layer by forming a more stable and uniform layer. This can help to reduce electrolyte decomposition and increase cycling stability. FEC can also help to increase the cycling stability of Si-based anodes by preventing the growth of lithium dendrites. FEC can also help to improve the electrode performance of Si-based anodes by enhancing lithium-ion transport. This can lead to faster charging and discharging rates, as well as improved energy efficiency.

According to some embodiments, the anode, the cathode, and the separator are configured to cooperate to enable sequential charging and discharging, such that during sequential chargings at least 70% of usable capacity is loaded within 15 minutes. As used herein, sequential charging and discharging of a rechargeable battery refers to the process of cyclically charging and discharging the battery to utilize its energy storage capabilities effectively. One goal may be to enhance (e.g., attempt to maximize or otherwise improve) the battery's usable capacity and extend its overall lifespan. The anode, the cathode, and the separator may be "configured to cooperate . . . " if in combination, their properties enable sequential charging and discharging such that during sequential chargings at least 70% of usable capacity is loaded within 15 minutes. A percentage of usable capacity refers to a ratio of loaded capacity to total capacity that is usable. For example, if a battery's usable or maximum output at a given time is X mAh, 70% of usable capacity is 0.7X mAh.

According to some embodiments, the rechargeable battery cell has a configuration selected from cylindrical, prismatic and pouch (also referred to as "film polymer"). In some embodiments, the rechargeable battery cell has a prismatic configuration that is packaged in a welded aluminum, steel, or hard shell polymer casing. In such embodiments, the prismatic cell has a robust exterior, but a thin design profile, which improves volume utilization inside the battery pack.

In some embodiments, the rechargeable battery cell has a pouch or film polymer configuration, which is similar to the prismatic cell, but without a more rigid exterior casing. Rather, these pouch or polymers cells are sealed in a foil pouch, which may be in the form of a laminate. The electrolyte flexibility associated with this configuration facilitates such pouch or polymer cells to have thin design profiles, with different custom shapes, cuts, and curves. In some embodiments, pouch cells have the highest packaging efficiency of the disclosed configurations, and great energy density, making such configurations attractive for use in Energy Storage System (ESS) applications, electric vehicles, and portable electronic devices such as cell phones, digital cameras, GPS devices, tablets, laptop computers and power tools.

According to some embodiments, the rechargeable battery cell configuration is cylindrical, the anode has a plurality of anode tabs, and the cathode has a plurality of cathode tabs, or each of the anode and the cathode have a continuous tab.

Figure 7A:
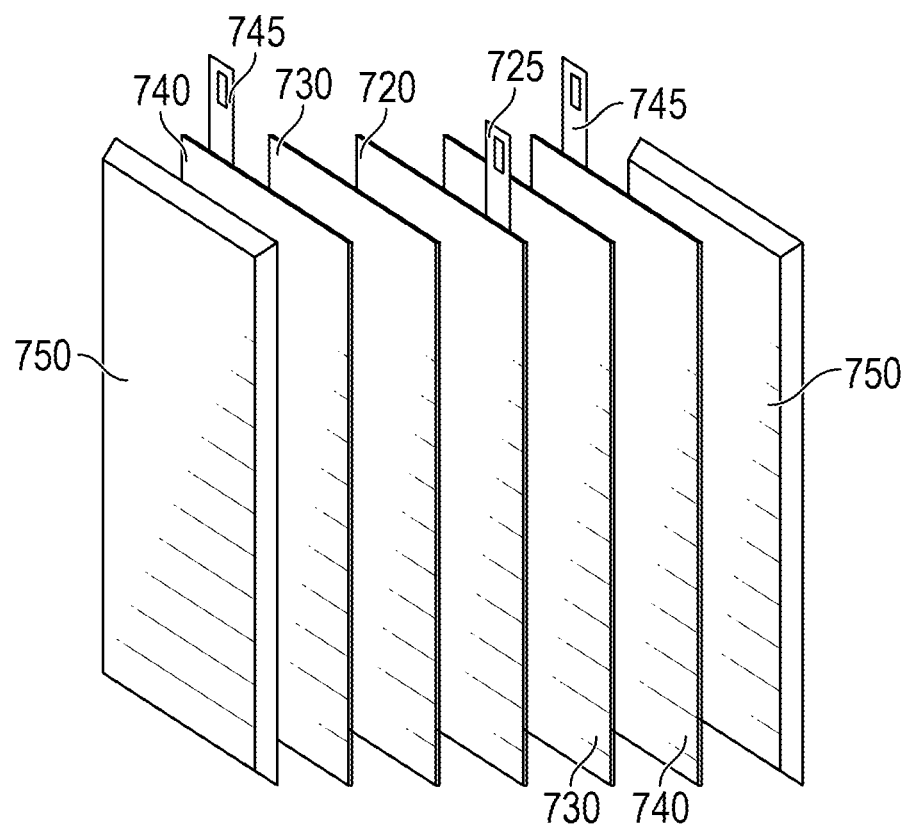
FIG. 7(a) is an exploded perspective view of a pouch cell design showing the location of various anode and cathode tabs consistent with some disclosed embodiments.

FIG. 7(a) illustrates exemplary locations of various anode and cathode tabs in a pouch cell design, consistent with some disclosed embodiments. For example, the pouch design shown in this figure includes anode 720 having anode tab 725 configured as a thin strip or foil which may be made of a conductive material such as copper or aluminum. In some embodiments, it is attached to the anode current collector, which may be made of a metallic foil coated with the active anode material. In some embodiments, the anode tab extends from the current collector, providing a point of electrical contact for the anode.

FIG. 7(a) also illustrates the separator 730 that insulates the anode 720 from the cathode 740. Similar to the anode 720, the cathode 740 contains a cathode tab 745, configured as a thin strip or foil made of a conductive material like aluminum or copper. In some embodiments, it is attached to the cathode current collector, which may be a metallic foil coated with the active cathode material (e.g., lithium cobalt oxide, lithium iron phosphate). In some embodiments, the cathode tab extends from the current collector, providing a point of electrical contact for the cathode.

The pouch configuration illustrated in figure FIG. 7(a) includes a flexible outer pouch layer 750, which may be a laminated structure. In some embodiments, the laminated structure includes multiple layers of materials that provide structural support, protection, and electrical insulation, such as a combination of metalized films (e.g., aluminum or stainless steel), and polymer layers (e.g., polyethylene terephthalate (PET) polypropylene, polyethylene, nylon or combination thereof).

Figure 7B:
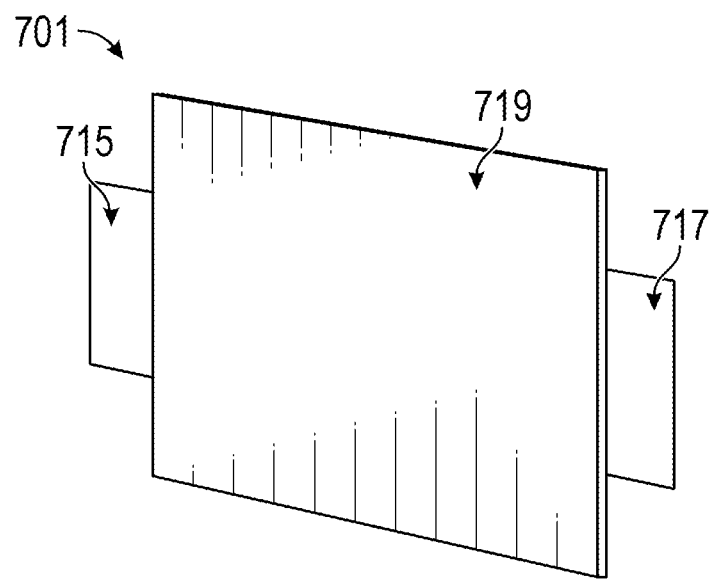
FIG. 7(b) is an illustration of a prismatic cell design showing positive and negative tabs consistent with some disclosed embodiments.

While FIG. 7(a) illustrates a pouch configuration cell design, other configurations described herein may also include similar anode and cathode tabs. For example, FIG. 7(b) illustrates an exemplary rechargeable battery cell having a prismatic cell design 701. This figure generally shows a rechargeable battery cell 701 having a positive tab 715 and a negative tab 717 located on opposites sides of a rechargeable cell core 719. The materials and methods used to make these positive and negative tabs may be consistent with the prior description.

Some disclosed embodiments involve sequential charging and discharging. Charging refers to a process of replenishing the stored energy in a battery by supplying it with an external power source. Discharging refers to a process of releasing stored energy from a battery. When a battery is discharged, the stored electrochemical potential within the battery cells is converted into electrical energy, which can then be utilized to power devices or perform work. Sequential charging and discharging refer to a cyclical process of charging and then discharging one or more batteries. By way of example, a sequential charging and discharging process may involve the following steps: a charging phase, charge monitoring, and a discharging phase. During the charging phase, an external power source, such as a charger or power supply, is connected to the battery. In some embodiments, the charging current flows into the battery, increasing its state of charge (SoC) to at least 70% of usable capacity within 15 minutes. In some embodiments, the charging current flows into the battery, increasing its state of charge (SoC) to at least 70% of usable capacity within 10 minutes. Charging may continue until the battery reaches its maximum capacity or a desired SoC level. Throughout the charging process, the battery's SoC and voltage levels may be monitored to ensure the proper charging profile is followed. This helps prevent overcharging, which can lead to battery degradation or safety risks. In some embodiments, after the battery is fully charged or reaches a predetermined SoC, such as 70% of usable capacity within 15 minutes, or within 10 minutes, the discharge phase may begin either immediately or after a period of time. The battery is connected to a load or device, and the stored energy is released as electric current flows from the battery to the load. The discharging process continues until the battery's SoC drops to a specified minimum level.

Similar to charge monitoring, the battery's SoC and voltage levels may be continuously monitored during the discharge phase to prevent over-discharging, which can negatively affect the battery's performance and lifespan. When the SoC reaches the predetermined minimum level, the discharge may be stopped to avoid deep discharge, which can cause irreversible damage to the battery.

Once the discharge phase is complete, the battery can be recharged by repeating the cycle. Sequential charging and discharging cycles can be repeated multiple times, depending on the battery's specific requirements and the user's energy needs. By employing sequential charging and discharging, the battery's energy storage capacity is effectively utilized, and the depth of discharge can be controlled to optimize its longevity. This approach helps mitigate issues such as capacity loss, memory effect, and voltage hysteresis that can occur in rechargeable batteries over time.

Some disclosed embodiments may involve providing a charging current to the rechargeable battery cell under conditions sufficient to enable charging of at least 70% of usable capacity to the rechargeable battery cell within 15 minutes. In some embodiments, at least 70% of usable capacity to the rechargeable battery cell may be imparted within 10 minutes. In some embodiments, the rechargeable battery cell includes an anode having at least one surface with a reversible areal capacity, after formation, up to 8.0 mAh/cm$^2$ and containing a Si—C composite within a porous structure and including a carbon-based conductive additive, wherein the Si—C composite is at least 30% Si by weight, and the material is at least 85% Si—C composite.

In some embodiments, the rechargeable battery cell includes a cathode having at least one surface with a reversible areal capacity, after formation, up to 6 mAh/cm$^2$, wherein the ratio of areal capacity of the at least one surface of the anode to the at least one surface of the cathode is between 1.15 to 1.45.

In some embodiments, the rechargeable battery cell includes an electrolyte capable of carrying Li-ions between the anode and the cathode.

In some embodiments, the rechargeable battery cell includes a dielectric separator between the anode and the cathode, the separator having a porosity of greater than 38%, at least one carbon material or carbon additive, a binder in an amount less than 20% by weight and a polymer-based dispersant in an amount less than 2% by weight, wherein the polymer-based dispersant includes polymer chains between 10,000 and 50,000 g/mol.

In some embodiments, the rechargeable battery cell includes an interface between the anode and the cathode is pressurized in an amount sufficient to manage volumetric changes during charging and discharging processes, and wherein the anode and cathode are configured to cooperate to output an average discharge voltage of no greater than 3.55 V.

In some embodiments, the rechargeable battery cell includes an anode that has at least one surface with an areal capacity between 5 and 6 mAh/cm$^2$ and the cathode has at least one surface with an areal capacity between 4 and 5 mAh/cm$^2$, wherein a ratio of areal capacity of the at least one surface of the anode to the at least one surface of the cathode is between 1.25 to 1.45.

In some embodiments, the rechargeable battery cell includes an anode that has at least one surface with a reversible areal capacity, after formation, between 6 and 8.0 mAh/cm$^2$ and the cathode has at least one surface with a reversible areal capacity, after formation, between 5 and 6 mAh/cm$^2$, wherein a ratio of areal capacity of the at least one surface of the anode to the at least one surface of the cathode is between 1.15 to 1.35.

In some embodiments, different charging strategies can be applied to the rechargeable batteries, including boost or pulse-based techniques. In general, the available Li-ion battery charging strategy can be divided into several classes: passive and active strategies.

Passive charging is a method that relies on a substantially constant voltage or constant current source to charge the battery. In this approach, the charger supplies a fixed voltage or current to the battery and continues to do so until the battery is fully charged.

In Constant Voltage (CV) charging, the charger supplies a substantially constant voltage to the battery, typically higher than the battery's current voltage. As the battery charges, its voltage increases until it reaches the charger's set voltage. At that point, the charging current gradually decreases until it becomes minimal, indicating that the battery is fully charged.

In Constant Current (CC) charging, the charger supplies a substantially constant current to the battery. The charging current remains substantially constant until the battery voltage reaches a certain level, indicating that the battery is nearly fully charged. At this point, the charger may switch to a constant voltage mode to complete the charging process.

FIG. 8(a) is an example of the profile of Constant Current Constant Voltage (CC-CV) charging. It involves two main stages: a constant current (CC) stage followed by a constant voltage (CV) stage. During the CC stage, the charger applies a constant current to the battery, typically at a predetermined rate. The current is held constant until the battery reaches a certain voltage threshold. In this stage, the battery charges relatively quickly as the current pushes the lithium ions into the battery's electrode materials, gradually increasing its state of charge. Once the battery voltage reaches the predetermined threshold, the charger transitions into the CV stage. In this stage, the charger keeps the voltage across the battery constant while reducing the charging current. The charger adjusts the current to maintain a steady voltage level, usually referred to as the "float" or "absorption" voltage. The battery continues to charge, but at a slower rate, allowing the remaining capacity to be replenished more gently.

The CC-CV charging technique is designed to optimize the charging process and provide a controlled charging profile to the battery. The constant current stage ensures rapid charging, while the constant voltage stage allows for a controlled and slower charging rate, preventing overcharging and minimizing the risk of damaging the battery. In an embodiment, charging of the disclosed battery cells can occur using passive charging techniques in which charging is characterized by their predefined charging profiles with fixed current, voltage, and/or power constraints but ignoring the responses of battery dynamics.

Alternatively, and in contrast to passive charging, active charging involves more advanced control systems and techniques to optimize the charging process for improved performance and battery longevity. It typically incorporates a battery management system (BMS), discussed in more detail below, or charge controller that actively monitors and adjusts the charging parameters based on the battery's characteristics and operating conditions. Active charging strategies continuously monitor and adjust the charging parameters in real-time, considering factors such as battery impedance, voltage profiles, and thermal conditions. This dynamic control allows for optimal charging efficiency and ensures the battery is charged safely and effectively.

In some embodiments, active charging strategies employ intelligent algorithms to dynamically adjust the charging voltage and current based on the battery's state of charge (SoC), temperature, and other factors. These algorithms seek to optimize the charging process, balancing speed, efficiency, and battery health.

FIG. 8(b) is an example of the profile of Multi-Stage Constant Current charging. This is a charging technique that divides the charging process into multiple stages, each characterized by a constant current charging mode. For example, the first stage, the charging process begins with a constant current mode where a high current is applied to the battery. This stage allows the battery voltage to rise rapidly until it reaches a predetermined threshold, typically known as the "bulk" or "absorption" voltage. During this stage, the battery charges relatively quickly.

After reaching the bulk voltage threshold, the charging process transitions to the second stage. In this stage, the charging current is gradually reduced while maintaining a constant current level. The purpose is to control the rate of charging and prevent overcharging, allowing the battery to reach a higher state of charge more gently. This stage is sometimes referred to as the "taper" or "top-off" charging phase.

In some embodiments, a third stage may be included, that is commonly known as the "trickle charge" or "float charge" stage. In this stage, a very low constant current is applied to the battery, which is typically lower than the self-discharge rate. The purpose is to maintain the battery at a fully charged state without overcharging it. Trickle charging continuously supplies charge to the battery even after it reaches full capacity. This approach helps maintain the battery's charge and compensates for self-discharge, ensuring the battery is ready for use at any time. The multi-stage constant current charging technique allows for efficient and controlled charging of batteries. By using a high current in the initial stage and gradually tapering off the current in subsequent stages, it helps optimize the charging process, prevent overcharging, and extend the battery's lifespan.

In some embodiments, active charging can involve pulse charging, which involves delivering charge to the battery in short bursts or pulses rather than a continuous flow. This technique helps minimize temperature rise, mitigate side reactions, and reduce the risk of overcharging or damaging the battery. FIG. 8(d) is an example of the profile of Pulsed Charging. As evident from this figure, during the charging pulse, a relatively high current is applied to the battery for a short duration. The pulse duration can vary depending on the specific charging algorithm or battery requirements. The purpose of the charging pulse is to quickly deliver charge to the battery, allowing for efficient charging. Following the charging pulse, a rest period is introduced where no current is applied to the battery. This rest period allows the battery to relax, redistribute ions within the electrode materials, and stabilize before the next charging pulse. The duration of the rest period can also vary depending on the specific charging algorithm or battery requirements. The alternating pattern of charging pulses and rest periods is repeated throughout the charging process until the battery reaches the desired state of charge.

The pulsing charging technique aims to balance the efficient delivery of charge with periods of rest to enhance ion distribution, reduce heat generation, and mitigate issues such as electrode polarization and capacity fade. By allowing the battery to relax between charging pulses, pulsing charging can promote more uniform ion diffusion and prevent the buildup of localized stresses within the battery.

FIG. 8(c) is an example of the profile of Constant Current Pulsed Charging (CCPC). This is a charging technique that combines aspects of both constant current (CC) and pulsed charging. It involves alternating between periods of delivering a constant current and periods of no current during the charging process.

During the CC phase, a charging current is applied to the battery, similar to traditional CC charging. The current is maintained at a constant level for a specific duration. This phase allows for efficient and rapid charging, pushing the charging process forward. After the CC phase, the charging current is temporarily interrupted or reduced to zero for a defined period, creating a pulsing pattern. The duration of the pulse can vary depending on the specific charging algorithm or battery requirements. This pulsing pattern can be repeated multiple times during the charging process.

The purpose of the pulsed charging phase is to allow the battery to rest and redistribute the ions within the electrode materials. This can help to mitigate issues like electrode polarization, improve ion diffusion, and facilitate the uniform penetration of the electrolyte into the active materials.

FIG. 8(e) is an example of the profile of boost charging of a rechargeable battery. This is a charging technique where the charging voltage is temporarily increased above the battery's nominal voltage during the charging process. It is used to expedite the charging speed and efficiently restore the battery's state of charge. The boost charging process begins with an initial phase where a higher charging voltage is applied to the battery. The voltage is increased above the battery's nominal voltage, typically by a predetermined amount. This higher voltage (above the nominal voltage) enables a faster charging rate by increasing the driving force for the flow of current into the battery.

Once the battery's state of charge reaches a specific threshold or the boost charging time is complete, the charging voltage is reduced to the normal or nominal voltage level. The charging process then continues with a standard charging algorithm, such as constant current (CC) followed by constant voltage (CV) charging.

The purpose of boost charging is to provide an initial burst of energy to rapidly charge the battery and quickly bring it to a desired state of charge. By increasing the voltage temporarily, the charging speed can be significantly accelerated, especially during the initial charging stages when the battery's voltage is relatively low.

In some embodiments, the method of charging a rechargeable battery cell includes a passive strategy that is a model-free methodology. Therefore, the charging technique and profile can include any of the foregoing techniques, with specific mention of constant-current—constant voltage (CCCV), multi-stage CCCV and pulse and boost charging techniques. These approaches can be characterized by their predefined charging profiles with fixed current, voltage, and/or power constraints but ignoring the responses of battery dynamics.

Figure 9:
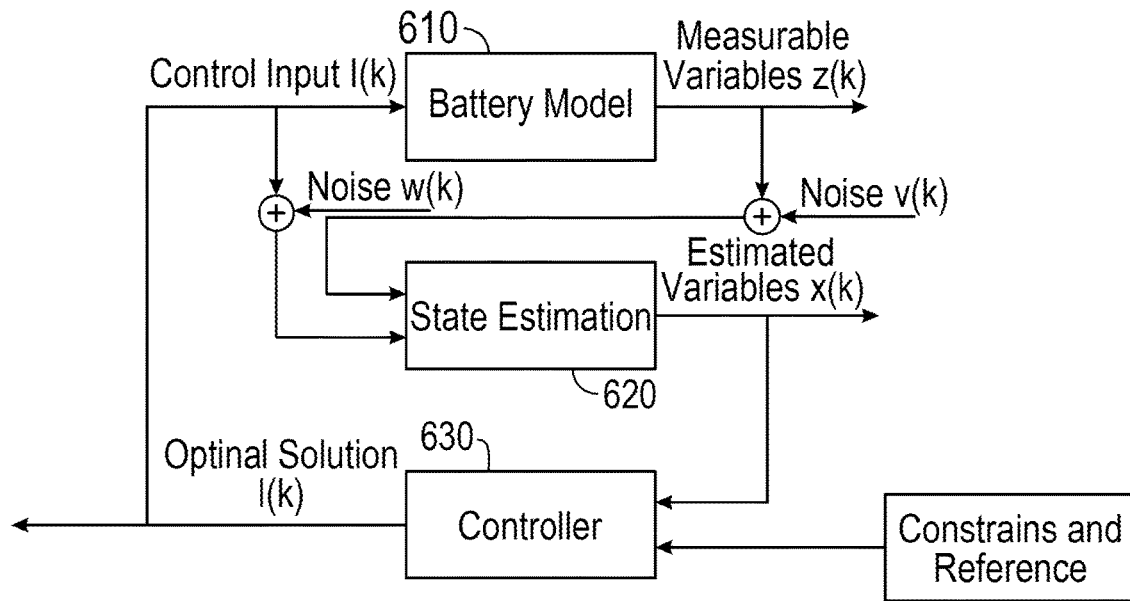
FIG. 9 is a system diagram of an active battery charging management structure composed of a battery model, state estimator, and model-based controller consistent with some disclosed embodiments.

FIG. 9 is an example of an active battery charging management structure (ABCMS). As evident, it is often composed of three elements: the battery model 610, state estimator 620, and model-based controller 630. The ABCMS for rechargeable batteries typically involves a battery management system (BMS) that oversees and controls the charging process. In some embodiments, the BMS is a component responsible for monitoring, protecting, and optimizing the charging of the battery. It ensures safe and efficient charging while maximizing the battery's performance and lifespan. A non-limiting list of the features and functions of the BMS according to some embodiments is provided below.

In some embodiments, the BMS regulates the charging current and voltage applied to the battery during the charging process. It ensures that the charging parameters remain within safe limits and prevents overcharging, which can lead to degradation or safety risks.

In some embodiments, the BMS continuously monitors the battery's state of charge to track its energy level accurately. This helps prevent overcharging, over-discharging, or operating the battery outside its safe operating range.

In some embodiments, the BMS measures the battery's temperature during charging to prevent overheating, which can degrade the battery or pose safety hazards. If the temperature rises above a predetermined threshold, the BMS may adjust the charging rate or trigger thermal management mechanisms to keep the battery within a safe temperature range.

In some embodiments, the BMS monitors the battery's voltage during charging to ensure that it remains within the appropriate voltage range. Deviations from the expected voltage levels can indicate issues such as cell imbalances or faults, which the BMS can identify and address.

In some embodiments, the BMS monitors the charging current flowing into the battery to ensure it remains within safe limits and matches the battery's specifications. Unusually high currents may indicate faults or potential safety concerns that the BMS can detect and mitigate.

In some embodiments, the BMS incorporates various safety features to protect the battery from abnormal conditions or events. These may include overcurrent protection, overvoltage protection, undervoltage protection, short-circuit protection, and temperature protection. The BMS can detect these conditions and take appropriate actions, such as interrupting the charging process or alerting the user.

In some embodiments, such as in the multi-cell battery packs, the BMS may implement cell balancing techniques to equalize the state of charge across individual cells. This helps ensure optimal battery performance and longevity by preventing cell overcharging or undercharging.

In some embodiments, the BMS may provide communication interfaces, such as CAN (Controller Area Network), SMBus (System Management Bus), or wireless protocols, to interact with external devices or systems. It enables monitoring, control, and data exchange between the BMS and other components or external devices.

In some embodiments, the ABCMS, facilitated by the BMS, plays a role in maintaining the safety, performance, and longevity of rechargeable batteries. It enables precise control, monitoring, and protection during the charging process, ensuring optimal operation and enhancing the overall reliability of the battery system.

Figure 10:
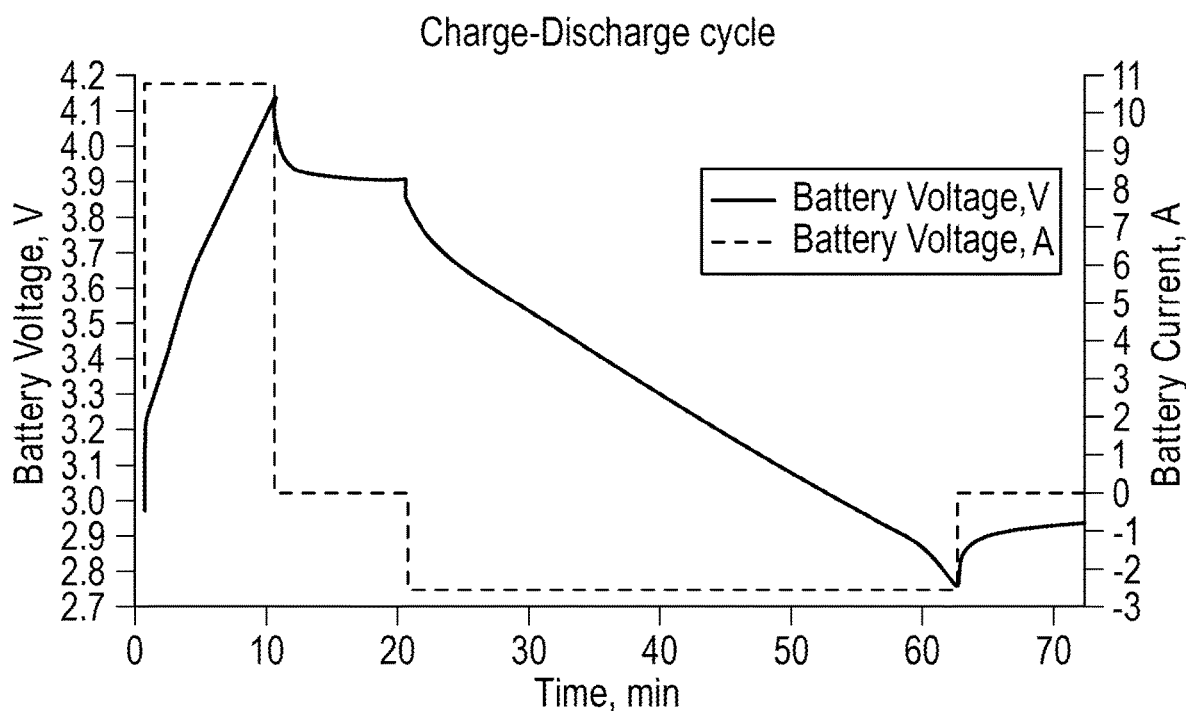
FIG. 10 graphically depicts a typical charge-discharge cycle for a rechargeable battery cell consistent with some disclosed embodiments.

FIG. 10 graphically depicts a typical charge-discharge cycle for a rechargeable battery cell consistent with some disclosed embodiments. This figure relates to a battery having a nominal capacity of 30 Ampere-hours that is being discharged at a rate of 1 C, which corresponds to a discharge current of 30 Amperes, which is herein is referred to as "30 Ah @ 1C".

The battery shown in FIG. 10 exhibits an energy density >300 Wh/kg. A constant current, extreme fast charging method is employed, taking the battery from 10% to 80% of its capacity (SoC) in just 10 minutes. This translates to a charging rate of 4.2 C. The battery has a 1 C discharge rate meaning that the discharge current will fully discharge the 100% SoC battery in 1 hour. For a battery with a capacity of 100 Amp-hrs, this equates to a discharge current of 100 Amps. The graph in FIG. 10 shows a discharge time of 40 minutes for a discharge of 80% SoC.

Figure 11:
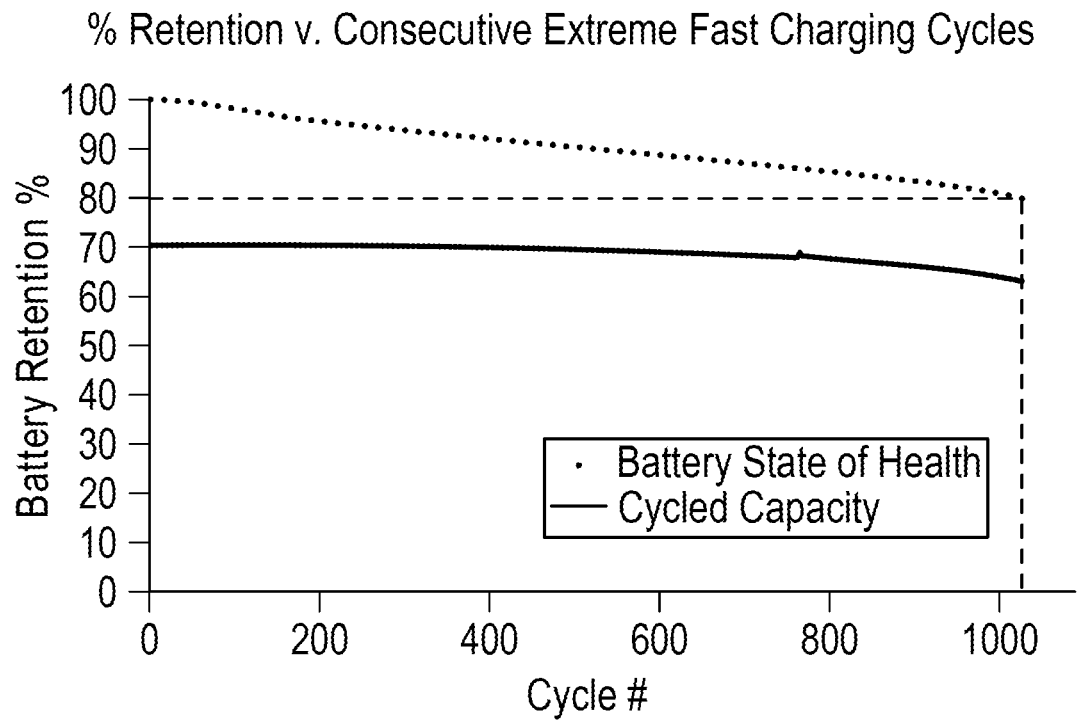
FIG. 11 graphically depicts capacity retention (%) versus consecutive extreme fast charging cycles consistent with some disclosed embodiments.

FIG. 11 graphically depicts battery capacity retention (%) versus consecutive extreme fast charging cycles, 10-80% SoC in 10 minutes (4.2 C), on the same rechargeable battery cell configuration described in FIG. 10. This figure relates to a battery having a nominal capacity of 30 Ampere-hours that is being discharged at a rate of one-third of its capacity, which corresponds to a discharge current of 10 Amperes, which is herein is referred to as "30 Ah @ C/3". The cycling was done at an ambient temperature of 35° C. The battery shown in FIG. 11 exhibits an energy density >300 Wh/kg. The properties of a rechargeable battery cell made according to some disclosed embodiments having an anode having a conductive current collector coated with a composite containing at least 30% Si by weight were compared to a traditional graphite-based anode, while using the same NMC811 cathode. As evident, the Si-based technology achieves >1,000 cycles at consecutive fast charging. A comparison of those properties is provided in Table 2. As evident, the disclosed property cannot be achieved by using graphite-based anode.

Figure 13:
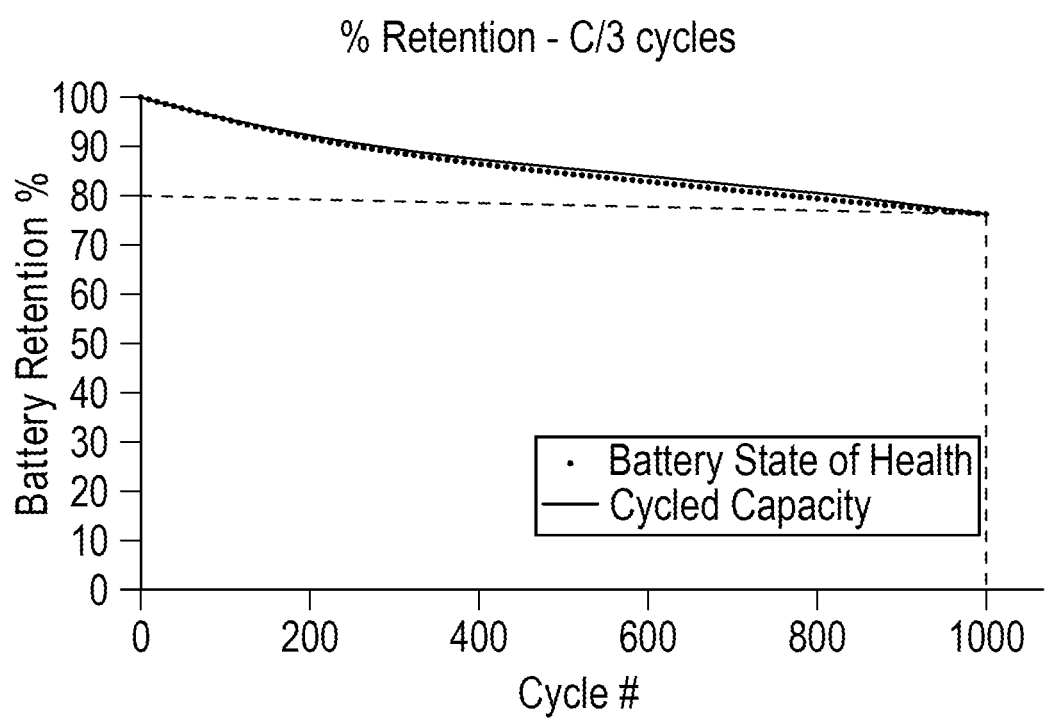
FIG. 13 is a graph depicting battery capacity retention (%) versus C/3 charging cycles consistent with some disclosed embodiments.

As shown in Table 2, a battery having the claimed anode composition exhibits and higher energy density (>300 Wh/kg v. 240 Wh/kg) and faster time to charge to 80% (<15 mins v.>15 min) and a higher number of consecutive fast charge cycles to 80% capacity retention (>1000 v.<1000) than a traditional graphite-based anode with no performance difference at C/3 charging, as shown in FIG. 11.

the Si-based technology achieves >1,000 cycles at C/3, similar to the graphite-based technology. Thus, the disclosed technology offers consecutive fast charging without significantly impacting cycle life, since similar cycle life is obtained for both, consecutive fast charge and C/3 rates (FIG. 11 and FIG. 13, respectively). A comparison of those properties is provided in Table 2.

Figure 14A:
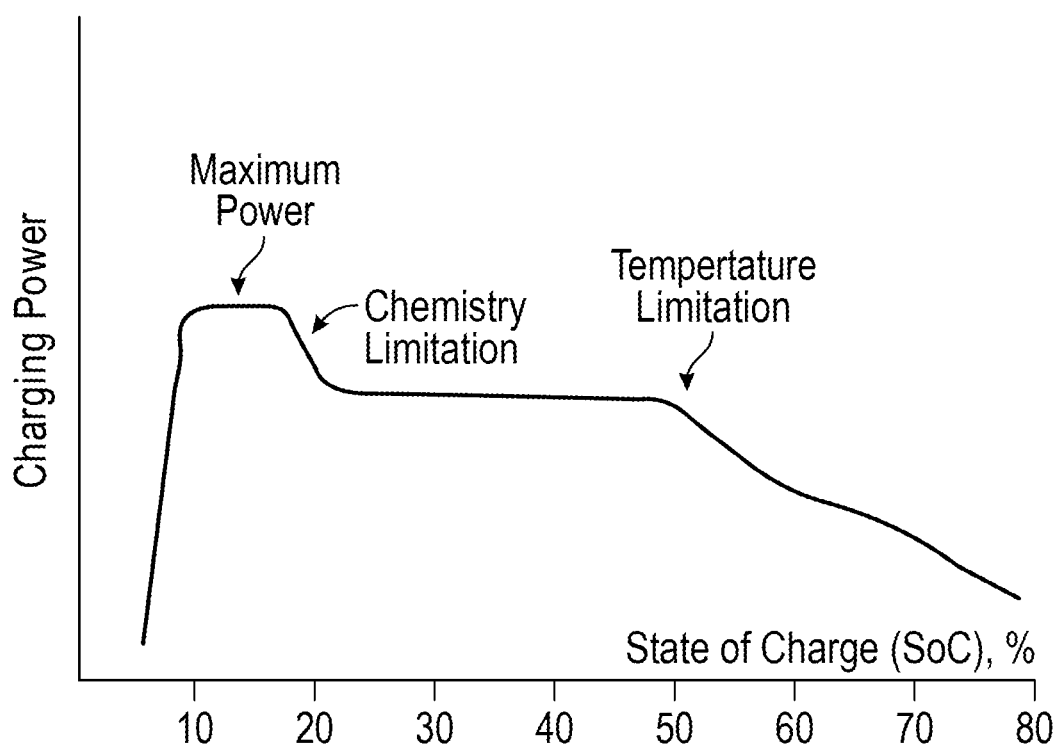
FIG. 14(a) is a typical charging curve of a traditional, graphite-based lithium ion battery.
Figure 14B:
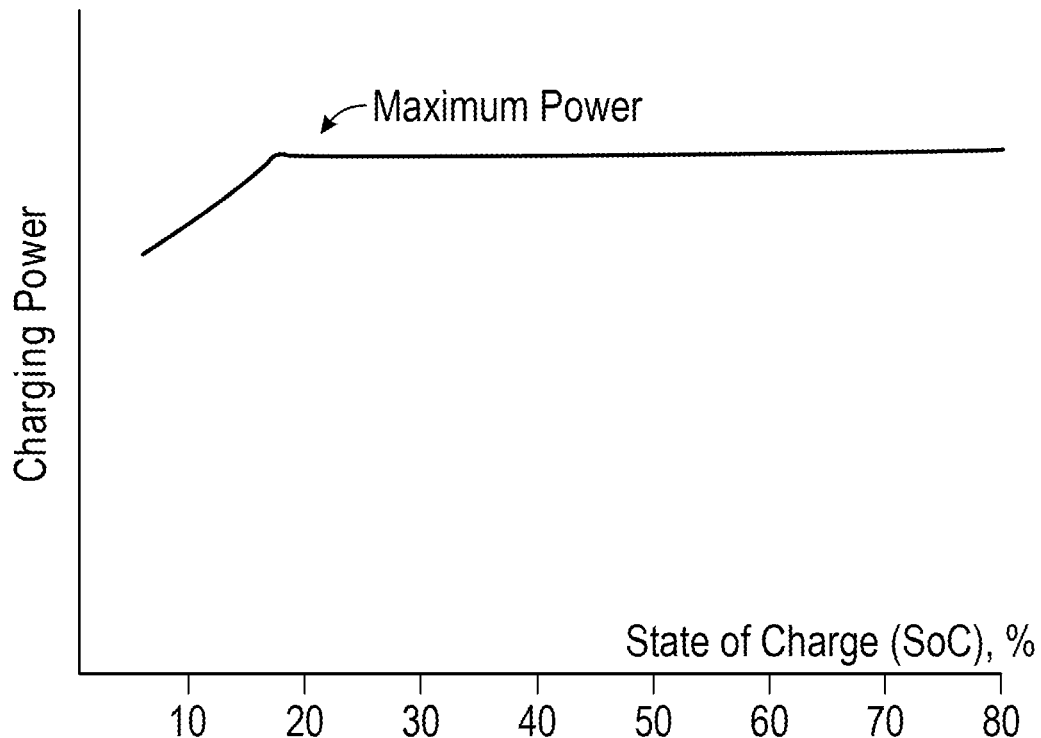

FIGS. 14(a) and 14(b) are graphical representations comparing typical charging curves of traditional, graphite-based lithium-ion battery [FIG. 14(a)] with a typical charging curve of a Si-based lithium-ion battery according to some embodiments of the present disclosure [FIG. 14(b)]. As evident, the typical charging curve of the inventive a Si-based lithium-ion battery exhibits more consistent charging times, which can charge at its maximum speed at any SoC.

As shown in FIG. 14(a), for an electric vehicle (EV), the charging power of a lithium-ion battery typically decreases as the battery's SoC increases. In an EV, unlike fueling an

TABLE 2

| | | Anode Composition | |
|---|---|---|---|
| | KPI | Graphite based | >30% Si |
| | Energy density at @C/3 | ~240 Wh/kg | >300 Wh/kg |
| C/3 cycling data | Time to charge to 0-100% SoC | 3 hours | 3 hours |
| | Number of C/3 cycles to 80% capacity retention | >1000 | >1000 |
| Fast charging data | Time to charge to 10-80% SoC | >15 min | <15 min |
| | Number of consecutive fast charge cycles to 80% capacity retention | <1000 | >1000 |

Figure 12:
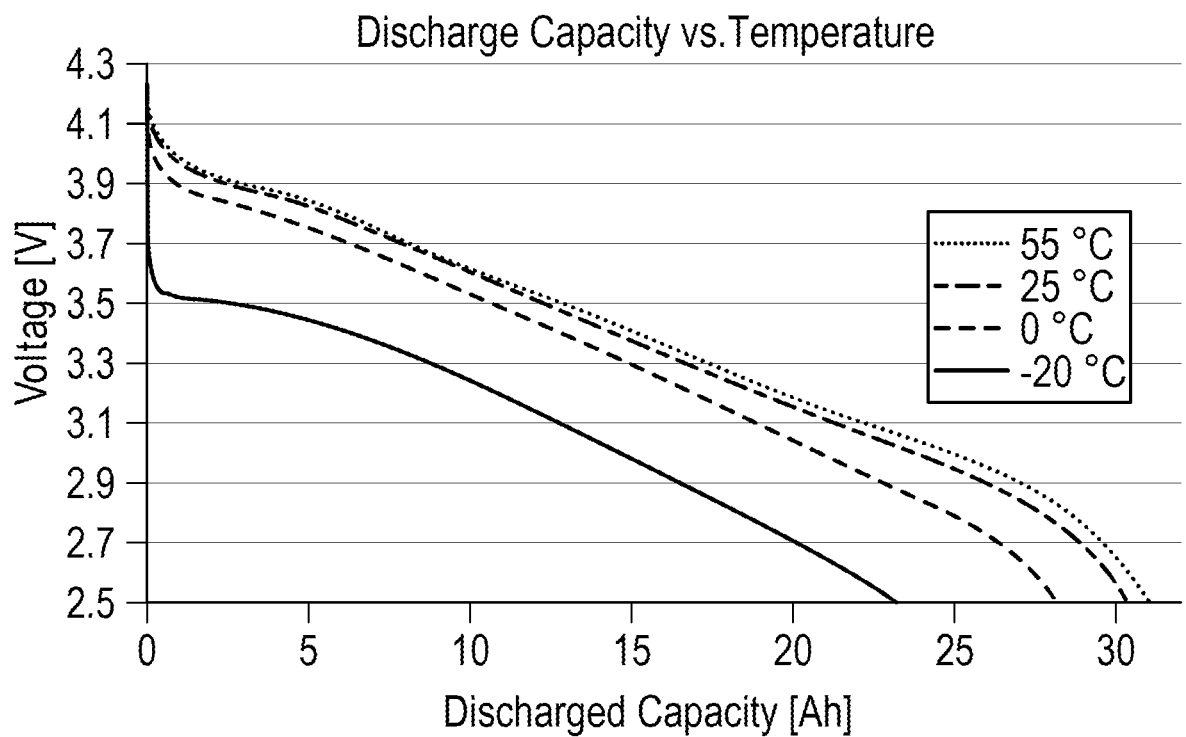
FIG. 12 is a graph depicting discharge capacity versus voltage at various temperatures in the range of −25° C. to 55° C. consistent with some disclosed embodiments.

FIG. 12 graphically depicts discharge capacity versus various temperatures for some disclosed embodiments on the same rechargeable battery cell configuration described in FIG. 10. This figure relates to a battery having a nominal capacity of 30 Ampere-hours that is being charged and discharged at symmetrical rate of one-third of its capacity, which corresponds to a discharge current of 10 Amperes, which is herein is referred to as "30 Ah @ C/3". The charging was performed at 25° C. The battery shown in FIG. 12 exhibits an energy density >300 Wh/kg. The properties of a rechargeable battery cell made according to some disclosed embodiments having an anode having a conductive current collector coated with a composite containing at least 30% Si by weight were compared to a traditional graphite-based anode. 76% discharge capacity @ −20° C., which is similar to high-end graphite-based solutions. The discharge capacity at other temperatures is provided in Table 3.

TABLE 3

| | −20° C. | 0° C. | 25° C. | 55° C. |
|---|---|---|---|---|
| % of 0.3 C | 76.4% | 92.8% | 100.00% | 102.2% |

FIG. 13 is a graph depicting battery capacity retention (%) versus symmetrical C/3 charging-discharging cycles on the same rechargeable battery cell configuration according to some disclosed embodiments. This figure relates to a battery having a nominal capacity of 30 Ampere-hours that is being discharged at a rate of one-third of its capacity, which corresponds to a discharge current of 10 Amperes, which is herein is referred to as "30 Ah @ C/3". The cycling was done at an ambient temperature of 25° C. The battery shown in FIG. 13 exhibits an energy density >300 Wh/kg. As evident, internal combustion engine powered vehicle, irrespective of the amount of fuel in the tank can take on fuel at a constant flowrate, the power at which most EVs charge is reduced as the battery's SoC rises. See FIG. 14(a). This is due to several factors, including battery chemistry and battery temperature.

Regarding battery chemistry, lithium-ion batteries, the most common type of battery used in EVs, have a non-linear charging curve. This means that the batteries can accept a higher charging current at lower SoCs than at higher SoCs. In some disclosed embodiments, the problems associated with "battery chemistry" are resolved by utilizing the highest power at any state of charge. This means that a battery made according to some disclosed embodiments can charge at a constant rate, regardless of how full the battery is. See FIG. 14(b). As a result, a decrease in charging time is achieved.

Regarding battery temperature, as battery temperature rises during charging, its internal resistance increases. This reduces the efficiency of the charging process and limits the amount of current that the battery can safely accept. FIG. 15 is a graphical representation that demonstrates the effect of electrolyte type on expansion during formation. Different electrolyte additives or formulations were used to promote the formation of a stable and protective SEI layer. In some embodiments, this stable and protective SEI layer can effectively mitigate cycle-induced volume changes and enhance battery longevity. FIG. 15 shows measured and calculated expansion of stack thickness changing with different electrolytes for the reasons mentioned above, e.g., different electrolyte additives promote the formation of a stable and protective SEI layer thereby increasing stability and reducing volumetric changes. In some embodiments, these additives include lithium salts, organic compounds, and inorganic nanoparticles.

As mentioned, non-limiting examples of lithium salts additives that can be used in some embodiments include: lithium hexafluorophosphate (LiPF6), LiBF4, lithium bis(oxalato)borate, LiN(CF3SO2)2, LiN(C2F5SO2)2, LiAsF6, LiC(CF3SO2)3, lithium perchlorate (LiClO4), and lithium bis(trifluoromethanesulfonyl)imide (LiTFSI) or combination thereof. The described lithium salts may be used in combination with at least one additive for improving a lifetime of the battery cell.

Non-limiting examples of organic compounds that can be used as additives in some embodiments include: cyclin and chain carbonate, such as DMC, EMC, PC, EC, DEC, VC, FEC); carboxylic acid esters, such as methyl formate, methyl acetate (CH3COOCH3), ethyl acetate (CH3COOC2H5), and methyl propionate (CH3COOCH2CH3) and other polar compounds.

Non-limiting examples of inorganic nanoparticles include metal oxides and salts, such as alumina, silica, lithium carbonate, and the like. Additional organic and/or inorganic additives may be used based on the functionality. Non-limiting examples of such additives include film-forming additives, conductive additives, flame retardant additives, overcharge protection additives, additives to control the content of H2O and HF in the electrolyte, additives to improve low-temperature performance, and multifunctional additives.

The foregoing description is presented for purposes of illustration. It is not exhaustive and is not limited to precise forms or embodiments disclosed. Modifications and adaptations of the embodiments will be apparent from consideration of the specification and practice of the disclosed embodiments. While certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of this disclosure are apparent from this detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Throughout this application, various embodiments of the present disclosure may be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numeric values within that range. For example, description of a range such as from 1 to 6 should be considered to include subranges such as from 1 to 3, from 1 to 4, from 1 to 5, from 2 to 4, from 2 to 6, from 3 to 6, and so forth, as well as individual numbers within that range, for example, 1, 2, 3, 4, 5, and 6. This applies regardless of the breadth of the range.

Other embodiments will be apparent from consideration of the specification and practice of the embodiments disclosed herein. It is intended that the specification and examples be considered as example only, with a true scope and spirit of the disclosed embodiments being indicated by the following claims.

Examples of inventive concepts are contained in the following clauses which are an integral part of this disclosure.

Clause 1. A rechargeable battery cell, comprising:
  an anode having a conductive current collector coated with a composite containing at least 30% Si by weight;
  a cathode configured as a source of Li ions;
  an electrolyte capable of carrying Li-ions between the anode and the cathode; and
  a separator between the anode and the cathode, the separator having a porosity of at least 38%,
  wherein the anode, the cathode and the separator are configured to cooperate to enable sequential charging and discharging, such that during sequential chargings at least 70% of usable capacity is loaded within 15 minutes.

Clause 2. The rechargeable battery cell of clause 1, wherein the anode contains carbon.

Clause 3. The rechargeable battery cell of clauses 1-2, wherein the separator includes a polyolefin polymer, a cellulose derivative, or combinations thereof.

Clause 4. The rechargeable battery cell of clauses 1-3, wherein the cellulose derivative includes a cellulose ester or a cellulose ether.

Clause 5. The rechargeable battery cell of clauses 1-4, wherein the cellulose derivative includes mixed cellulose ethers selected from methylcarboxymethyl cellulose (MCMC) and hydroxyethylcarboxymethyl cellulose (HECMC).

Clause 6. The rechargeable battery cell of clauses 1-5, wherein the separator has multiple layers, and at least one of the multiple layers includes a ceramic material.

Clause 7. The rechargeable battery cell of clauses 1-6, wherein the ceramic material includes $Al_2O_3$, $AlO(OH)$, $MgO$, or mixtures thereof.

Clause 8. The rechargeable battery cell of clauses 1-7, wherein the at least one layer that includes a ceramic material that faces the cathode or the anode, or both.

Clause 9. The rechargeable battery cell of clauses 1-8, wherein the separator has a porosity of at least 40%.

Clause 10. The rechargeable battery cell of clauses 1-9, wherein the cathode and the anode exhibit differing areal capacities.

Clause 11. The rechargeable battery cell of clause clauses 1-10, wherein a ratio between an areal capacity of the cathode to the anode is between 0.70 and 0.81.

Clause 12. The rechargeable battery cell of clause clauses 1-11, wherein the current collector has a sheet resistance below 3 mOhm/sq.

Clause 13. The rechargeable battery cell of clauses 1-12, wherein the battery cell has a winded or stacked configuration.

Clause 14. The rechargeable battery cell of clauses 1-13, wherein the winded configuration has a cylindrical or jellyroll configuration.

Clause 15. The rechargeable battery cell of clauses 1-14, wherein the stacked configuration has a prismatic, or pouch configuration.

Clause 16. The rechargeable battery cell of clauses 1-15, wherein when the battery cell configuration is cylindrical or jellyroll, the anode has a plurality of anode tabs, and the cathode has a plurality of cathode tabs, or each of the anode and the cathode have a continuous tab.

Clause 17. The rechargeable battery cell of clauses 1-16, wherein when the battery cell configuration is prismatic or pouch, and the anode, cathode, and the separator are configured in a stack form.

Clause 18. The rechargeable battery cell of clauses 1-17, wherein the stack form includes a z-folded separator.

Clause 19. The rechargeable battery cell of clauses 1-18, wherein the composite containing at least 30% Si by weight silicon includes mixtures and/or composites of silicon-carbon (Si/C), silicon oxide-carbon (SiOx/C, wherein 0<x<2), SiN/C, and combination thereof.

Clause 20. The rechargeable battery cell of clauses 1-19, wherein the electrolyte capable of carrying Li-ions between the anode and the cathode contains at least one Li salt and at least one additive for improving a lifetime of the battery cell.

Clause 21. The rechargeable battery cell of clauses 1-20, wherein the Li salt is selected from a group consisting of $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, and LiTFSI, or combination thereof.

Clause 22. The rechargeable battery cell of clauses 1-21, wherein the at least one additive for improving the lifetime of the battery cell includes ethylene carbonate (EC), dimethyl carbonate (DMC), diethyl carbonate (DEC), ethyl methyl carbonate (EMC), vinyl carbonate (VC), or fluoroethylene carbonate (FEC).

Clause 23. A method of charging a rechargeable battery cell as recited in this clause and/or in combination with any one of the preceding clauses, the method comprising:
  providing a charging current to the rechargeable battery cell under conditions sufficient to enable charging of at least 70% of usable capacity to the rechargeable battery cell within 15 minutes, wherein the rechargeable battery cell includes:
  an anode having a conductive current collector coated with a composite containing at least 30% Si by weight;
  a cathode configured as a source of Li ions;
  an electrolyte capable of carrying Li-ions between the anode and the cathode; and
  a separator between the anode and the cathode, the separator having a porosity of at least 38%.

Clause 24. The method of clauses 1-23, wherein the charging current enable charging of at least 70% of usable capacity to the rechargeable battery cell within 10 minutes.

Clause 25. A rechargeable battery cell as recited in this clause and/or in combination with any one of the preceding clauses, comprising:
  an anode containing a Si—C composite within a porous structure;
  a metal oxide-based cathode configured as a source of Li ions;
  an electrolyte capable of carrying Li-ions between the anode and the cathode; and
  a separator between the anode and the cathode,
  wherein an interface between the anode and the cathode is pressurized in an amount sufficient to manage volumetric changes during charging and discharging processes.

Clause 26. The rechargeable battery cell of clauses 1-25, wherein the anode and the cathode are configured to cooperate to provide an average discharge voltage of no greater than 3.55V.

Clause 27. The rechargeable battery cell of clauses 1-26 wherein the anode and the cathode are configured to cooperate to provide a discharge voltage of no less than 2.5V.

Clause 28. The rechargeable battery cell of clauses 1-27, wherein the anode, the cathode, and the separator are configured to cooperate to enable sequential charging and discharging, such that during sequential charging, at least 70% of usable capacity is loaded within 15 minutes.

Clause 29. The rechargeable battery cell of clauses 1-28, wherein during the sequential charging, at least 70% of usable capacity is loaded within 10 minutes.

Clause 30. The rechargeable battery cell of clause 1, wherein the amount of pressure sufficient to manage volumetric changes is an amount that maintains porosity of the porous structure.

Clause 31. The rechargeable battery cell of clauses 1-30, wherein the amount that maintains porosity of the porous structure is less than 2 Atm.

Clause 32. The rechargeable battery cell of clauses 1-31, wherein the porous structure has a porosity of at least 38%.

Clause 33. The rechargeable battery cell of clauses 1-32, wherein the porous structure is made of a porous polymeric substrate having an average pore size in the range of 0.05 microns to 5 microns.

Clause 34. The rechargeable battery cell of clauses 1-33, wherein the porous polymeric substrate has a Gurley Number in the range of 50 to 200 seconds per 100 ml.

Clause 35. The rechargeable battery cell of clauses 1-34, wherein the porous polymeric substrate is made of a polyolefin.

Clause 36. The rechargeable battery cell of clauses 1-35, wherein the amount of pressure sufficient to manage volumetric changes is determined based on a cell capacity relative to a case dimension.

Clause 37. The rechargeable battery cell of clauses 1-35, wherein the electrolyte capable of carrying Li-ions between the anode and the cathode contain at least one Li salt and at least one additive for improving a lifetime of the battery cell.

Clause 38. The rechargeable battery cell of clauses 1-37, wherein the Li salt is selected from a group consisting of LiPF6, LiBF4, lithium bis(oxalato)borate, LiN(CF3SO2)2, LiN(C2F5SO2)2, LiAsF6, LiC(CF3SO2)3, LiClO4, and LiTFSI or combination thereof.

Clause 39. The rechargeable battery cell of clauses 1-38, wherein the at least one additive for improving the lifetime of the battery cell includes ethylene carbonate (EC), dimethyl carbonate (DMC), diethyl carbonate (DEC), ethyl methyl carbonate (EMC), vinyl carbonate (VC), or fluoroethylene carbonate (FEC).

Clause 40. The rechargeable battery cell of clauses 1-39, wherein the separator includes a polyolefin polymer.

Clause 41. The rechargeable battery cell of clauses 1-40, wherein the polyolefin polymer includes polyethylene or polypropylene.

Clause 42. The rechargeable battery cell of clauses 1-41, wherein the separator includes Al2O3, MgO, aramid, Boehmite-based (AlO(OH)), BaSO4 or mixtures thereof.

Clause 43. The rechargeable battery cell of clauses 1-42, wherein the Si—C composite includes silicon-carbon (Si/C), silicon oxide-carbon (SiOx/C, wherein 0<x<2), SiN/C and mixtures thereof.

Clause 44. The rechargeable battery cell of clauses 1-43, wherein the anode further includes a carbon-based conductive additive.

Clause 45. The rechargeable battery cell of clauses 1-44, wherein the carbon-based conductive additive includes carbon-based fibers.

Clause 46. The rechargeable battery cell of clauses 1-45, wherein the carbon-based fibers include carbon nanotubes.

Clause 47. A method of charging a rechargeable battery cell according to the following clause and/or in combination with one of the preceding clauses, the method comprising:
providing a charging current to the rechargeable battery cell under conditions sufficient to enable charging of at least 70% of usable capacity to the rechargeable battery cell within 15 minutes,
wherein the rechargeable battery cell includes:
an anode containing a Si—C composite within a porous structure;
a metal oxide-based cathode configured as a source of Li ions;
an electrolyte capable of carrying Li-ions between the anode and the cathode; and
a separator between the anode and the cathode,
wherein an interface between the anode and the cathode is pressurized in an amount sufficient to manage volumetric changes during charging and discharging processes.

Clause 48. The method of clauses 1-47, wherein the charging current enables charging of at least 70% of usable capacity to the rechargeable battery cell within 10 minutes.

Clause 49. A rechargeable battery cell according to this clause and/or in combination with one of the preceding clauses, comprising:
an anode having a conductive current collector coated with a composite containing a carbon-based material;
a cathode configured as a source of Li ions;
an electrolyte capable of carrying Li-ions between the anode and the cathode; and
a separator between the anode and the cathode, the separator having a thickness of less than 20 microns.

Clause 50. The rechargeable battery cell of clauses 1-49, wherein the separator exhibits hydrophilic properties.

Clause 51. The rechargeable battery cell of clauses 1-50, wherein the separator includes at least one of the following characteristics that imparts hydrophilic properties to the separator: a surface modification; a cross-linked polymer layer located on the surface; a porous structure; or combinations thereof.

Clause 52. The rechargeable battery cell of clauses 1-51, wherein the porous structure has a porosity of at least 38%.

Clause 53. The rechargeable battery cell of clauses 1-52, wherein the porous structure has a Gurley number below 300 s/100 mL.

Clause 54. The rechargeable battery cell of clauses 1-53, wherein a weight of the carbon-based material includes no more than 70% of a weight of the coated part of the anode.

Clause 55. The rechargeable battery cell of clauses 1-54, wherein at least 30% weight of the coated part of the anode includes Si containing material.

Clause 56. The rechargeable battery cell of clauses 1-55, wherein the Si containing material includes Si, SiOx, SiC, or combinations thereof.

Clause 57. The rechargeable battery cell of clauses 1-56, wherein the carbon-based material includes carbon nanotubes, carbon black, graphite, or combinations thereof.

Clause 58. The rechargeable battery cell of clauses 1-57, wherein the carbon nanotubes are single walled or multi-walled or combination thereof.

Clause 59. The rechargeable battery cell of clauses 1-58, wherein the electrolyte capable of carrying Li-ions between the anode and the cathode and contains at least one Li salt and at least one additive for improving a lifetime of the battery cell.

Clause 60. The rechargeable battery cell of clauses 1-59, wherein the Li salt is selected from a group consisting of LiPF6, LiBF4, lithium bis(oxalato)borate, LiN(CF3SO2)2, LiN(C2F5SO2)2, LiAsF6, LiC(CF3SO2)3, LiClO4, and LiTFSI or combination thereof.

Clause 61. The rechargeable battery cell of clauses 1-60, wherein the at least one additive for improving the lifetime of the battery cell includes ethylene carbonate (EC), dimethyl carbonate (DMC), diethyl carbonate (DEC), and ethyl methyl carbonate (EMC), vinyl carbonate (VC), or fluoroethylene carbonate (FEC).

Clause 62. The rechargeable battery cell of clauses 1-61, wherein the electrolyte includes at least two of EC, VC, DMC, and FEC.

Clause 63. The rechargeable battery cell of clauses 1-62, wherein the electrolyte has a water content of less than 20 ppm.

Clause 64. The rechargeable battery cell of clauses 1-63, wherein the electrolyte contains chlorides in an amount less than 5 ppm.

Clause 65. The rechargeable battery cell of clauses 1-64, wherein the electrolyte contains metal residues in an amount less than 5 ppm.

Clause 66. The rechargeable battery cell of clauses 1-65, wherein the electrolyte has a density [g/mL] ranging from 0.95 to 1.35.

Clause 67. The rechargeable battery cell of clauses 1-56, wherein the electrolyte exhibits a conductivity [mS/cm] ranging from 2-25.

Clause 68. The rechargeable battery cell of clauses 1-57, wherein the separator has a thickness between 9 and 16 microns.

Clause 69. The rechargeable battery cell of clauses 1-58, wherein the anode, the cathode and the separator are configured to cooperate to enable sequential charging and discharging, such that during sequential charging at least 70% of usable capacity is loaded within 15 minutes.

Clause 70. The rechargeable battery cell of clauses 1-69, wherein during sequential charging at least 70% of usable capacity is loaded within 10 minutes.

Clause 71. The rechargeable battery cell of clauses 1-70, wherein the cathode is configured as a source of Li ions.

Clause 72. The rechargeable battery cell of clauses 1-71, wherein the cathode includes a material selected from a group consisting of LNO (lithium nickel oxide), LMO (lithium manganese oxide), LNMO (lithium nickel manganese oxide), LFP (lithium ferro phosphate), its derivatives and combination thereof.

Clause 73. The rechargeable battery cell of clauses 1-72, wherein the cathode comprises 60-100 atomic % nickel, 0-20 atomic % manganese, and 0-20 atomic % cobalt.

Clause 74. The rechargeable battery cell of clauses 1-73, wherein the cathode materials are defined by the formula AzM(TOy)yX, wherein:
- A—represents an alkali or alkaline-earth element, typically Li, alone or partially replaced by at most 10% of Na and/or K;
- z is defined by $1 \leq z \leq 3$,
- M—represents a metal, typically Fe, Mn, Ni, Al, V, Co or more aliovalent or isovalent metals selected from Mg, Mo, Nb, Ti, Ta, Ge, La, Y, Yb, Cu, Sm, Ce, Hf, Cr, Zr, Bi, Zn, Ca, B and W or combination thereof;
- T—represents a p-block element, typically Si, P, S or combination thereof;
- y is defined by $2 \leq y \leq 4$; and
- X—represents O, OH, or F.

Clause 75. The rechargeable battery cell of clauses 1-74, wherein the anode, the cathode, and the separator are configured to cooperate to enable sequential charging and discharging, such that during sequential charging, at least 70% of usable capacity is loaded within 15 minutes.

Clause 76. The rechargeable battery cell of clauses 1-75, wherein during the sequential charging, at least 70% of usable capacity is loaded within 10 minutes.

Clause 77. A method of charging a rechargeable battery cell according to this clause and/or in combination with one of the preceding clauses, the method comprising:
  providing a charging current to the rechargeable battery cell under conditions sufficient to enable charging of at least 70% of usable capacity to the rechargeable battery cell within 15 minutes,
  wherein the rechargeable battery cell includes:
    an anode having a conductive current collector coated with a composite containing a carbon-based material;
    a cathode configured as a source of Li ions;
    an electrolyte capable of carrying Li-ions between the anode and the cathode; and
    a separator between the anode and the cathode, the separator having a thickness of less than 20 microns.

Clause 78. A rechargeable battery cell, comprising:
  an anode having at least one surface with a reversible areal capacity, after formation, up to 8.0 mAh/cm2; and
  a cathode having at least one surface with a reversible areal capacity, after formation, up to 6 mAh/cm2, wherein a ratio of areal capacity of the at least one surface of the anode to the at least one surface of the cathode is between 1.15 to 1.45.

Clause 79. The rechargeable battery cell of clauses 1-78, wherein the anode has at least one surface with an areal capacity between 5 and 6 mAh/cm2 and the cathode has at least one surface with an areal capacity between 4 and 5 mAh/cm2.

Clause 80. The rechargeable battery cell of clauses 1-79, wherein a ratio of areal capacity of the at least one surface of the anode to the at least one surface of the cathode is between 1.25 to 1.45.

Clause 81. The rechargeable battery cell of clauses 1-80, wherein the anode has at least one surface with a reversible areal capacity, after formation, 6 and 8.0 mAh/cm2 and the cathode has at least one surface with a reversible areal capacity, after formation, between 5 and 6 mAh/cm2.

Clause 82. The rechargeable battery cell of clauses 1-81, wherein a ratio of areal capacity of the at least one surface of the anode to the at least one surface of the cathode is between 1.15 to 1.35.

Clause 83. The rechargeable battery cell of clauses 1-82, wherein the anode includes a conductive current collector coated with a composite containing at least 30% Si by weight.

Clause 84. The rechargeable battery cell of clauses 1-83, wherein the composite containing at least 30% Si by weight includes silicon-carbon (Si/C), silicon oxide-carbon (SiOx/C, wherein 0<x<2), SiN/C and mixtures thereof.

Clause 85. The rechargeable battery cell of clauses 1-84, wherein the cathode includes a material selected from a group consisting of LNO (lithium nickel oxide), LMO (lithium manganese oxide), LNMO (lithium nickel manganese oxide), LFP (lithium ferro phosphate), NMC (nickel manganese cobalt), derivatives thereof, or combinations thereof.

Clause 86. The rechargeable battery cell of clauses 1-85, wherein the NMC comprises 60-100 atomic % nickel, 0-20 atomic % manganese, and 0-20 atomic % cobalt.

Clause 87. The rechargeable battery cell of clauses 1-86, wherein the NMC includes NMC622 (60 atomic % nickel, 20 atomic % manganese, and 20 atomic % cobalt), NMC811 (80 atomic % nickel, 10 atomic % manganese, and 10 atomic % cobalt, or NMC9xx (90 atomic % nickel), derivatives thereof, or combination thereof.

Clause 88. The rechargeable battery cell of clauses 1-87, wherein the cathode materials are defined by the formula AzM(TOy)yX, wherein:
- A—represents an alkali or alkaline-earth element, typically Li, alone or partially replaced by at most 10% of Na and/or K;
- z is defined by $1 \leq z \leq 3$,
- M—represents a metal, typically Fe, Mn, Ni, Al, V, Co aliovalent or isovalent metals selected from Mg, Mo, Nb, Ti, Ta, Ge, La, Y, Yb, Cu, Sm, Ce, Hf, Cr, Zr, Bi, Zn, Ca, B and W or combination thereof;
- T—represents a p-block element, typically Si, P, S or combination thereof;
- y is defined by $2 \leq y \leq 4$; and
- X—represents O, OH, or F.

Clause 89. The rechargeable battery cell of clauses 1-88, further comprising an electrolyte capable of carrying Li-ions between the anode and the cathode.

Clause 90. The rechargeable battery cell of clauses 1-89, wherein the electrolyte includes a lithium electrolyte salt and at least one additive for improving a lifetime of the battery.

Clause 91. The rechargeable battery cell of clauses 1-90, wherein the lithium electrolyte salt is selected from a group consisting of LiPF6, LiBF4, lithium bis(oxalato)borate, LiN (CF3SO2)2, LiN(C2F5SO2)2, LiAsF6, LiC(CF3SO2)3, LiClO4, and LiTFSI or combination thereof.

Clause 92. The rechargeable battery cell of clauses 1-91, wherein the at least one additive for improving the lifetime of the battery includes ethylene carbonate (EC), dimethyl carbonate (DMC), diethyl carbonate (DEC), and ethyl methyl carbonate (EMC), vinyl carbonate (VC), or fluoroethylene carbonate (FEC).

Clause 93. The rechargeable battery cell of clause 92, wherein the electrolyte includes at least two of EC, VC, DMC, and FEC.

Clause 94. The rechargeable battery cell of clauses 1-93, further comprising a separator between the anode and the cathode.

Clause 95. The rechargeable battery cell of clauses 1-94, wherein the separator has a porosity above 40%.

Clause 96. The rechargeable battery cell of clauses 1-95, wherein the separator includes a polyolefin polymer.

Clause 97. The rechargeable battery cell of clauses 1-96, wherein the polyolefin polymer includes polyethylene or polypropylene.

Clause 98. The rechargeable battery cell of clauses 1-97, wherein the anode, the cathode and the separator are configured to cooperate to enable sequential charging and discharging, such that during sequential charging, at least 70% of usable capacity is loaded within 15 minutes.

Clause 99. The rechargeable battery cell of clauses 1-98, wherein during the sequential charging at least 70% of usable capacity is loaded within 10 minutes.

Clause 100. A method of charging a rechargeable battery cell according to this clause and/or in combination with any one of the preceding clauses, the method comprising:
  providing a charging current to the rechargeable battery cell under conditions sufficient to enable charging of at least 70% of usable capacity to the rechargeable battery cell within 15 minutes,
  wherein the rechargeable battery includes:
    an anode having at least one surface with a reversible areal capacity, after formation, up to 8.0 mAh/cm2; and
    a cathode having at least one surface with a reversible areal capacity, after formation, up to 6 mAh/cm2, wherein a ratio of areal capacity of the at least one surface of the anode to the at least one surface of the cathode is between 1.15 to 1.45.

Clause 101. The method of clauses 1-100, wherein the anode has at least one surface with a reversible areal capacity between 5 and 6 mAh/cm2 and the cathode has at least one surface with a reversible areal capacity between 4 and 5 mAh/cm2.

Clause 102. The method of clauses 1-101, wherein a ratio of areal capacity of the at least one surface of the anode to the at least one surface of the cathode is between 1.25 to 1.45.

Clause 103. The method of clauses 1-102, wherein the anode has at least one surface with a reversible areal capacity, after formation, between 6 and 8.0 mAh/cm2 and the cathode has at least one surface with a reversible areal capacity, after formation, between 5 and 6 mAh/cm2.

Clause 104. The method of clause 103, wherein a ratio of areal capacity of the at least one surface of the anode to the at least one surface of the cathode is between 1.15 to 1.35.

Clause 105. The method of clauses 1-103, wherein the charging current enables charging of at least 70% of usable capacity to the rechargeable battery cell within 10 minutes.

Clause 106. A rechargeable battery cell according to this clause and/or in combination with any one of the preceding clauses, the rechargeable battery comprising:
  an anode having at least one surface with a reversible areal capacity, after formation, up to 8.0 mAh/cm$^2$, and containing a Si—C composite within a porous structure and including a carbon-based conductive additive, wherein the Si—C composite is at least 30% Si by weight, and the material is at least 85% Si—C composite;
  a cathode having at least one surface with a reversible areal capacity, after formation, up to 6 mAh/cm$^2$, wherein a ratio of areal capacity of the at least one surface of the anode to the at least one surface of the cathode is between 1.15 to 1.45;
  an electrolyte capable of carrying Li-ions between the anode and the cathode; and
  a dielectric separator between the anode and the cathode, the separator having a porosity of greater than 38%, at least one carbon material or carbon additive;
  a binder in an amount less than 20% by weight; and
  a polymer-based dispersant in an amount less than 2% by weight,
  wherein the polymer-based dispersant includes polymer chains between 10,000 and 50,000 g/mol, and
  wherein an interface between the anode and the cathode is pressurized in an amount sufficient to manage volumetric changes during charging and discharging processes, and wherein the anode and cathode are configured to cooperate to output an average discharge voltage of no greater than 3.55 V.

Clause 107. The rechargeable battery cell of clauses 1-106, wherein the amount of pressure sufficient to manage volumetric changes is an amount that maintains porosity of the porous structure and remains below 2 Atm.

Clause 108. The rechargeable battery cell of clauses 1-107, wherein the electrolyte includes a lithium electrolyte salt and at least one additive for improving a lifetime of the battery.

Clause 109. The rechargeable battery cell of clauses 1-108, wherein the lithium electrolyte salt is selected from a group consisting of $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, and LiTFSI or combination thereof.

Clause 110. The rechargeable battery cell of clauses 1-109, wherein the at least one additive for improving the lifetime of the battery cell includes ethylene carbonate (EC), dimethyl carbonate (DMC), diethyl carbonate (DEC), ethyl methyl carbonate (EMC), vinyl carbonate (VC), or fluoroethylene carbonate (FEC).

Clause 111. The rechargeable battery cell of clauses 1-110, wherein the anode, the cathode, and the separator are configured to cooperate to enable sequential charging and discharging, such that during sequential charging at least 70% of usable capacity is loaded within 15 minutes.

Clause 112. The rechargeable battery cell of clauses 1-111, wherein the cathode includes a material selected from a group consisting of LNO (lithium nickel oxide), LMO (lithium manganese oxide), LNMO (lithium nickel manganese oxide), LFP (lithium ferro phosphate), NMC (nickel manganese cobalt), or derivatives and combination thereof.

Clause 113. The rechargeable battery cell of clauses 1-112, wherein the NMC comprises 60-100 atomic % nickel, 0-20 atomic % manganese, and 0-20 atomic % cobalt.

Clause 114. The rechargeable battery cell of clauses 1-113, wherein the NMC includes NMC622 (60 atomic % nickel, 20 atomic % manganese, and 20 atomic % cobalt), NMC811 (80 atomic % nickel, 10 atomic % manganese, and 10 atomic % cobalt, or NMC9xx (90 atomic % nickel), or derivatives and combination thereof.

Clause 115. The rechargeable battery cell of clauses 1-114, wherein the cathode materials are defined by the formula AzM(TOy)yX, wherein:
  A—represents an alkali or alkaline-earth element, typically Li, alone or partially replaced by at most 10% of Na and/or K;
  z is defined by $1 \leq z \leq 3$,
  M—represents a metal, typically Fe, Mn, Ni, Al, V, Co or more aliovalent or isovalent metals selected from Mg, Mo, Nb, Ti, Ta, Ge, La, Y, Yb, Cu, Sm, Ce, Hf, Cr, Zr, Bi, Zn, Ca, B and W or combination thereof;
  T—represents a p-block element, typically Si, P, S or combination thereof;
  y is defined by $2 \leq y \leq 4$; and
  X—represents O, OH, or F.

Clause 116. The rechargeable battery cell of clauses 1-115, wherein the at least one carbon material or carbon additive includes carbon-based fibers.

Clause 117. The rechargeable battery cell of clauses 1-116, wherein the carbon-based fibers include carbon nanotubes.
Clause 118. The rechargeable battery cell of clauses 1-117, wherein the dielectric separator includes a polyolefin polymer selected from polyethylene and polypropylene and has a porosity above 40%.
Clause 119. The rechargeable battery cell of clauses 1-118, wherein the separator has a Gurley number of below 200 s/100 mL.
Clause 120. The rechargeable battery cell of clauses 1-119, wherein the electrolyte has a water content of less than 20 ppm.
Clause 121. The rechargeable battery cell of clauses 1-120, wherein the electrolyte contains chlorides in an amount less than 5 ppm and metal residues in an amount less than 5 ppm.
Clause 122. The rechargeable battery cell of clauses 1-121, wherein the electrolyte has a density [g/mL] ranging from 1.0 to 1.3.
Clause 123. The rechargeable battery cell of clauses 1-122, wherein the electrolyte exhibits a conductivity [mS/cm] ranging from 10-30 at room temperature.
Clause 124. The rechargeable battery cell of clauses 1-123, wherein the binder is a halogenated binder present in an amount ranging from 4-10% of a weight of the battery.
Clause 125. The rechargeable battery cell of clauses 1-124, wherein the binders are PVDF-HFP or modified PVDF.
Clause 126. The rechargeable battery cell of clauses 1-125, wherein the anode includes active material in an amount ranging from 86-94% and conductive additives in an amount ranging from 0-2% by weight.
Clause 127. The rechargeable battery cell of clauses 1-126, wherein the Si—C composite comprises silicon-carbon (Si/C), silicon oxide-carbon (SiOx/C, wherein 0<x<2), SiN/C and mixtures thereof.
Clause 128. The rechargeable battery cell of clauses 1-127, wherein the anode has at least one surface with an areal capacity between 5 and 6 mAh/cm$^2$ and the cathode has at least one surface with an areal capacity between 4 and 5 mAh/cm$^2$, wherein a ratio of areal capacity of the at least one surface of the anode to the at least one surface of the cathode is between 1.25 to 1.45.
Clause 129. The rechargeable battery cell of clauses 1-128, wherein the anode has at least one surface with a reversible areal capacity, after formation, between 6 and 8.0 mAh/cm$^2$ and the cathode has at least one surface with a reversible areal capacity after formation between 5 and 6 mAh/cm$^2$, wherein a ratio of areal capacity of the at least one surface of the anode to the at least one surface of the cathode is between 1.15 to 1.35.
Clause 130. The rechargeable battery cell of clauses 1-129, which is able to exhibit at least 1000 consecutive fast charge cycles to 80% capacity retention.
Clause 131. A method of charging a rechargeable battery cell according to this clause and/or in combination with any one of the preceding clauses, the method comprising:
   providing a charging current under conditions sufficient to enable charging of at least 70% of usable capacity to the rechargeable battery cell within 15 minutes;
   wherein the rechargeable battery cell includes:
   an anode having at least one surface with a reversible areal capacity, after formation, up to 8.0 mAh/cm$^2$, and containing a Si—C composite within a porous structure and including a carbon-based conductive additive, wherein the Si—C composite is at least 30% Si by weight, and the material is at least 85% Si—C composite;
   a cathode having at least one surface with a reversible areal capacity, after formation, up to 6 mAh/cm$^2$, wherein the ratio of areal capacity of the at least one surface of the anode to the at least one surface of the cathode is between 1.15 to 1.45;
   an electrolyte capable of carrying Li-ions between the anode and the cathode; and
   a dielectric separator between the anode and the cathode, the separator having a porosity of greater than 38%,
   at least one carbon material or carbon additive;
   a binder in an amount less than 20% by weight; and
   a polymer-based dispersant in an amount less than 2% by weight, wherein the polymer-based dispersant includes polymer chains between 10,000 and 50,000 g/mol, and
   wherein an interface between the anode and the cathode is pressurized in an amount sufficient to manage volumetric changes during charging and discharging processes, and wherein the anode and cathode are configured to cooperate to output an average discharge voltage of no greater than 3.55 V.
Clause 132. The rechargeable battery cell of clauses 1-131, wherein said charging current enable charging of at least 70% of usable capacity to the rechargeable battery cell within 10 minutes.
Clause 133. The method of clauses 1-132, wherein the anode has at least one surface with an areal capacity between 5 and 6 mAh/cm$^2$ and the cathode has at least one surface with an areal capacity between 4 and 5 mAh/cm$^2$, wherein a ratio of areal capacity of the at least one surface of the anode to the at least one surface of the cathode is between 1.25 to 1.45.
Clause 134. The method of clauses 1-133, wherein the anode has at least one surface with a reversible areal capacity, after formation, 6 and 8.0 mAh/cm$^2$ and the cathode has at least one surface with a reversible areal capacity, after formation, between 5 and 6 mAh/cm$^2$, wherein a ratio of areal capacity of the at least one surface of the anode to the at least one surface of the cathode is between 1.15 to 1.35.
Clause 135. The method of clauses 1-134, further comprising at least 1000 consecutive fast charge cycles to 80% capacity retention.

Disclosed embodiments may include any one of the following bullet-pointed features alone or in combination with one or more other bullet-pointed features, whether implemented as a device, system, apparatus, and/or method.
   a rechargeable battery cell.
      an anode having a conductive current collector coated with a composite containing at least 30% Si by weight.
      a cathode configured as a source of Li ions.
      an electrolyte capable of carrying Li-ions between the anode and the cathode.
      a separator between the anode and the cathode, the separator having a porosity of at least 38%.
      an anode, a cathode and a separator are configured to cooperate to enable sequential charging and discharging, such that during sequential chargings at least 70% of usable capacity is loaded within 15 minutes.
      an anode containing carbon.
      a separator including a polyolefin polymer, a cellulose derivative, or combinations thereof.
      a separator with a cellulose derivative including a cellulose ester or a cellulose ether.
      a separator with a cellulose derivative including mixed cellulose ethers selected from methylcarboxymethyl cellulose (MCMC) and hydroxyethylcarboxymethyl cellulose (HECMC).
      a separator having multiple layers, and at least one of the multiple layers includes a ceramic material.

the ceramic material includes $Al_2O_3$, AlO(OH), MgO, or mixtures thereof at least one layer that includes a ceramic material faces the cathode or the anode, or both.

separator has a porosity of at least 40%.

a cathode and an anode exhibit differing areal capacities.

a ratio between an areal capacity of the cathode to the anode is between 0.70 and 0.81.

a current collector has a sheet resistance below 3 mOhm/sq.

the cell has a winded or stacked configuration.

the winded configuration has a cylindrical or jellyroll configuration.

the stacked configuration has a prismatic, or pouch configuration.

when the battery cell configuration is cylindrical or jellyroll, the anode has a plurality of anode tabs, and the cathode has a plurality of cathode tabs, or each of the anode and the cathode have a continuous tab.

when the battery cell configuration is prismatic or pouch, and the anode, cathode, and the separator are configured in a stack form.

the stack form includes a z-folded separator.

the composite containing at least 30% Si by weight silicon includes mixtures and/or composites of silicon-carbon (Si/C), silicon oxide-carbon (SiOx/C, wherein 0<x<2), SiN/C, and combination thereof.

electrolyte capable of carrying Li-ions between the anode and the cathode contains at least one Li salt and at least one additive for improving a lifetime of the battery cell.

an Li salt is selected from a group consisting of $LiPF_6$, $LiBF_4$, lithium bis(oxalato)borate, $LiN(CF_3SO_2)_2$, LiN$(C_2F_5SO_2)_2$, $LiAsF_6$, $LiC(CF_3SO_2)_3$, $LiClO_4$, and LiTFSI or combination thereof.

at least one additive for improving the lifetime of the battery cell includes ethylene carbonate (EC), dimethyl carbonate (DMC), diethyl carbonate (DEC), ethyl methyl carbonate (EMC), vinyl carbonate (VC), or fluoroethylene carbonate (FEC).

a method of charging a rechargeable battery cell involving any one or more of the foregoing or following bullet points.

providing a charging current to the rechargeable battery cell under conditions sufficient to enable charging of at least 70% of usable capacity to the rechargeable battery cell within 15 minutes.

a charging current enables charging of at least 70% of usable capacity to the rechargeable battery cell within 10 minutes.

a rechargeable battery cell having an anode containing a Si—C composite within a porous structure.

an interface between an anode and a cathode is pressurized in an amount sufficient to manage volumetric changes during charging and discharging processes.

the anode and the cathode are configured to cooperate to provide an average discharge voltage of no greater than 3.55V.

the anode and the cathode are configured to cooperate to provide a discharge voltage of no less than 2.5V.

the anode, the cathode, and the separator are configured to cooperate to enable sequential charging and discharging, such that during sequential charging, at least 70% of usable capacity is loaded within 15 minutes.

during sequential charging, at least 70% of usable capacity is loaded within 10 minutes.

an amount of pressure sufficient to manage volumetric changes is an amount that maintains porosity of the porous structure.

amount that maintains porosity of the porous structure is less than 2 Atm the porous structure has a porosity of at least 38%.

the porous structure is made of a porous polymeric substrate having an average pore size in the range of 0.05 microns to 5 microns.

the porous polymeric substrate has a Gurley Number in the range of 50 to 200 seconds per 100 ml.

the porous polymeric substrate is made of a polyolefin.

an amount of pressure sufficient to manage volumetric changes is determined based on a cell capacity relative to a case dimension.

an electrolyte capable of carrying Li-ions between the anode and the cathode contain at least one Li salt and at least one additive for improving a lifetime of the battery cell.

an Li salt is selected from a group consisting of LiPF6, LiBF4, lithium bis(oxalato)borate, LiN(CF3SO2)2, LiN(C2F5SO2)2, LiAsF6, LiC(CF3SO2)3, LiClO4, and LiTFSI or combination thereof.

at least one additive for improving the lifetime of the battery cell includes ethylene carbonate (EC), dimethyl carbonate (DMC), diethyl carbonate (DEC), ethyl methyl carbonate (EMC), vinyl carbonate (VC), or fluoroethylene carbonate (FEC).

a separator includes Al2O3, MgO, aramid, Boehmite-based (AlO(OH)), BaSO4 or mixtures thereof.

an Si—C composite includes silicon-carbon (Si/C), silicon oxide-carbon (SiOx/C, wherein 0<x<2), SiN/C and mixtures thereof.

the anode includes a carbon-based conductive additive.

the carbon-based conductive additive includes carbon-based fibers.

the carbon-based fibers include carbon nanotubes.

the rechargeable battery cell including an anode containing a Si—C composite within a porous structure.

a separator between the anode and the cathode, the separator having a thickness of less than 20 microns.

the separator exhibits hydrophilic properties.

the separator includes at least one of the following characteristics that imparts hydrophilic properties to the separator: a surface modification; a cross-linked polymer layer located on the surface; a porous structure; or combinations thereof the porous structure has a Gurley number below 300 s/100 mL.

a weight of the carbon-based material includes no more than 70% of a weight of the coated part of the anode.

at least 30% weight of the coated part of the anode includes Si containing material.

the Si containing material includes Si, SiOx, SiC, or combinations thereof.

the carbon-based material includes carbon nanotubes, carbon black, graphite, or combinations thereof.

the carbon nanotubes are single walled or multi-walled or combination thereof.

the electrolyte capable of carrying Li-ions between the anode and the cathode and contains at least one Li salt and at least one additive for improving a lifetime of the battery cell.

the Li salt is selected from a group consisting of LiPF6, LiBF4, lithium bis(oxalato)borate, LiN(CF3SO2)2, LiN(C2F5SO2)2, LiAsF6, LiC(CF3SO2)3, LiClO4, and LiTFSI or combination thereof.

the at least one additive for improving the lifetime of the battery cell includes ethylene carbonate (EC), dimethyl carbonate (DMC), diethyl carbonate (DEC), and ethyl methyl carbonate (EMC), vinyl carbonate (VC), or fluoroethylene carbonate (FEC).

the electrolyte includes at least two of EC, VC, DMC, and FEC.

the electrolyte has a water content of less than 20 ppm.

wherein the electrolyte contains chlorides in an amount less than 5 ppm.

the electrolyte contains metal residues in an amount less than 5 ppm.

the electrolyte has a density [g/mL] ranging from 0.95 to 1.35.

the electrolyte exhibits a conductivity [mS/cm] ranging from 2-25.

the separator has a thickness between 9 and 16 microns.

a cathode includes a material selected from a group consisting of LNO (lithium nickel oxide), LMO (lithium manganese oxide), LNMO (lithium nickel manganese oxide), LFP (lithium ferro phosphate), its derivatives and combination thereof.

the cathode includes 60-100 atomic % nickel, 0-20 atomic % manganese, and 0-20 atomic % cobalt.

the cathode materials are defined by the formula AzM(Toy)yX, wherein:
  A—represents an alkali or alkaline-earth element, typically Li, alone or partially replaced by at most 10% of Na and/or K;
  z is defined by $1 \leq z \leq 3$,
  M—represents a metal, typically Fe, Mn, Ni, Al, V, Co or more aliovalent or isovalent metals selected from Mg, Mo, Nb, Ti, Ta, Ge, La, Y, Yb, Cu, Sm, Ce, Hf, Cr, Zr, Bi, Zn, Ca, B and W or combination thereof;
  T—represents a p-block element, typically Si, P, S or combination thereof;
  y is defined by $2 \leq y \leq 4$; and
  X—represents O, OH, or F.

a separator between the anode and the cathode having a thickness of less than 20 microns.

an anode having at least one surface with a reversible areal capacity, after formation, up to 8.0 mAh/cm2.

a cathode having at least one surface with a reversible areal capacity, after formation, up to 6 mAh/cm2, wherein a ratio of areal capacity of the at least one surface of the anode to the at least one surface of the cathode is between 1.15 to 1.45.

the anode has at least one surface with an areal capacity between 5 and 6 mAh/cm2 and the cathode has at least one surface with an areal capacity between 4 and 5 mAh/cm2.

a ratio of areal capacity of the at least one surface of the anode to the at least one surface of the cathode is between 1.25 to 1.45.

an anode has at least one surface with a reversible areal capacity, after formation, between 6 and 8.0 mAh/cm2 and the cathode has at least one surface with a reversible areal capacity, after formation, between 5 and 6 mAh/cm2.

a ratio of areal capacity of the at least one surface of the anode to the at least one surface of the cathode is between 1.15 to 1.35.

an anode includes a conductive current collector coated with a composite containing at least 30% Si by weight.

a composite containing at least 30% Si by weight includes silicon-carbon (Si/C), silicon oxide-carbon (SiOx/C, wherein 0<x<2), SiN/C and mixtures thereof.

a cathode includes a material selected from a group consisting of LNO (lithium nickel oxide), LMO (lithium manganese oxide), LNMO (lithium nickel manganese oxide), LFP (lithium ferro phosphate), NMC (nickel manganese cobalt), derivatives thereof, or combinations thereof.

the NMC comprises 60-100 atomic % nickel, 0-20 atomic % manganese, and 0-20 atomic % cobalt.

the NMC includes NMC622 (60 atomic % nickel, 20 atomic % manganese, and 20 atomic % cobalt), NMC811 (80 atomic % nickel, 10 atomic % manganese, and 10 atomic % cobalt, or NMC9xx (90 atomic % nickel), derivatives thereof, or combination thereof.

a lithium electrolyte salt and at least one additive for improving a lifetime of the battery.

a lithium electrolyte salt is selected from a group consisting of LiPF6, LiBF4, lithium bis(oxalato)borate, LiN(CF3SO2)2, LiN(C2F5SO2)2, LiAsF6, LiC(CF3SO2)3, LiClO4, and LiTFSI or combination thereof.

at least one additive for improving the lifetime of the battery includes ethylene carbonate (EC), dimethyl carbonate (DMC), diethyl carbonate (DEC), and ethyl methyl carbonate (EMC), vinyl carbonate (VC), or fluoroethylene carbonate (FEC).

an electrolyte includes at least two of EC, VC, DMC, and FEC.

a separator between the anode and the cathode having a porosity above 40% a dielectric separator between the anode and the cathode, the separator having a porosity of greater than 38%.

a binder in an amount less than 20% by weight.

a polymer-based dispersant in an amount less than 2% by weight.

a polymer-based dispersant includes polymer chains between 10,000 and 50,000 g/mol.

an interface between the anode and the cathode is pressurized in an amount sufficient to manage volumetric changes during charging and discharging processes, and wherein the anode and cathode are configured to cooperate to output an average discharge voltage of no greater than 3.55 V.

an amount of pressure sufficient to manage volumetric changes is an amount that maintains porosity of the porous structure and remains below 2 Atm.

a lithium electrolyte salt is selected from a group consisting of $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, and LiTFSI or combination thereof.

at least one additive for improving the lifetime of the battery cell includes ethylene carbonate (EC), dimethyl carbonate (DMC), diethyl carbonate (DEC), ethyl methyl carbonate (EMC), vinyl carbonate (VC), or fluoroethylene carbonate (FEC).

a cathode includes a material selected from a group consisting of LNO (lithium nickel oxide), LMO (lithium manganese oxide), LNMO (lithium nickel manganese oxide), LFP (lithium ferro phosphate), NMC (nickel manganese cobalt), or derivatives and combination thereof.

an NMC comprises 60-100 atomic % nickel, 0-20 atomic % manganese, and 0-20 atomic % cobalt.

an NMC includes NMC622 (60 atomic % nickel, 20 atomic % manganese, and 20 atomic % cobalt), NMC811 (80 atomic % nickel, 10 atomic % manganese, and 10 atomic % cobalt, or NMC9xx (90 atomic % nickel), or derivatives and combination thereof.

An electrolyte contains chlorides in an amount less than 5 ppm and metal residues in an amount less than 5 ppm.

An electrolyte has a density [g/mL] ranging from 1.0 to 1.3.

an electrolyte exhibits a conductivity [mS/cm] ranging from 10-30 at room temperature.

A binder is a halogenated binder present in an amount ranging from 4-10% of a weight of the battery.

binders are PVDF-HFP or modified PVDF.

anode includes active material in an amount ranging from 86-94% and conductive additives in an amount ranging from 0-2% by weight.

Si—C composite comprises silicon-carbon (Si/C), silicon oxide-carbon (SiOx/C, wherein 0<x<2), SiN/C and mixtures thereof.

an anode having at least one surface with a reversible areal capacity, after formation, up to 8.0 mAh/cm$^2$, and containing a Si—C composite within a porous structure and including a carbon-based conductive additive, wherein the Si—C composite is at least 30% Si by weight, and the material is at least 85% Si—C composite.

a polymer-based dispersant in an amount less than 2% by weight.

a polymer-based dispersant includes polymer chains between 10,000 and 50,000 g/mol.

an interface between the anode and the cathode is pressurized in an amount sufficient to manage volumetric changes during charging and discharging processes, and wherein the anode and cathode are configured to cooperate to output an average discharge voltage of no greater than 3.55 V.

an anode has at least one surface with an areal capacity between 5 and 6 mAh/cm$^2$ and the cathode has at least one surface with an areal capacity between 4 and 5 mAh/cm$^2$, wherein a ratio of areal capacity of the at least one surface of the anode to the at least one surface of the cathode is between 1.25 to 1.45.

the anode has at least one surface with a reversible areal capacity, after formation, between 6 and 8.0 mAh/cm$^2$ and the cathode has at least one surface with a reversible areal capacity, after formation, between 5 and 6 mAh/cm$^2$, wherein a ratio of areal capacity of the at least one surface of the anode to the at least one surface of the cathode is between 1.15 to 1.35.

at least 1000 consecutive fast charge cycles to 80% capacity retention.

What is claimed is:

1. A rechargeable battery cell, comprising:
   an anode having at least one surface with a reversible areal capacity, after formation, up to 8.0 mAh/cm$^2$, and containing a Si—C composite within a porous structure and including a carbon-based conductive additive, wherein the Si—C composite is at least 30% Si by weight, and the material is at least 85% Si—C composite;
   a cathode having at least one surface with a reversible areal capacity, after formation, up to 6 mAh/cm$^2$, wherein a ratio of areal capacity of the at least one surface of the anode to the at least one surface of the cathode is between 1.15 to 1.45;
   an electrolyte capable of carrying Li-ions between the anode and the cathode; and
   a dielectric separator between the anode and the cathode, the separator having a porosity of greater than 38%,
   at least one carbon material or carbon additive;
   a binder in an amount less than 20% by weight; and
   a polymer-based dispersant in an amount less than 2% by weight,
   wherein the polymer-based dispersant includes polymer chains between 10,000 and 50,000 g/mol, and
   wherein an interface between the anode and the cathode is pressurized in an amount sufficient to manage volumetric changes during charging and discharging processes, and wherein the anode and cathode are configured to cooperate to output an average discharge voltage of no greater than 3.55 V.

2. The rechargeable battery cell of claim 1, wherein the amount of pressure sufficient to manage volumetric changes is an amount that maintains porosity of the porous structure and remains below 2 Atm.

3. The rechargeable battery cell of claim 1, wherein the electrolyte includes a lithium electrolyte salt and at least one additive for improving a lifetime of the battery.

4. The rechargeable battery cell of claim 3, wherein the lithium electrolyte salt is selected from a group consisting of LiPF$_6$, LiBF$_4$, lithium bis(oxalato)borate, LiN(CF$_3$SO$_2$)$_2$, LiN(C$_2$F$_5$SO$_2$)$_2$, LiAsF$_6$, LiC(CF$_3$SO$_2$)$_3$, LiClO$_4$, and LiTFSI or combination thereof.

5. The rechargeable battery cell of claim 3, wherein the at least one additive for improving the lifetime of the battery cell includes ethylene carbonate (EC), dimethyl carbonate (DMC), diethyl carbonate (DEC), ethyl methyl carbonate (EMC), vinyl carbonate (VC), or fluoroethylene carbonate (FEC).

6. The rechargeable battery cell of claim 1, wherein the anode, the cathode, and the separator are configured to cooperate to enable sequential charging and discharging, such that during sequential charging at least 70% of usable capacity is loaded within 15 minutes.

7. The rechargeable battery cell of claim 1, wherein the cathode includes a material selected from a group consisting of LNO (lithium nickel oxide), LMO (lithium manganese oxide), LNMO (lithium nickel manganese oxide), LFP (lithium ferro phosphate), NMC (nickel manganese cobalt), or derivatives and combination thereof.

8. The rechargeable battery cell of claim 7, wherein the NMC comprises 60-100 atomic % nickel, 0-20 atomic % manganese, and 0-20 atomic % cobalt.

9. The rechargeable battery cell of claim 8, wherein the NMC includes NMC622 (60 atomic % nickel, 20 atomic % manganese, and 20 atomic % cobalt), NMC811 (80 atomic % nickel, 10 atomic % manganese, and 10 atomic % cobalt, or NMC9xx (90 atomic % nickel), or derivatives and combination thereof.

10. The rechargeable battery cell of claim 1, wherein the cathode materials are defined by the formula AzM(TOy)yX, wherein:
    A—represents an alkali or alkaline-earth element, typically Li, alone or partially replaced by at most 10% of Na and/or K;
    z is defined by $1 \leq z \leq 3$,
    M—represents a metal, typically Fe, Mn, Ni, Al, V, Co or more aliovalent or isovalent metals selected from Mg, Mo, Nb, Ti, Ta, Ge, La, Y, Yb, Cu, Sm, Ce, Hf, Cr, Zr, Bi, Zn, Ca, B and W or combination thereof;
    T—represents a p-block element, typically Si, P, S or combination thereof;
    y is defined by $2 \leq y \leq 4$; and
    X—represents O, OH, or F.

11. The rechargeable battery cell of claim 1, wherein the at least one carbon material or carbon additive includes carbon-based fibers.

12. The rechargeable battery cell of claim 11, wherein the carbon-based fibers include carbon nanotubes.

13. The rechargeable battery cell of claim 1, wherein the dielectric separator includes a polyolefin polymer selected from polyethylene and polypropylene and has a porosity above 40%.

14. The rechargeable battery cell of claim 13, wherein the separator has a Gurley number of below 200 s/100 mL.

15. The rechargeable battery cell of claim 1, wherein the electrolyte has a water content of less than 20 ppm.

16. The rechargeable battery cell of claim 1, wherein the electrolyte contains chlorides in an amount less than 5 ppm and metal residues in an amount less than 5 ppm.

17. The rechargeable battery cell of claim 1, wherein the electrolyte has a density [g/mL] ranging from 1.0 to 1.3.

18. The rechargeable battery cell of claim 1, wherein the electrolyte exhibits a conductivity [mS/cm] ranging from 10-30 at room temperature.

19. The rechargeable battery cell of claim 1, wherein the binder is a halogenated binder present in an amount ranging from 4-10% of a weight of the battery.

20. The rechargeable battery cell of claim 19, wherein the binders are PVDF-HFP or modified PVDF.

21. The rechargeable battery cell of claim 1, wherein the anode includes active material in an amount ranging from 86-94% and conductive additives in an amount ranging from 0-2% by weight.

22. The rechargeable battery cell of claim 1, wherein the Si—C composite comprises silicon-carbon (Si/C), silicon oxide-carbon (SiOx/C, wherein 0<x<2), SiN/C and mixtures thereof.

23. The rechargeable battery cell of claim 1, wherein the anode has at least one surface with an areal capacity between 5 and 6 mAh/cm$^2$ and the cathode has at least one surface with an areal capacity between 4 and 5 mAh/cm$^2$, wherein a ratio of areal capacity of the at least one surface of the anode to the at least one surface of the cathode is between 1.25 to 1.45.

24. The rechargeable battery cell of claim 1, wherein the anode has at least one surface with a reversible areal capacity, after formation, between 6 and 8.0 mAh/cm$^2$ and the cathode has at least one surface with a reversible areal capacity, after formation, between 5 and 6 mAh/cm$^2$, wherein a ratio of areal capacity of the at least one surface of the anode to the at least one surface of the cathode is between 1.15 to 1.35.

25. The rechargeable battery cell of claim 1, which is able to exhibit at least 1000 consecutive fast charge cycles to 80% capacity retention.

26. A method of charging a rechargeable battery cell, the method comprising:

providing a charging current under conditions sufficient to enable charging of at least 70% of usable capacity to the rechargeable battery cell within 15 minutes;
wherein the rechargeable battery cell includes:
an anode having at least one surface with a reversible areal capacity, after formation, up to 8.0 mAh/cm$^2$, and containing a Si—C composite within a porous structure and including a carbon-based conductive additive, wherein the Si—C composite is at least 30% Si by weight, and the material is at least 85% Si—C composite;
a cathode having at least one surface with a reversible areal capacity, after formation, up to 6 mAh/cm$^2$, wherein the ratio of areal capacity of the at least one surface of the anode to the at least one surface of the cathode is between 1.15 to 1.45;
an electrolyte capable of carrying Li-ions between the anode and the cathode; and
a dielectric separator between the anode and the cathode, the separator having a porosity of greater than 38%,
at least one carbon material or carbon additive;
a binder in an amount less than 20% by weight; and
a polymer-based dispersant in an amount less than 2% by weight,
wherein the polymer-based dispersant includes polymer chains between 10,000 and 50,000 g/mol, and
wherein an interface between the anode and the cathode is pressurized in an amount sufficient to manage volumetric changes during charging and discharging processes, and wherein the anode and cathode are configured to cooperate to output an average discharge voltage of no greater than 3.55 V.

27. The rechargeable battery cell of claim 26, wherein said charging current enable charging of at least 70% of usable capacity to the rechargeable battery cell within 10 minutes.

28. The method of claim 26, wherein the anode has at least one surface with an areal capacity between 5 and 6 mAh/cm$^2$ and the cathode has at least one surface with an areal capacity between 4 and 5 mAh/cm$^2$, wherein a ratio of areal capacity of the at least one surface of the anode to the at least one surface of the cathode is between 1.25 to 1.45.

29. The method of claim 26, wherein the anode has at least one surface with a reversible areal capacity, after formation, between 6 and 8.0 mAh/cm$^2$ and the cathode has at least one surface with a reversible areal capacity, after formation, between 5 and 6 mAh/cm$^2$, wherein a ratio of areal capacity of the at least one surface of the anode to the at least one surface of the cathode is between 1.15 to 1.35.

30. The method of claim 26, further comprising at least 1000 consecutive fast charge cycles to 80% capacity retention.

* * * * *